US010866683B2

(12) United States Patent
Gupta et al.

(10) Patent No.: US 10,866,683 B2
(45) Date of Patent: Dec. 15, 2020

(54) FORCE OR TOUCH SENSING ON A MOBILE DEVICE USING CAPACITIVE OR PRESSURE SENSING

(71) Applicant: Apple Inc., Cupertino, CA (US)

(72) Inventors: Pavan O. Gupta, Belmont, CA (US); Andrew W. Joyce, Santa Clara, CA (US); Benedict Drevniok, San Francisco, CA (US); Mo Li, Campbell, CA (US); David S. Graff, San Jose, CA (US); Albert Lin, Cupertino, CA (US); Julian K. Shutzberg, Atlanta, GA (US); Hojjat Seyed Mousavi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/549,990

(22) Filed: Aug. 23, 2019

(65) Prior Publication Data
US 2020/0064952 A1 Feb. 27, 2020

Related U.S. Application Data

(60) Provisional application No. 62/723,430, filed on Aug. 27, 2018, provisional application No. 62/738,831, (Continued)

(51) Int. Cl.
*G06F 3/045* (2006.01)
*G06F 3/044* (2006.01)
(Continued)

(52) U.S. Cl.
CPC ............. *G06F 3/044* (2013.01); *G01L 1/142* (2013.01); *G01L 9/12* (2013.01); *G01L 19/0092* (2013.01);
(Continued)

(58) Field of Classification Search
CPC ....... G01L 19/0092; G01L 1/142; G01L 9/12; G06F 2203/04105; G06F 2203/04106;
(Continued)

(56) References Cited

U.S. PATENT DOCUMENTS

| 4,527,862 A | 7/1985 | Arakawa |
| 5,343,064 A | 8/1994 | Spangler et al. |

(Continued)

FOREIGN PATENT DOCUMENTS

| CN | 1378169 | 11/2002 |
| CN | 1502166 | 6/2004 |

(Continued)

OTHER PUBLICATIONS

Bau, et al., "TeslaTouch: Electrovibration for Touch Surfaces," UIST'10, Oct. 3-6, 2010, New York, New York USA, 10 pages.
(Continued)

*Primary Examiner* — Insa Sadio
(74) *Attorney, Agent, or Firm* — Brownstein Hyatt Farber Schreck, LLP

(57) ABSTRACT

A device includes a housing defining part of an interior volume and an opening to the interior volume; a cover mounted to the housing to cover the opening and further define the interior volume; a display mounted within the interior volume and viewable through the cover; and a system in package (SiP) mounted within the interior volume. The SiP includes a self-capacitance sense pad adjacent a first surface of the SiP; a set of solder structures attached to a second surface of the SiP, the second surface opposite the first surface; and an IC coupled to the self-capacitance sense pad and configured to output, at one or more solder structures in the set of solder structures, a digital value related to a measured capacitance of the self-capacitance sense pad. The SiP is mounted within the interior volume with the first
(Continued)

surface positioned closer to the cover than the second surface.

40 Claims, 50 Drawing Sheets

Related U.S. Application Data filed on Sep. 28, 2018, provisional application No. 62/851,632, filed on May 22, 2019.

(51) Int. Cl.

| H04M 1/02 | (2006.01) |
|---|---|
| G06F 3/041 | (2006.01) |
| G01L 19/00 | (2006.01) |
| G01L 9/12 | (2006.01) |
| G01L 1/14 | (2006.01) |

(52) U.S. Cl.
CPC ........ *G06F 3/0414* (2013.01); *H04M 1/0266* (2013.01); *H04M 1/0277* (2013.01); *G06F 2203/04106* (2013.01); *G06F 2203/04107* (2013.01); *H04M 2250/22* (2013.01)

(58) Field of Classification Search
CPC ........ G06F 2203/04107; G06F 3/0414; G06F 3/044; H04M 1/026; H04M 1/0266; H04M 1/0277; H04M 2250/12; H04M 2250/22

See application file for complete search history.

(56) References Cited

U.S. PATENT DOCUMENTS

| 5,929,517 | A | 7/1999 | Distefano et al. |
|---|---|---|---|
| 6,002,389 | A | 12/1999 | Kasser |
| 6,079,282 | A | 6/2000 | Lanter |
| 6,154,580 | A | 11/2000 | Kuriyama et al. |
| 6,323,846 | B1 | 11/2001 | Westerman et al. |
| 6,545,495 | B2 | 4/2003 | Warmack et al. |
| 6,568,275 | B2 | 5/2003 | Scholz et al. |
| 6,570,557 | B1 | 5/2003 | Westerman et al. |
| 6,570,707 | B1 | 5/2003 | Murakami |
| 6,676,611 | B1 | 1/2004 | Bromba |
| 6,677,932 | B1 | 1/2004 | Westerman |
| 6,781,576 | B2 | 8/2004 | Tamura |
| 6,933,031 | B2 | 8/2005 | Ohta et al. |
| 6,989,728 | B2 | 1/2006 | Van Zeeland et al. |
| 7,158,122 | B2 | 1/2007 | Roberts |
| 7,211,885 | B2 | 5/2007 | Nordal et al. |
| 7,337,085 | B2 | 2/2008 | Soss |
| 7,409,876 | B2 | 8/2008 | Ganapathi et al. |
| 7,511,702 | B2 | 3/2009 | Hotelling |
| 7,538,760 | B2 | 5/2009 | Hotelling et al. |
| 7,609,178 | B2 | 10/2009 | Son et al. |
| 7,784,366 | B2 | 8/2010 | Daverman et al. |
| 7,800,592 | B2 | 9/2010 | Kerr et al. |
| 7,946,758 | B2 | 5/2011 | Mooring |
| 8,072,437 | B2 | 12/2011 | Miller et al. |
| 8,111,248 | B2 | 2/2012 | Lee et al. |
| 8,154,527 | B2 | 4/2012 | Ciesla et al. |
| 8,169,332 | B2 | 5/2012 | Son |
| 8,169,416 | B2 | 5/2012 | Han |
| 8,228,306 | B2 | 7/2012 | Long |
| 8,253,711 | B2 | 8/2012 | Kim et al. |
| 8,274,495 | B2 | 9/2012 | Lee |
| 8,289,290 | B2 | 10/2012 | Klinghult |
| 8,334,849 | B2 | 12/2012 | Murphy et al. |
| 8,351,993 | B2 | 1/2013 | Nunes |
| 8,390,481 | B2 | 3/2013 | Pance et al. |
| 8,421,978 | B2 | 4/2013 | Wang et al. |
| 8,436,823 | B2 | 5/2013 | Kanehira et al. |
| 8,525,797 | B2 | 9/2013 | Liu et al. |
| 8,547,350 | B2 | 10/2013 | Anglin et al. |
| 8,577,289 | B2 | 11/2013 | Schlub et al. |
| 8,577,644 | B1 | 11/2013 | Ksondzyk et al. |
| 8,633,916 | B2 | 1/2014 | Bernstein et al. |
| 8,638,316 | B2 | 1/2014 | Badaye et al. |
| 8,669,963 | B2 | 3/2014 | Baker et al. |
| 8,704,787 | B2 | 4/2014 | Yamamoto et al. |
| 8,711,122 | B2 | 4/2014 | Wada et al. |
| 8,724,861 | B1 | 5/2014 | Sun |
| 8,730,189 | B2 | 5/2014 | Mamba et al. |
| 8,743,083 | B2 | 6/2014 | Zanone et al. |
| 8,760,413 | B2 | 6/2014 | Peterson et al. |
| 8,780,055 | B2 | 7/2014 | Marchand et al. |
| 8,780,062 | B2 | 7/2014 | Hibara et al. |
| 8,780,075 | B2 | 7/2014 | Yamano et al. |
| 8,805,517 | B2 | 8/2014 | Radivojevic et al. |
| 8,810,521 | B2 | 8/2014 | Ito |
| 8,830,205 | B2 | 9/2014 | Chang et al. |
| 8,913,031 | B2 | 12/2014 | Honda et al. |
| 8,922,523 | B2 | 12/2014 | Lynch et al. |
| 8,928,621 | B2 | 1/2015 | Ciesla et al. |
| 8,963,874 | B2 | 2/2015 | Li et al. |
| 8,970,507 | B2 | 3/2015 | Holbein et al. |
| 8,988,364 | B2 | 3/2015 | Lee |
| 9,001,080 | B2 | 4/2015 | Okayama et al. |
| 9,007,331 | B2 | 4/2015 | Sobel et al. |
| 9,024,898 | B2 | 5/2015 | Kim et al. |
| 9,024,907 | B2 | 5/2015 | Bolender |
| 9,030,440 | B2 | 5/2015 | Pope et al. |
| 9,057,653 | B2 | 6/2015 | Schediwy et al. |
| 9,086,768 | B2 | 7/2015 | Elias et al. |
| 9,088,282 | B2 | 7/2015 | Holenarsipur et al. |
| 9,092,129 | B2 | 7/2015 | Abdo et al. |
| 9,104,898 | B2 | 8/2015 | Case |
| 9,116,569 | B2 | 8/2015 | Stacy et al. |
| 9,207,134 | B2 | 12/2015 | Ting et al. |
| 9,218,472 | B2 | 12/2015 | Alameh et al. |
| 9,229,587 | B2 | 1/2016 | Kawaguchi et al. |
| 9,235,645 | B1 | 1/2016 | Ishizone et al. |
| 9,262,002 | B2 | 2/2016 | Momeyer et al. |
| 9,323,372 | B2 | 4/2016 | Kim et al. |
| 9,354,752 | B2 | 5/2016 | Kanehira et al. |
| 9,375,874 | B2 | 6/2016 | Lin et al. |
| 9,390,308 | B2 | 7/2016 | Mankowski et al. |
| 9,411,457 | B2 | 8/2016 | Perlin et al. |
| 9,411,458 | B2 | 8/2016 | Worfolk et al. |
| 9,430,102 | B2 | 8/2016 | Prest et al. |
| 9,454,268 | B2 | 9/2016 | Badaye et al. |
| 9,459,738 | B2 | 10/2016 | Lin et al. |
| 9,477,342 | B2 | 10/2016 | Daverman et al. |
| 9,490,804 | B2 | 11/2016 | Hanumanthaiah et al. |
| 9,494,473 | B2 | 11/2016 | Hanson et al. |
| 9,535,518 | B2 | 1/2017 | Kang et al. |
| 9,541,578 | B2 | 1/2017 | Shimata et al. |
| 9,542,589 | B2 | 1/2017 | Thammasouk et al. |
| 9,671,889 | B1 | 6/2017 | Miller et al. |
| 9,678,586 | B2 | 6/2017 | Reynolds |
| 9,697,409 | B2 | 7/2017 | Myers |
| 9,710,095 | B2 | 7/2017 | Hotelling |
| 9,715,290 | B2 | 7/2017 | Kim et al. |
| 9,715,301 | B2 | 7/2017 | Kuboyama et al. |
| 9,772,245 | B2 | 9/2017 | Besling et al. |
| 9,851,828 | B2 | 12/2017 | Richards et al. |
| 9,886,187 | B2 | 2/2018 | Seo et al. |
| 9,910,529 | B2 | 3/2018 | Chang et al. |
| 10,000,937 | B2 | 6/2018 | Bushnell et al. |
| 10,007,343 | B2 | 6/2018 | Kim et al. |
| 10,037,134 | B2 | 7/2018 | Lee et al. |
| 10,048,789 | B2 | 8/2018 | Filiz et al. |
| 10,068,728 | B2 | 9/2018 | Huska et al. |
| 10,139,959 | B2 | 11/2018 | Butler et al. |
| 10,139,975 | B2 | 11/2018 | Shutzberg et al. |
| 10,144,669 | B2 | 12/2018 | Weber |
| 10,162,444 | B2 | 12/2018 | Ogata et al. |
| 10,162,446 | B2 | 12/2018 | Kuboyama et al. |
| 10,168,814 | B2 | 1/2019 | Hotelling et al. |
| 10,198,123 | B2 | 2/2019 | Chen et al. |
| 10,209,148 | B2 | 2/2019 | Lyon et al. |
| 10,229,258 | B2 | 3/2019 | Kang et al. |

(56) References Cited

U.S. PATENT DOCUMENTS

| | | | |
|---|---|---|---|
| 10,250,289 B2 | 4/2019 | Jiang et al. |
| 10,259,289 B2 | 4/2019 | Jiang et al. |
| 10,262,179 B2 | 4/2019 | Miller et al. |
| 10,268,884 B2 | 4/2019 | Jones et al. |
| 10,295,562 B1 | 5/2019 | Bushnell et al. |
| 10,325,142 B2 | 6/2019 | He et al. |
| 10,367,252 B2 | 7/2019 | Ehman et al. |
| 10,379,657 B2 | 8/2019 | Filiz et al. |
| 10,386,970 B2 | 8/2019 | Filiz et al. |
| 2005/0005703 A1 | 1/2005 | Saito et al. |
| 2006/0197753 A1 | 9/2006 | Hotelling |
| 2007/0272919 A1 | 11/2007 | Mori et al. |
| 2008/0150901 A1 | 6/2008 | Lowles et al. |
| 2009/0015564 A1 | 1/2009 | Ye et al. |
| 2009/0066345 A1 | 3/2009 | Klauk et al. |
| 2009/0237374 A1 | 9/2009 | Li et al. |
| 2010/0045628 A1 | 2/2010 | Gettemy et al. |
| 2010/0117989 A1 | 5/2010 | Chang |
| 2010/0123686 A1 | 5/2010 | Klinghult et al. |
| 2010/0220065 A1 | 9/2010 | Ma |
| 2011/0012845 A1 | 1/2011 | Rothkopf et al. |
| 2011/0037706 A1 | 2/2011 | Pasquero et al. |
| 2011/0080373 A1 | 4/2011 | Wang et al. |
| 2011/0096013 A1 | 4/2011 | Krumpelman et al. |
| 2011/0216016 A1 | 9/2011 | Rosener |
| 2011/0235156 A1 | 9/2011 | Kothari et al. |
| 2012/0038577 A1 | 2/2012 | Brown et al. |
| 2012/0056826 A1 | 3/2012 | Kim et al. |
| 2012/0090757 A1 | 4/2012 | Buchan et al. |
| 2012/0092285 A1 | 4/2012 | Osborn et al. |
| 2012/0098760 A1 | 4/2012 | Chuang |
| 2012/0098767 A1 | 4/2012 | Takai et al. |
| 2012/0104097 A1 | 5/2012 | Moran et al. |
| 2012/0169612 A1 | 7/2012 | Alameh et al. |
| 2012/0188202 A1 | 7/2012 | Tsujino et al. |
| 2012/0274602 A1 | 11/2012 | Bita et al. |
| 2012/0287053 A1* | 11/2012 | Bos ............... G06F 3/04883 345/173 |
| 2012/0313863 A1 | 12/2012 | Hsu |
| 2012/0319987 A1 | 12/2012 | Woo |
| 2013/0162591 A1 | 6/2013 | Hidaka et al. |
| 2013/0176270 A1 | 7/2013 | Cattivelli et al. |
| 2013/0328575 A1 | 12/2013 | Ra et al. |
| 2014/0085213 A1 | 3/2014 | Huppi et al. |
| 2014/0085247 A1 | 3/2014 | Leung et al. |
| 2014/0111953 A1 | 4/2014 | McClure et al. |
| 2015/0135108 A1 | 5/2015 | Pope et al. |
| 2015/0153829 A1 | 6/2015 | Shiraishi |
| 2015/0185909 A1 | 7/2015 | Gecnuk |
| 2015/0185946 A1 | 7/2015 | Fourie |
| 2015/0268725 A1* | 9/2015 | Levesque ............ G06F 3/041 345/156 |
| 2016/0041648 A1 | 2/2016 | Richards |
| 2016/0062498 A1 | 3/2016 | Huppi et al. |
| 2016/0070404 A1 | 3/2016 | Kerr et al. |
| 2016/0098131 A1 | 4/2016 | Ogata et al. |
| 2016/0103544 A1 | 4/2016 | Filiz et al. |
| 2017/0038880 A1 | 2/2017 | Kinzer |
| 2017/0269751 A1 | 9/2017 | Cho et al. |
| 2018/0048058 A1 | 2/2018 | Ehman et al. |
| 2018/0138102 A1 | 5/2018 | Pan et al. |
| 2019/0025923 A1 | 1/2019 | Kim et al. |
| 2019/0154522 A1 | 5/2019 | Mori |
| 2019/0213377 A1 | 7/2019 | Miller et al. |

FOREIGN PATENT DOCUMENTS

| | | |
|---|---|---|
| CN | 1577385 | 2/2005 |
| CN | 1582453 | 2/2005 |
| CN | 1707415 | 12/2005 |
| CN | 1714336 | 12/2005 |
| CN | 101046720 | 10/2007 |
| CN | 101207971 | 6/2008 |
| CN | 101427468 | 5/2009 |
| CN | 101630210 | 1/2010 |
| CN | 101673001 | 3/2010 |
| CN | 101950224 | 1/2011 |
| CN | 102016780 | 4/2011 |
| CN | 201828892 | 5/2011 |
| CN | 102087432 | 6/2011 |
| CN | 102103445 | 6/2011 |
| CN | 102138120 | 7/2011 |
| CN | 102193699 | 9/2011 |
| CN | 102299166 | 12/2011 |
| CN | 102365608 | 2/2012 |
| CN | 102449583 | 5/2012 |
| CN | 102467308 | 5/2012 |
| CN | 102478985 | 5/2012 |
| CN | 102483673 | 5/2012 |
| CN | 103221906 | 7/2013 |
| CN | 104700102 | 6/2015 |
| CN | 204650590 | 9/2015 |
| EP | 2073107 | 6/2009 |
| EP | 2128747 | 12/2009 |
| EP | 2237142 | 10/2010 |
| EP | 2267791 | 12/2010 |
| EP | 2315102 | 4/2011 |
| EP | 2315186 | 4/2011 |
| EP | 2357547 | 8/2011 |
| EP | 2413224 | 2/2012 |
| EP | 2418561 | 2/2012 |
| EP | 2420918 | 2/2012 |
| EP | 2508960 | 10/2012 |
| EP | 2660688 | 11/2013 |
| EP | 2708985 | 3/2014 |
| GB | 2313195 | 11/1997 |
| JP | S61292732 | 12/1986 |
| JP | 2000200141 | 7/2000 |
| JP | 2005031425 | 2/2005 |
| JP | 2006134144 | 5/2006 |
| JP | 2007097842 | 4/2007 |
| JP | 2007310539 | 11/2007 |
| JP | 2010225031 | 10/2010 |
| JP | 2010244252 | 10/2010 |
| JP | 2011100364 | 5/2011 |
| JP | 2011134000 | 7/2011 |
| JP | 2011197991 | 8/2011 |
| JP | 2011180854 | 9/2011 |
| JP | 2011258043 | 12/2011 |
| JP | 2012064108 | 3/2012 |
| JP | 2012511360 | 5/2012 |
| JP | 2013131068 | 7/2013 |
| JP | 2014052997 | 3/2014 |
| KR | 1020070110114 | 11/2007 |
| KR | 1020100074005 | 7/2010 |
| WO | WO 97/018528 | 5/1997 |
| WO | WO 11/081882 | 7/2011 |
| WO | WO 11/156447 | 12/2011 |
| WO | WO 12/031564 | 3/2012 |
| WO | WO 12/147659 | 11/2012 |
| WO | WO 12/160844 | 11/2012 |
| WO | WO 13/083207 | 6/2013 |
| WO | WO 13/183191 | 12/2013 |
| WO | WO 14/018121 | 1/2014 |
| WO | WO 12/153555 | 7/2014 |
| WO | WO 14/124173 | 8/2014 |

OTHER PUBLICATIONS

Engineers Edge, Common Plastic Molding Design Material Specification, 2015, http://www.engineersedge.com/plastic/materials_common_plastic.htm, 3 pages.

Feist, "Samsung snags patent for new pressure sensitive touchscreens," posted on AndroidAuthority.com at URL: http://www.androidauthority.com/samsung-patent-pressure-sensitive-touchscreens-354860, Mar. 7, 2014, 1 page.

Widdle, "Measurement of the Poisson's ratio of flexible polyurethane foam and its influence on a uniaxial compression model," International Journal of Engineering Science, vol. 46, 2008, pp. 31-49.

U.S. Appl. No. 16/145,061, filed Sep. 27, 2018, Smith.

* cited by examiner

FORCE OR TOUCH SENSING ON A MOBILE DEVICE USING CAPACITIVE OR PRESSURE SENSING

CROSS-REFERENCE TO RELATED APPLICATIONS

This application is a nonprovisional of and claims the benefit under 35 U.S.C. § 119(e) of U.S. Provisional Patent Application No. 62/723,430, filed Aug. 27, 2018, entitled "Force Sensing with Capacitive Sensor in a System in Package," U.S. Provisional Patent Application No. 62/738, 831, filed Sep. 28, 2018, entitled "Force Sensing on a Mobile Device Using Capacitive and/or Pressure Sensing," and U.S. Provisional Patent Application No. 62/851,632, filed May 22, 2019, entitled "Touch Location Determination for a Device Immersed in a Fluid," the contents of which are incorporated herein by reference as if fully disclosed herein.

FIELD

The described embodiments relate generally to force or touch sensing on a mobile device. More particularly, some of the described embodiments relate to determining an amount of force applied to a device, or determining a location of a touch on a device, using measurements obtained from a capacitive force sensor and/or a pressure sensor, one or both of which may be disposed within an interior volume of the device. In some cases, the amount of force applied to the device or the location of the touch on the device may be determined using additional measurements, such as measurements obtained from a barometric pressure sensor, a temperature sensor, or other sensors.

BACKGROUND

A device such as a smartphone, tablet computer, or electronic watch may include a touch sensor that indicates where a display of the device is touched, and a force sensor that indicates an amount of force applied to the display by the touch. In some cases, the force sensor may be a capacitive force sensor. A capacitive force sensor may include first and second electrodes disposed in first and second flex circuits. The flex circuits may be separated by a compressible element or gap. As the amount of force applied to the display increases, the compressible element or gap is compressed and the electrodes disposed in the flex circuits move closer to one another, thereby decreasing the capacitance between the electrodes. The flex circuits may be coupled to circuitry (e.g., a microprocessor, an application-specific integrated circuit (ASIC), or a controller) that measures, amplifies, and digitizes the capacitance, and determines an amount of force corresponding to the capacitance.

SUMMARY

Some embodiments of the systems, devices, methods, and apparatus described in the present disclosure are directed to determining an amount of force applied to a device, or calibrating the sensors used to determine the amount of force, or adjusting the measurements obtained by one sensor using measurements obtained by another sensor. In some embodiments, the amount of force applied to the device may be determined using a capacitive force sensor and/or a pressure sensor disposed within an interior volume of the device. In some embodiments, the measurements obtained from the capacitive force sensor or pressure sensor may be selected or adjusted, for use in determining the amount of force applied to the device, using measurements obtained from another sensor or sensors (e.g., a barometric pressure sensor, a temperature sensor, or other sensors).

Some embodiments of the systems, devices, methods, and apparatus described in the present disclosure are directed to enabling a device that is used under water to determine where a user is touching the device. In particular, described systems, devices, methods, and apparatus may use a pressure sensor and one or more displacement sensors to determine where a user is touching a device when the device is used under water. For example, in some embodiments, a device may include a display associated with a touch sensor. When the device is not immersed in water, the touch sensor may indicate a location of a user's touch with respect to the display, and a pressure sensor and/or displacement sensor(s) positioned within the device (e.g., under the display) may be used to determine an amount of force associated with the touch. However, when the device is immersed in a fluid and the touch sensor becomes inoperable due to saturation of the touch sensor's pixels (e.g., a condition in which most or all of the touch sensor's pixels indicate the presence of a touch), measurements generated by the pressure sensor and displacement sensor(s) may be used to determine the location of a user's touch with respect to the display (e.g., instead of an output of the touch sensor).

In a first aspect, the present disclosure describes a device including a housing defining part of an interior volume and an opening to the interior volume; a cover mounted to the housing to cover the opening and further define the interior volume; a display mounted within the interior volume and viewable through the cover; and a SiP mounted within the interior volume. The SiP includes a self-capacitance sense pad adjacent a first surface of the SiP; a set of solder structures attached to a second surface of the SiP, the second surface opposite the first surface; and an integrated circuit (IC) coupled to the self-capacitance sense pad and configured to output, at one or more solder structures in the set of solder structures, a digital value related to a measured capacitance of the self-capacitance sense pad. The SiP is mounted within the interior volume with the first surface positioned closer to the cover than the second surface.

In another aspect, the present disclosure describes a device including a housing defining part of an interior volume and an opening to the interior volume; a cover mounted to the housing to cover the opening and further define the interior volume; a capacitive force sensor disposed within the interior volume and configured to generate a first set of one or more signals related to an amount of force applied to the cover; a pressure sensor disposed within the interior volume and configured to generate a second set of one or more signals related to the amount of force applied to the cover; and a processor configured to determine the amount of force applied to the cover using at least one of the first set of one or more signals or the second set of one or more signals.

In still another aspect of the disclosure, a method of determining an amount of force applied to a device having a display is described. The method includes determining a sealing state of an interior volume including the display of the device; determining the amount of force applied to the device using a first set of one or more signals when the sealing state is determined to be a first sealing state; and determining the amount of force applied to the device using a second set of one or more signals when the sealing state is determined to be a second sealing state. The first set of one or more signals is provided by a capacitive force sensor disposed within the interior volume, and the second set of one or more signals is provided by a pressure sensor disposed within the interior volume.

The disclosure also describes a device including a ground element and a SiP. The SiP includes a first self-capacitance sense pad adjacent a first surface of the SiP and separated from the ground element by a compressible gap; a second self-capacitance sense pad separated from the first self-capacitance sense pad by a non-compressible gap; a set of solder structures attached to a second surface of the SiP, the second surface opposite the first surface and positioned farther from the ground element than the first surface; and an IC coupled to the first self-capacitance sense pad and the second self-capacitance sense pad. The IC is configured to measure capacitances of the first self-capacitance sense pad and the second self-capacitance sense pad; calibrate a force sensing operation using the measured capacitances of the first self-capacitance sense pad and the second self-capacitance sense pad; and output, at one or more solder structures in the set of solder structures, a digital value related to a measured capacitance of the first self-capacitance sense pad.

In another aspect of the disclosure, a device includes a housing, a cover, an internal pressure sensor, a barometric pressure sensor, and a processor. The housing defines part of an interior volume and an opening to the interior volume. The cover is mounted to the housing to cover the opening and further define the interior volume. The internal pressure sensor is disposed within the interior volume and configured to generate a first set of one or more signals related to an amount of force applied to the cover. The barometric pressure sensor is disposed within the housing and configured to generate a second set of one or more signals related to an ambient pressure of the device. The processor is configured to determine the amount of force applied to the cover using the first set of one or more signals and the second set of one or more signals.

In another aspect, the present disclosure describes a device including a housing, a cover, and a pressure sensor. The housing defines part of an interior volume and an opening to the interior volume, and the cover is mounted to the housing to cover the opening and further define the interior volume. The pressure sensor is disposed within the interior volume and configured to generate a set of one or more pressure samples related to an amount of force applied to the cover. The processor is configured to determine, using at least one signal from the set of one or more signals, whether the amount of force applied to the cover exceeds a $\tau$ calibration threshold, where $\tau$ is a time it takes the interior volume to reach a steady state pressure following an application or release of a steady-state force to the cover; calibrate $\tau$ during field operation of the device, in response to determining the amount of force applied to the cover exceeds the $\tau$ calibration threshold; and determine the amount of force applied to the cover, after calibrating $\tau$, using the set of one or more pressure samples and the calibrated $\tau$.

A device having a housing, a cover, an internal pressure sensor, a temperature sensor, and a process is described in yet another aspect of the disclosure. The housing defines part of an interior volume and an opening to the interior volume, and the cover is mounted to the housing to cover the opening and further define the interior volume. The internal pressure sensor is disposed within the interior volume and configured to generate a first set of one or more signals related to an amount of force applied to the cover. The temperature sensor is disposed within the housing and configured to generate a second set of one or more signals related to a temperature within the interior volume. The processor is configured to generate an adjusted first set of one or more signals using the second set of one or more signals, and determine the amount of force applied to the cover using at least one adjusted signal from the adjusted first set of one or more signals.

In another aspect of the present disclosure, another device is described. The device includes a housing defining part of an interior volume and an opening to the interior volume; a cover mounted to the housing to cover the opening and further define the interior volume; a sealed pocket disposed between the cover and the housing and operating as a spring that opposes an amount of force applied to the cover; a pressure sensor disposed within the interior volume and configured to generate a set of one or more signals related to the amount of force applied to the cover; and a processor configured to determine the amount of force applied to the cover using at least one signal of the first set of one or more signals.

In another aspect, the present disclosure describes a device that includes a display, a set of structural components, a pressure sensor, a set of displacement sensors, a fluid immersion detector, and a processor. The set of structural components may be disposed about the display, and may define a cover over the display. The set of structural components may also define a cavity beneath the display. The pressure sensor may be disposed within the cavity. The set of displacement sensors may include a first displacement sensor and a second displacement sensor positioned at different locations beneath the cover. The processor may be configured to determine a location of a touch on the cover, using signals received from the pressure sensor and the set of displacement sensors, when the fluid immersion detector indicates the device is immersed in a fluid.

In another aspect, the present disclosure describes a device that includes a housing, a pressure sensor, a set of displacement sensors, and a processor. The housing may define a volume interior to the device. The pressure sensor may be disposed within the volume, and may be configured to generate a time-dependent sequence of pressure measurements in response to a force applied to the device while the device is immersed in a fluid. The set of displacement sensors may include at least a first displacement sensor configured to generate a first time-dependent sequence of displacement measurements in response to the force. The processor may be configured to determine a location where the force is applied to a surface of the device using at least the time-dependent sequence of pressure measurements and the first time-dependent sequence of displacement measurements.

In another aspect of the disclosure, the present disclosure describes a method of determining a location of a touch on a surface of a device when the device is immersed in a fluid. The method may include receiving from a pressure sensor within the device, and in response to a force applied to the device while the device is immersed in the fluid, a time-dependent sequence of pressure measurements. The method may also include receiving, from a first displacement sensor within the device, and in response to the force, a first time-dependent sequence of displacement measurements. The first time-dependent sequence of displacement measurements may include displacement measurements for a first location on the surface. The method may further include determining the location of the touch using at least the time-dependent sequence of pressure measurements and the first time-dependent sequence of displacement measurements.

In addition to the aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
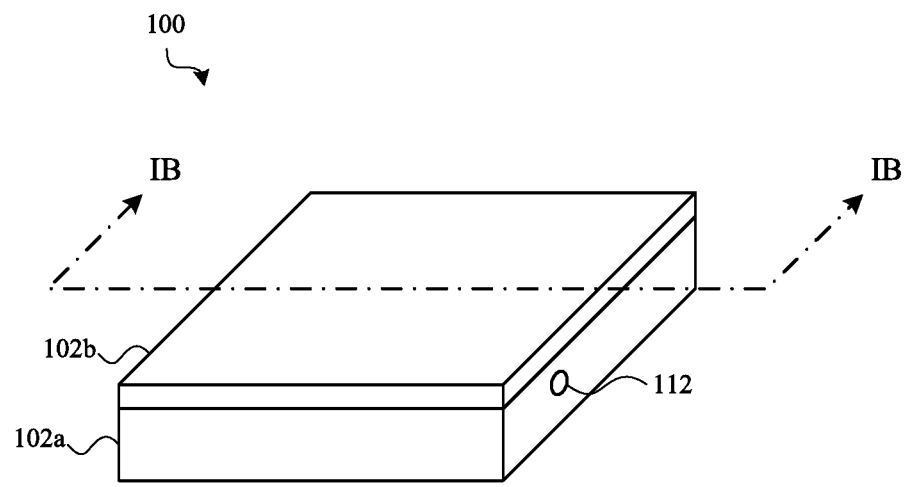
FIGS. 1A and 1B show an example of a device that includes a set of structural components defining an interior volume.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Described herein are techniques that enable the force of a touch on a device to be determined. Some of the techniques may also be used to determine the proximity of a user's finger or stylus to a device. The techniques employ capacitive force sensing, pressure sensing, or a combination thereof. Capacitive force sensing may be better suited to determining an amount of force applied to a device when the device has an interior volume that is loosely sealed or not sealed, or after the pressure within the interior volume has reached a steady state following application of the force to the device. Pressure sensing may be better suited to determining an amount of force applied to a device when the device has an interior volume that is well sealed or minimally vented, or when a force is initially applied to the device and the pressure within the interior volume experiences a spike before the pressure exponentially decreases to a steady state. In some of the techniques described herein, an amount of force applied to a device may be determined using a combination of capacitive force sensing and pressure sensing, or by using capacitive force sensing under some conditions and pressure sensing under other conditions. In some cases, the type of force sensing used to determine a force applied to a device may change over the lifetime of the device and/or in response to different conditions (e.g., environments) to which the device is exposed. In some techniques, an amount of force applied to a device may be additionally determined using barometric pressure sensing, temperature sensing, or other types of sensing.

Capacitive force sensors that may be easier or cheaper to construct are also described. For example, a capacitive force sensor embodied in a SiP is described. The SiP may contain a self-capacitance sense pad (or mutual-capacitance sense pad), and an IC and passives for sensing, amplifying, digitizing, or otherwise processing a capacitance of the capacitance sense pad, which capacitance is related to an amount of force sensed by the capacitive force sensor. Capacitive force sensors embodied in SiPs are self-contained (e.g., they do not require alignment of different flex circuits containing different electrodes, and connection of the electrodes to an IC). Capacitive force sensors embodied in SiPs may also contain an electrode or other components for calibrating a force sensing operation on-board the SiP. At least in part because capacitive force sensors embodied in SiPs are self-contained, they may be opportunistically positioned within a device.

Various techniques for calibrating a force sensor, or for calibrating or adjusting a method for determining a force applied to a device, are also described.

Also described herein are techniques that enable a device that is used under water (or otherwise used while immersed in a fluid) to determine where a user is touching the device. The techniques are described primarily with respect to determining the location of a user's touch with reference to a display (i.e., with reference to a surface of the display). However, the techniques may in some cases be used to determine the location of a user's touch on a back, side, or non-display surface of the device.

These and other techniques are described with reference to FIGS. 1-47. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. The use of alternative terminology, such as "or", is intended to indicate different combinations of the alternative elements. For example, A or B is intended to include, A, or B, or A and B.

Figure 1B:
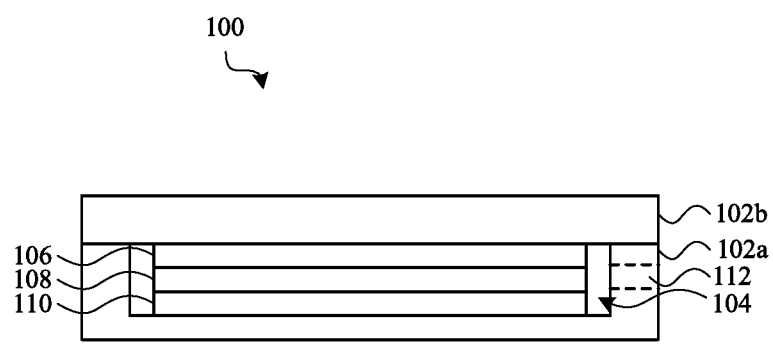

As shown in FIGS. 1A and 1B, a device 100 may include a set of structural components 102 that define an interior volume 104. FIG. 1A shows an isometric view of the device 100, and FIG. 1B shows a cross-section of the device 100.

The set of structural components 102 may include, for example, a housing 102a and a cover 102b. Each structural component (e.g., each of the housing 102a and the cover 102b) may define a part of the interior volume 104. The housing 102a may further define an opening to the interior volume 104. In some cases, the housing 102a may be a multi-part housing, such as a housing formed by a support plate and one or more edge members extending from the support plate to support the cover 102b. In some cases, the cover 102b may be a transparent cover, such as a glass or plastic cover. The structural components may be semi-permanently or detachably joined to one another by a set of fasteners, adhesives, seals, or other components.

In some embodiments, the interior volume 104 may be sealed to prevent gases (e.g., air) or fluids (e.g., water) from entering or leaving the interior volume 104. In other embodiments, the interior volume 104 may not be sealed, thereby allowing gases and possibly fluids to enter or leave the interior volume 104. In some embodiments, the interior volume 104 may be vented. For example, an optional port 112 may be defined in one or more of the structural components 102, and the port may allow gases (e.g., air) but not fluids (e.g., water) to flow between the interior volume 104 and an ambient environment of the device 100. During the lifetime of the device 100, the venting state (or sealing state) of the device 100 (e.g., sealed, not sealed, or vented) may change due to clogging of the port 112, breakage of a seal between the cover 102b and the housing 102a, breakage of the cover 102b, use of the device 100 under water, and so on.

As shown in FIG. 1B, a touch sensing system 106 (i.e., a system including a touch sensor), a force sensing system 108 (i.e., a system including a force sensor), a processor 110, or other components may be mounted to the set of structural components 102 (e.g., to the housing 102a and/or cover 102b) and positioned partly or wholly within the interior volume 104. Some of the components (e.g., the processor 110) may alternatively be positioned entirely outside the interior volume 104 (not shown). The touch sensing system 106 may include, for example, a set of capacitive touch sensing elements, a set of resistive touch sensing elements, or a set of ultrasonic touch sensing elements. When a user of the device 100 touches the cover, the touch sensing system 106 (or touch sensor) may detect one or more touches on the cover 102b and determine locations of the touches on the cover 102b. The touches may include, for example, touches by a user's finger or stylus.

The force sensing system 108 may include, for example, a set of capacitive force sensing elements (i.e., capacitive force sensors) or other types of displacement sensors, a set of resistive force sensing elements (or resistive force sensors), or one or more pressure transducers (i.e., one or more pressure sensors). When a user of the device 100 presses on the cover 102b (i.e., applies a force to the cover 102b), the force sensing system 108 may determine an amount of force applied to the cover 102b (or in some cases, the amount of force applied to a side or sides of the housing 102a, a surface of the housing 102a opposite the cover 102b, and so on). In some embodiments, the force sensing system 108 may be used alone or in combination with the touch sensing system 106 to determine a location of an applied force, or an amount of force associated with each touch in a set of multiple contemporaneous touches.

The processor 110 may be configured to operate the touch sensing system 106 or the force sensing system 108, and may be configured to receive, evaluate, propagate, or respond to signals obtained from the touch sensing system 106 or the force sensing system 108.

In embodiments in which the device 100 is vented, the port 112 may be covered by an air permeable and fluid impermeable membrane that prevents fluid (e.g., water) from entering the interior volume 104, thus enabling the device 100 to be used while immersed in a fluid. However, when the device 100 is used while immersed (e.g., under water), the presence of water or water pressure on the cover 102b may cause a set of pixels of the touch sensing system 106 (e.g., all or a majority of the pixels of a touch sensor) to saturate. When all or a majority of the pixels saturate, indicating the presence of something touching numerous or all locations of the cover 102b, the touch sensing system 106 may be unable to distinguish a user's touch from water pressure or otherwise identify the location of a user's touch on the cover 102b. In these cases, the force sensing system 108, instead of the touch sensing system 106, may be used to detect the location of a user's touch on the cover 102b (e.g., as described with reference to FIGS. 37-46).

Figure 2A:
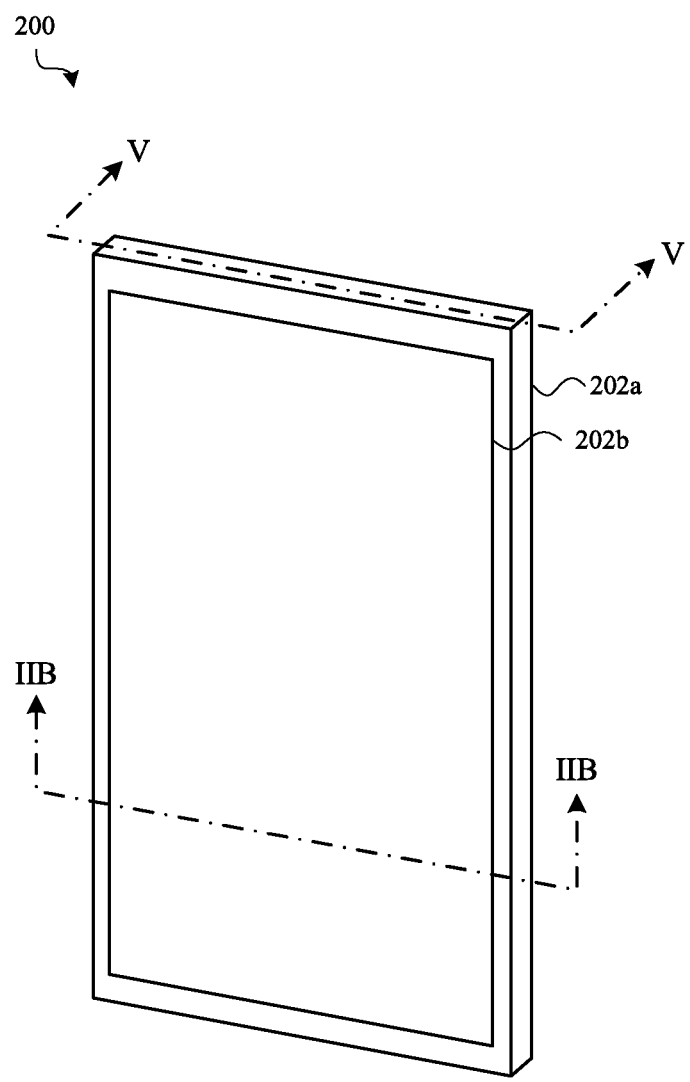
FIGS. 2A and 2B show an example device, which device may be an example of the device described with reference to FIGS. 1A and 1B.
Figure 2B:
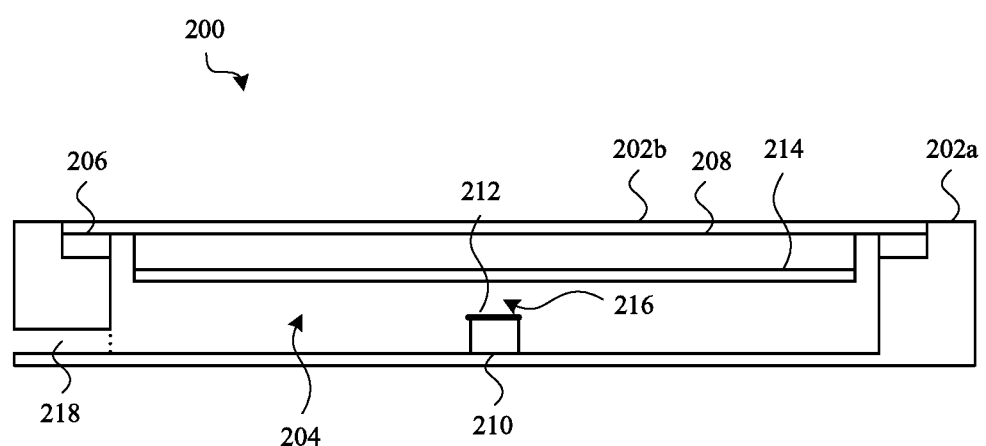

FIGS. 2A and 2B show an example device 200 (e.g., an electronic device, or smartphone), which device 200 may be an example of the device 100 described with reference to FIGS. 1A-1B. FIG. 2A shows an isometric view of the device 200, and FIG. 2B shows a cross-section of the device 200.

The device 200 may include a set of structural components 202 that define a cavity or interior volume 204 of the device 200. By way of example, the set of structural components 202 may include a housing 202a and a cover 202b. In some embodiments, the housing 202a and cover 202b may be configured as described with reference to FIGS. 1A-1B. The cover 202b may be mounted to the housing 202a to cover an opening defined by the housing 202a (i.e., an opening into the interior volume 204). The cover 202b may be mounted to the housing 202a using fasteners, adhesives, seals, or other components. By way of example, the cover 202b is shown to be mounted to the housing 202a by a gasket 206 that separates the cover 202b from the housing 202a (see, FIG. 2B). A first adhesive may be disposed between the gasket 206 and the housing 202a, and a second adhesive (which may have the same or different composition as the first adhesive) may be disposed between the cover 202b and the gasket 206.

The interior volume 204 may be sealed, or not sealed, or vented, as described with reference to FIGS. 1A and 1B. In some embodiments, the interior volume 204 may be vented by means of one or more ports 218 in the housing 202a or elsewhere, which ports 218 may allow gas or fluid trapped within the interior volume 204 to escape, but not instantaneously. In other embodiments, the interior volume may be vented by one or more ports 218 that allow gas or fluid trapped within the interior volume 204 to escape instantaneously. In some embodiments, the port(s) 218 may allow air (and in some cases water) to flow out of the interior volume 204 and into an ambient environment of the device 200. The same port(s) 218 may allow air (but not water) to pass from the ambient environment into the interior volume 204.

A display 208 may be mounted within the interior volume 204. The display may be viewable through the cover 202b. In some embodiments, a display stack or device stack (hereafter referred to as a "stack") including the display 208 may be attached to an interior surface of the cover 202b and extend into the interior volume 204. In some cases, the stack may include a touch sensor (e.g., a grid of capacitive touch sensing elements formed at the intersections of different electrodes in orthogonal sets of electrodes), or other layers of optical, mechanical, electrical, or other types of components.

A capacitive force sensor 210 may be disposed within the interior volume 204. The capacitive force sensor 210 may be configured to generate a first set of one or more signals related to an amount of force applied to the cover 202b (e.g., by a user's finger or stylus). In some embodiments, the capacitive force sensor 210 may be provided by a SiP mounted within the interior volume 204. For example, a SiP may include a self-capacitance sense pad 212 (i.e., an electrode) adjacent (or on) a first surface of the SiP, a set of solder structures (e.g., solder balls or solder posts) attached to a second surface of the SiP (opposite the first surface), and an IC coupled to the self-capacitance sense pad 212. The IC may be configured to output, at one or more of the solder structures, a digital value related to a measured capacitance of the self-capacitance sense pad 212 (i.e., the capacitive force sensor 210 may be configured in a self-capacitance sensing mode). The digital value may be indicative of a force or amount of force applied to the cover 202b. The SiP may be mounted upside down with respect to the cover 202b, such that the first surface of the SiP is positioned closer to the cover 202b than the second surface of the SiP. The first surface of the SiP may be oriented parallel (or substantially parallel to) the exterior surface of the cover 202b.

The SiP may be opportunistically positioned within the interior volume 204 (e.g., the SiP may be positioned where space exists or where convenient). For example, the SiP may be attached to a logic board (e.g., a printed circuit board) mounted within the interior volume 204, or attached to an available area on a flex circuit used for force sensing or other purposes. The SiP need not be positioned under the center of the cover 202b, but may be. The solder structures may be reflowed to electrically and mechanically attach the SiP to another structure (e.g., a logic board or flex circuit). Some solder structures of the SiP may be used to provide power, signals, or instructions to the SiP (e.g., to the IC).

In some embodiments, and as shown in FIG. 2B, a ground element 214 may be mounted within the interior volume 204, and the self-capacitance sense pad 212 may be separated from the ground element 214 by a compressible gap 216. The ground element 214 may be a layer of the stack (or be provided within a layer of the stack), and may be positioned between the display 208 and the self-capacitance sense pad 212. Alternatively, the ground element 214 may be positioned within the display 208, or between the display 208 and the cover 202b. By way of example, FIG. 2B shows the ground element 214 positioned between the display 208 and the self-capacitance sense pad 212. In some examples, the ground element 214 may be provided on a substrate such as a PCB (e.g., a display PCB), on a flex circuit (e.g., a display flex circuit, a touch sensor flex circuit, or a camera flex circuit), or on a surface of a substrate such as the cover 202b. When a user applies a force to the cover 202b, the distance between the ground element 214 and the self-capacitance sense pad 212 may decrease, thus changing the capacitance of the self-capacitance sense pad 212 and enabling the force (and in some cases an amount of the force) to be detected by the IC within the SiP. Different amounts of force applied to the cover 202b may compress the compressible gap 216 to different extents. In alternative embodiments, and as described with reference to FIGS. 15A-15C, the capacitive force sensor 210 may be configured in a mutual-capacitance sensing mode, and the ground element 214 may instead be a conductor through which a drive waveform is propagated.

In some embodiments, the ground element 214 may not be provided, or may not be provided over the self-capacitance sense pad 212, and the capacitance of the self-capacitance sense pad 212 may change in relation to the proximity of a user's finger or conductive stylus to the self-capacitance sense pad 212. In these embodiments, the SiP may function as a capacitive proximity sensor instead of a capacitive force sensor, and the IC may be configured to output, at one or more of the solder structures, a digital value indicative of a proximity of a user or device (e.g., a finger or a stylus) to the cover 202b. Different proximities of the user or device to the cover 202b may produce different capacitances at the self-capacitance sense pad 212.

In some alternative embodiments, the SiP may be mounted within the interior volume 204 with the first surface oriented toward an edge or the back of the device 200. With these orientations, the SiP may be used to sense a force, amount of force, or proximity of a user or device to the edge or back of the device 200.

Although FIGS. 2A and 2B show a particular form-factor and layout for the device 200, the structures and techniques described with reference to FIGS. 2A-2B may be used to deploy capacitive force or proximity sensing in almost any kind of device, including, for example, a tablet computer or electronic watch. In some embodiments, capacitive force sensing may be deployed in a form factor other than in a SiP. For example, a capacitance sense pad may be disposed on a printed circuit board (PCB) or other substrate, adjacent an ASIC or other controller that senses a capacitance of the capacitance sense pad (see, e.g., FIG. 15D). As another example, a capacitance sense pad may be disposed on a semiconductor wafer (i.e., a semiconductor "chip"), and a circuit for sensing the capacitance of the capacitance sense pad may be formed on the wafer. PCBs or wafers may occupy less z space than a SiP, but may increase the size of the gap 216. In some embodiments, a PCB or wafer may be elevated using a standoff or disposed on top of another component that positions it closer to the ground element 214 or cover 202b. A wafer may provide the smallest form factor for a capacitance sense pad and related circuitry, but at a higher cost than a PCB or SiP implementation.

FIGS. 3A-3D show various examples of a capacitive force sensor (or capacitive proximity sensor) embodied in a SiP. In some embodiments, the capacitive force sensor or SiP described with reference to FIG. 2B may be configured as described with reference to one of FIGS. 3A-3C.

Figure 3A:
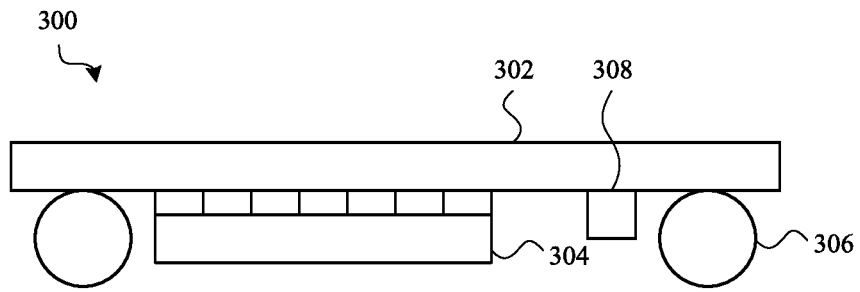
FIGS. 3A-3D show various examples of a capacitive force sensor (or capacitive proximity sensor) embodied in a SiP.

FIG. 3A shows a SiP 300 having a substrate 302, an ASIC 304 that is electrically and mechanically attached to the substrate 302, a set of solder balls 306 attached to the substrate 302, and a set of passives 308 (e.g., resistors, capacitors, and so on) attached to the substrate 302, ASIC 304, or solder balls 306. The substrate 302 may include alternating metal and dielectric layers, as shown, for example, in FIGS. 4A-4B. The metal layers may electrically couple the solder balls 306 to the ASIC 304 and provide one or more self-capacitance sense pads on or near the upper surface of the substrate 302 (i.e., on a surface of the substrate opposite a surface to which the ASIC 304 is attached). In some embodiments, the solder balls 306 may include copper clad solder balls (CCSBs). In some embodiments, the solder balls 306 may include tin-silver-copper (SAC) solder balls.

Figure 3B:
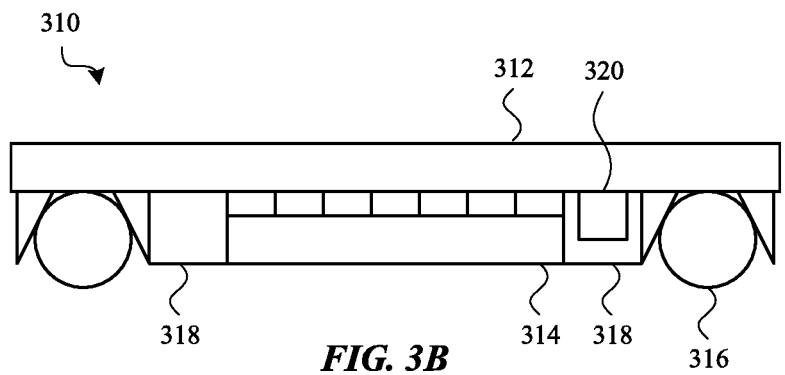

FIG. 3B shows a SiP 310 having a substrate 312, an ASIC 314 that is electrically and mechanically attached to the substrate 312, a set of solder balls 316 attached to the substrate 312, and a set of passives 320 (e.g., resistors, capacitors, and so on) attached to the substrate 312, ASIC 314, or solder balls 316. The SiP 310 may be configured similarly to the SiP 300 described with reference to FIG. 3A, but may include an underfill 318 (e.g., a resin or plastic) that surrounds the ASIC 314 and provide alignment bosses for the solder balls 316.

Figure 3C:
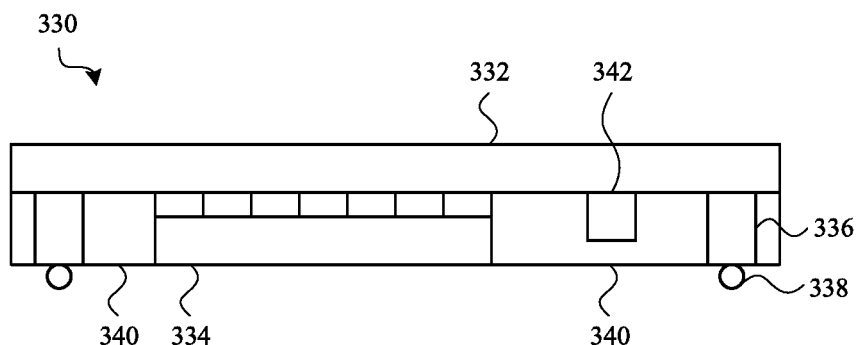

FIG. 3C shows a SiP 330 having a substrate 332, an ASIC 334 that is electrically and mechanically attached to the substrate 332, a set of vias 336 that are electrically connect metal pads or traces in the substrate 332 to a set of solder balls 338, and a set of passives 342 (e.g., resistors, capacitors, and so on) attached to the substrate 332, ASIC 334, or solder balls 338. The substrate 332 may be configured similarly to the substrate 302 described with reference to FIG. 3A. An underfill 340 (e.g., a resin or plastic) may surround the ASIC 334, and the vias 336 may be formed through the underfill 340. In some embodiments, the vias 336 may include copper, and the solder balls 338 may include CCSBs or SAC solder balls.

Figure 3D:
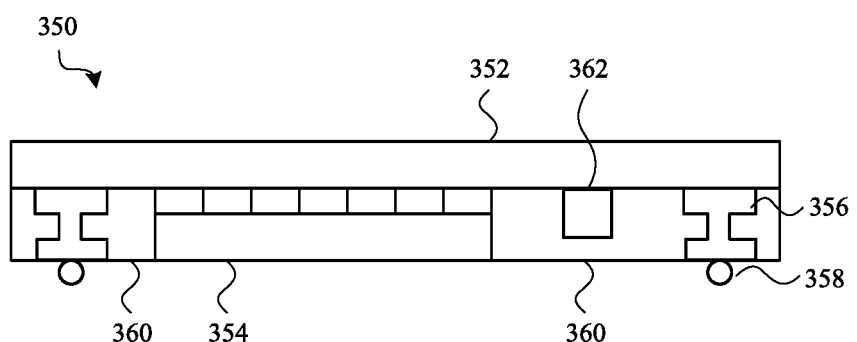

FIG. 3D shows a SiP 350 having a substrate 352, an ASIC 354 that is electrically and mechanically attached to the substrate 352, and a set of embedded bars (E-Bars) 356 that are electrically connect metal pads or traces in the substrate 352 to a set of solder balls 358. The substrate 352 may be configured similarly to the substrate 302 described with reference to FIG. 3A. An underfill 360 (e.g., a resin or plastic) may surround the ASIC 354 and the E-Bars 356. In some embodiments, the E-Bars 356 may include copper, and the solder balls 358 may include CCSBs or SAC solder balls.

Figure 4A:
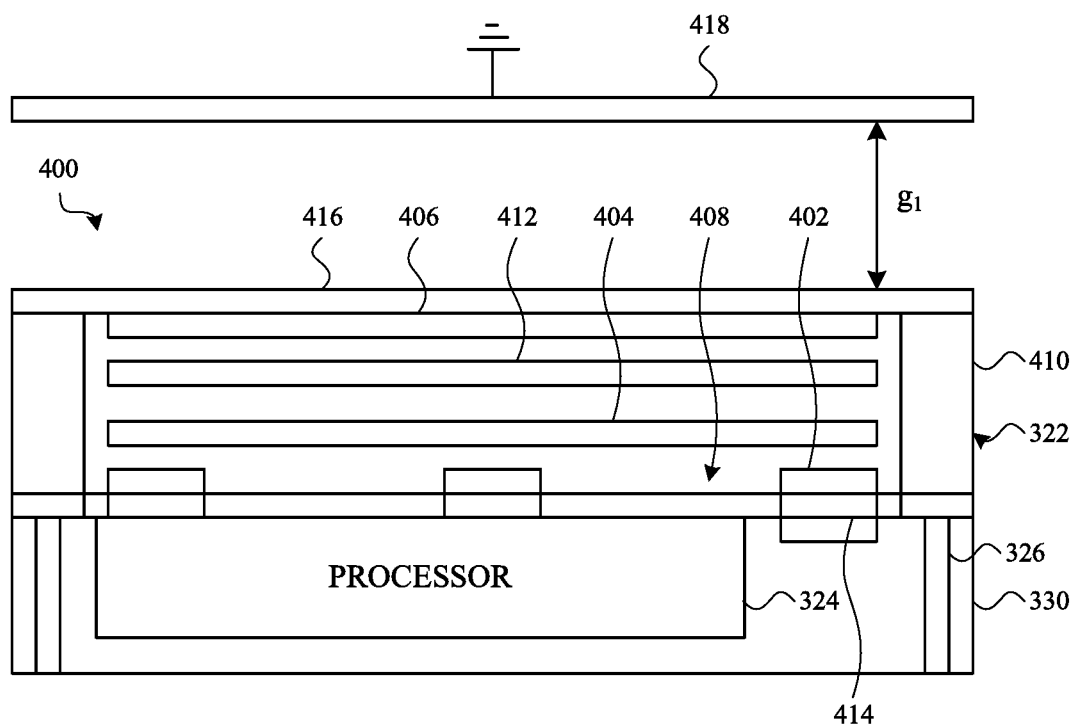
FIG. 4A shows an enlarged cross-section of the multi-layer SiP substrate and IC described with reference to any of FIGS. 3A-3D.

FIG. 4A shows an enlarged cross-section 400 of the multi-layer SiP substrate 322 and IC 324 (or ASIC) described with reference to any of FIG. 3C. However, any of the substrates described with reference to FIGS. 3A-3D may be configured as shown in FIG. 4A. As shown, the substrate 322 may include a signal routing layer 402, an alternating current (AC) shield layer 404, and a self-capacitance sense pad 406, each layer of which may be separated by a dielectric 408. The signal routing layer 402 may route signals between the IC 324 and the vias 326 that connect to the SiP's solder structures. The AC shield layer 404 may be positioned between the self-capacitance sense pad 406 and the IC 324.

The substrate 322 may also include vertical AC shielding, such as an AC shield 410 that surrounds (or substantially surrounds) the self-capacitance sense pad 406 and, in some cases and as shown, all of the conductive layers of the substrate 322.

Optionally, the substrate 322 may also include a second self-capacitance sense pad 412. The first and second self-capacitance sense pads 406, 412 may be disposed in different layers or planes, and the second self-capacitance sense pad 412 may be used to calibrate a force sensing operation of the SiP. In some embodiments, the second self-capacitance sense pad 412 may be disposed between the first self-capacitance sense pad 406 and the IC 324, and the AC shield 410 may be positioned around both the first and second self-capacitance sense pads 406, 412. The AC shield layer 404 may be positioned between the first and second self-capacitance sense pads 406, 412 and the IC 324. In alternative embodiments, the first and second self-capacitance sense pads 406, 412 may partially overlap or not overlap. In some embodiments, the functions of the self-capacitance sense pads 406, 412 may be reversed (e.g., the self-capacitance sense pad 406 that is farther from the IC 324 may be used to calibrate the capacitive force sensor).

The substrate 322 may be electrically and mechanically connected to the IC 324 and vias 326 by a conductive adhesive or solder 414. The AC shield layer 404 and vertical AC shield 410 may be electrically connected to a via 326 or solder structure, which in turn may be electrically connected to a device ground.

In some embodiments, the self-capacitance sense pad 406 may be covered by an oxide or other dielectric coating 416.

The SiP containing the substrate 322 and IC 324 may be mounted within a device such that the self-capacitance sense pad 406 is separated from a ground element 418 by a gap of height $g_1$.

Figure 4B:
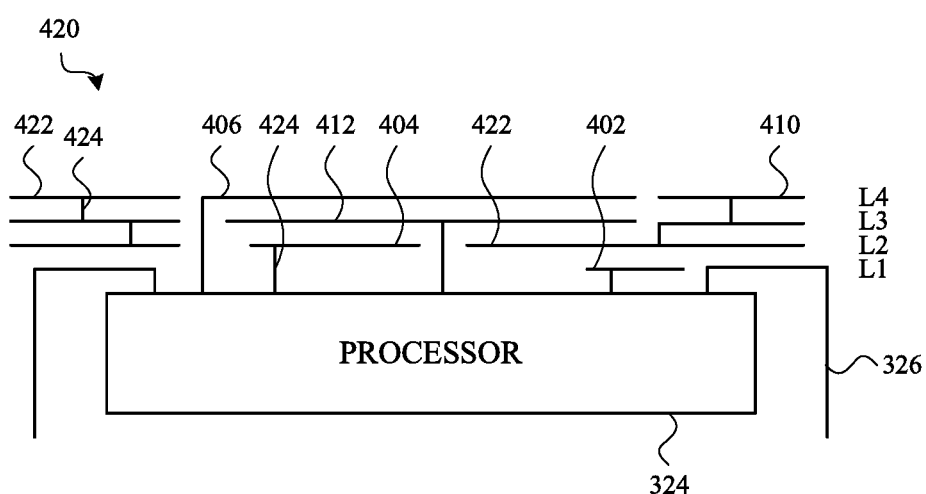
FIG. 4B shows a schematic view of the conductive layers described with reference to FIG. 4A.

FIG. 4B shows a schematic view 420 of the conductive layers described with reference to FIG. 4A. As shown, the signal routing layer 402 (or a metal layer 1 (L1)) may route power and ground from the solder structures of the SiP to the IC 324. The signal routing layer 402 may also route digital signals to or from the IC 324.

Conductive traces 422 in each of second, third, and fourth metal layers (L2, L3, and L4), and vias 424 that electrically connect the conductive traces through the dielectric, may be electrically connected to a system ground external to the chip by means of conductive traces in the IC that electrically connect to the SiP's solder structures. These grounded traces 422 and vias 424 may provide AC shielding for the self-capacitance sense pad 406 and an optional second self-capacitance sense pad 412.

The self-capacitance sense pad 406 may be coupled to the IC 324 by one or more vias that extend through the dielectric and AC shielding 404. The optional second self-capacitance sense pad 412 may also be coupled to the IC 324 by one or more vias that extend through the dielectric and AC shielding 404.

Figure 5:
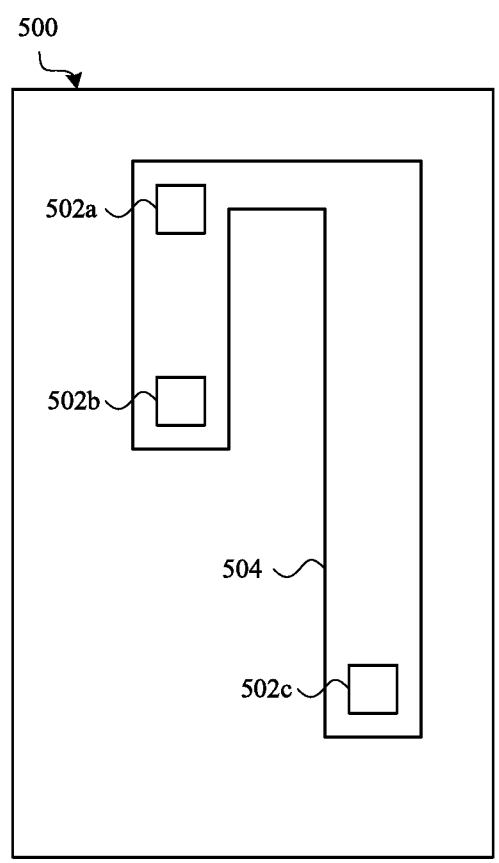
FIG. 5 shows a plurality of capacitive force sensors within a device, each included in a different SiP.

As shown in FIG. 5, a plurality of capacitive force sensors, each included in a different SiP 502a, 502b, 502c, may be opportunistically mounted at various locations within a device 500 (e.g., at various locations under a cover of the device 500). The locations may be uniformly or non-uniformly distributed within the device 500. Similarly, capacitive proximity sensors may be uniformly or non-uniformly distributed within a device. A combination of one or more capacitive force sensors and one or more capacitive proximity sensors may also be uniformly or non-uniformly distributed within a device.

In some embodiments, multiple SiPs 502a, 502b, 502c containing capacitive force sensors or proximity sensors (e.g., at least first and second SiPs) may be oriented in the same or different ways within an interior volume, and may be mechanically and electrically coupled to the same side of a flex circuit 504 or printed circuit board. In some embodiments, multiple SiPs 502a, 502b, 502c containing capacitive force sensors or proximity sensors may be mechanically and electrically coupled to different flex circuits or printed circuit boards.

Figure 6A:
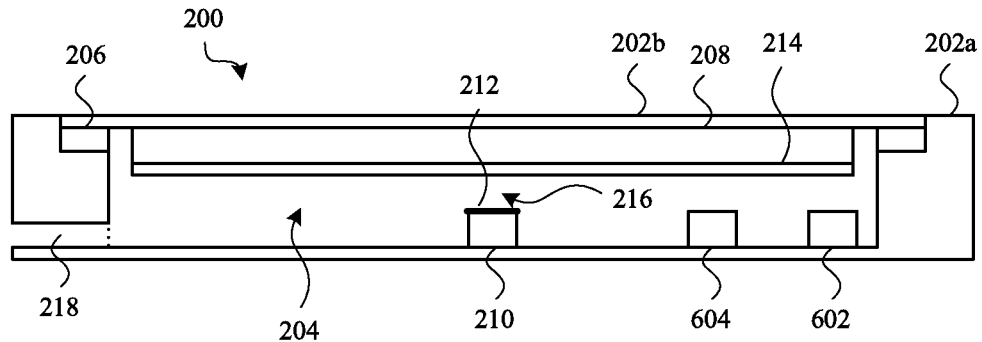
FIGS. 6A-6C show an example alternative cross-section of the device described with reference to FIG. 2A.
Figure 6B:
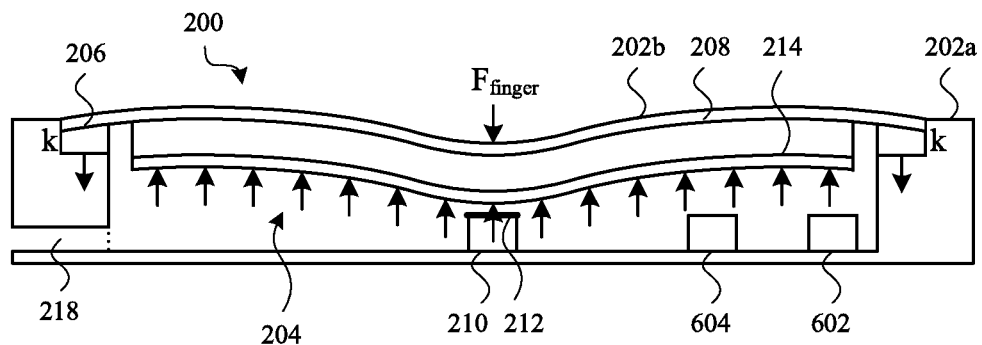
Figure 6C:
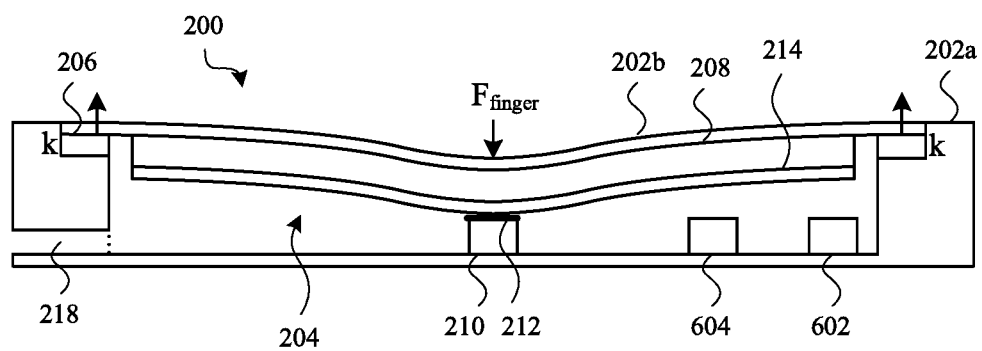

FIGS. 6A-6C show an example alternative cross-section of the device 200 described with reference to FIG. 2A. FIG. 6A shows the cross-section in the absence of a force applied to the cover 202b, and FIGS. 6B-6C show the cross-section after a force is applied to the cover 202b.

The cross-section shown in FIGS. 6A-6C differs from the cross-section described with reference to FIG. 2B in that the cross-section includes a pressure sensor 602 disposed within the interior volume, in addition to another capacitive force sensor 604. The pressure sensor 602 may be configured to generate a second set of one or more signals related to an amount of force applied to the cover 202b. In some embodiments, the device may include a plurality of capacitive force sensors 210, 604 (shown) or a plurality of pressure sensors (not shown).

One or more (or all) of the capacitive force sensors 210, 604 may be constructed and positioned as described with reference to FIGS. 2A-2B. In some examples, the pressure sensor 602 may be a capacitive pressure sensor or resistive (e.g., strain gauge) pressure sensor.

A processor within the device 200 may be configured to determine an amount of force applied to the cover 202b using a first set of one or more signals generated by a capacitive force sensor 210 (or by a set of multiple capacitive force sensors 210, 604) or the second set of one or more signals generated by the pressure sensor 602 (or by a set of multiple pressure sensors). In some cases, the processor may determine the amount of force applied to the cover 202b using only the first set of signals or only the second set of signals, and the processor may be configured to use one or the other set in response to evaluating a set of one or more conditions, as described with reference to FIGS. 7-10. In some cases, the processor may determine the amount of force applied to the cover 202b using both the first set of signals and the second set of signals. The processor may also use a location of a touch (or locations of multiple touches, or a location of touch centroid) to determine the amount of force applied to the cover 202b. For example, measurements obtained from the capacitive force sensors 210, 604 or pressure sensor(s) 602 may be interpreted differently (e.g., associated with different amounts of force) based on where a user is touching the device 200.

When the interior volume 204 is sealed, or when a gas or fluid (e.g., air) contained within the interior volume 204 is unable to escape the interior volume 204 freely, the gas or fluid contained within the interior volume 204 may operate as a spring on the cover 202b (e.g., an air spring). The spring effect (e.g., air spring effect) may provide a pressure or resistance that opposes the force (e.g., $F_{finger}$) applied to the cover. For example, a force applied to the center of the cover 202b may be opposed by the force distribution shown in FIG. 6B. As shown in FIG. 6B, the air spring effect may cause portions of the cover 202b to bow outward upon application of the force $F_{finger}$. The portions of the cover 202b may bow outward as a result of the pressure within the interior volume 204 increasing, and as a result of gases or fluid within the interior volume 204 being displaced. Also upon application of the force $F_{finger}$, the gasket 206 that bonds the cover 202b to the housing 202a (with spring constant k) may apply an inward force to the edges of the cover 202b. In other cases (not illustrated in FIG. 6B), the force distribution inside the interior volume 204 as a result of the air spring effect may differ. For example, the gasket 206 may apply an outward force to the edges of the cover 202b. More generally, whether or not a gasket such as the gasket 206 applies an inward force, outward force, or any force to the edges of the cover 202b may be a function of the interior volume 204, the aspect ratio (e.g., length, width, and thickness) of the cover 202b, and other factors. The forces (if any) applied to the edges of the cover 202b by the gasket 206 are the result of a force balancing problem involving the force $F_{finger}$ applied to the cover 202b, the pressure within the interior volume 204 when the force $F_{finger}$ is applied (e.g., a back pressure force), and the gasket force. The force balancing problem may be modeled for a particular device using finite element analysis (FEA). In general, a gasket may be expected to apply an inward force to the edges of a cover when a device has a long, thin, glass cover, as may be the case in the device 200; and a gasket may be expected to apply an outward force to the edges of a cover when a device has a short, thick, glass cover, as may be the case in an electronic watch.

When the interior volume 204 is vented, enabling a gas or fluid contained within the volume 204 to escape after application of the force $F_{finger}$ (but not escape immediately upon application of the force $F_{finger}$), the air spring effect illustrated with reference to FIG. 6B may decrease over time, and the pressure within the interior volume 204 may decrease until the steady state shown in FIG. 6C is reached. In the steady state, the force $F_{finger}$ may not be opposed by the pressure or distribution of gases or fluids within the interior volume 204, and the edges of the cover 202b may apply an outward force to the gasket 206.

When the interior volume 204 is not sealed, or when a gas or fluid (e.g., air) contained within the interior volume 204 is able to escape the interior volume 204 freely, the gas or fluid contained within the interior volume 204 may readily escape when the force $F_{finger}$ is applied to the cover 202b, and the steady state shown in FIG. 6D may be reached immediately after application of the force $F_{finger}$.

Between the time that the force $F_{finger}$ is initially applied to the cover 202b and the time the pressure within the interior volume 204 reaches a steady state following application of the force $F_{finger}$, the capacitances of the capacitive force sensors 210, 604 may change. The changes in the capacitances may be caused by a change in the distance between the ground element 214 attached to the cover 202b and the self-capacitance sense pad (e.g., 212) of a capacitive force sensor (e.g., 210). Also between the time the force $F_{finger}$ is initially applied to the cover 202b and the time the pressure within the interior volume 204 reaches a steady state following application of the force $F_{finger}$, and assuming a well-sealed or slowly vented interior volume 204, the pressure registered by the pressure sensor 602 may temporarily spike and then returns to its baseline value.

Figure 7A:
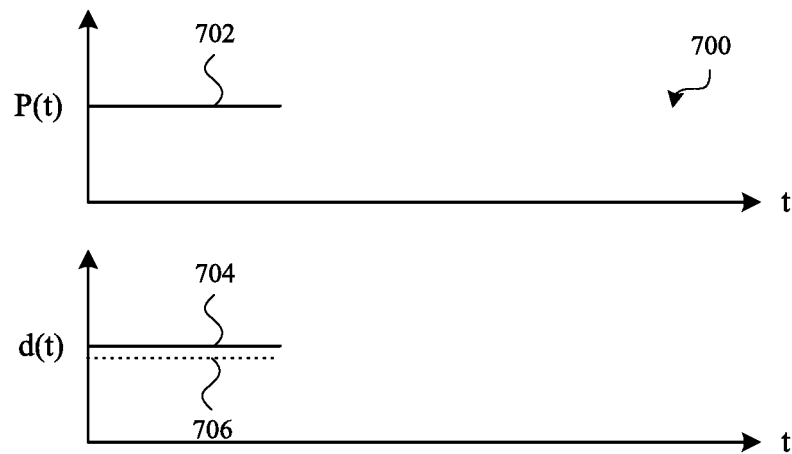
FIGS. 7A-7C are graphs of example outputs of the pressure sensor and capacitive force sensors included in the device described with reference to FIGS. 2A and 6A-6C.
Figure 7B:
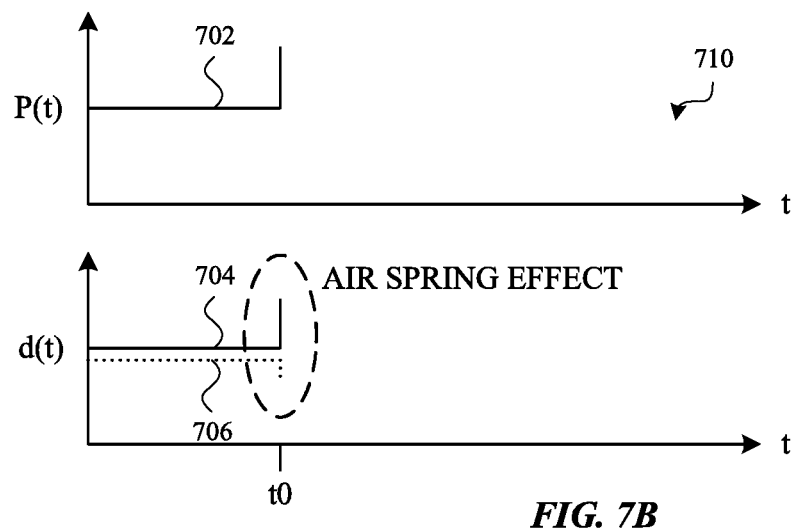
Figure 7C:
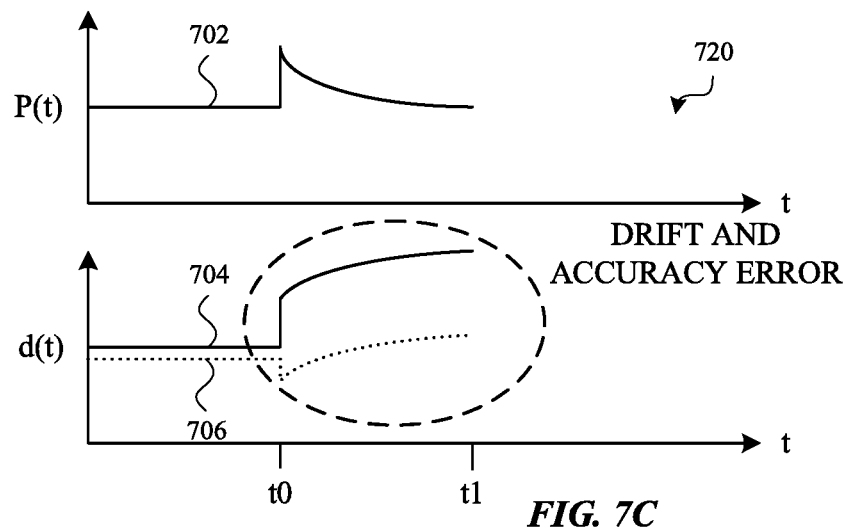

FIGS. 7A-7C are graphs of example outputs of the pressure sensor 602 and capacitive force sensors 210, 604 included in the device 200 described with reference to FIGS. 2A and 6A-6C. More particularly, FIG. 7A is a graph 700 of an example output 702 of the pressure sensor 602, P(t) during the steady state condition shown in FIG. 6A, in which no force is applied to the cover 202b. FIG. 7A also shows example outputs 704, 706 of the capacitive force sensors 210, 604, d(t), during the steady state condition shown in FIG. 6A.

FIG. 7B is a graph 710 of example outputs 702, 704, 706 of the pressure sensor 602 and capacitive force sensors 210, 604 in response to an initial application of force to the center of the cover 202b. A touch on the cover 202b may be detected at a time t0. As shown, P(t) temporarily spikes due to an increase in pressure within the interior volume 204 at time t0. Similarly, the output 704 of the capacitive force sensor 210 positioned under the location on the cover 202b where the force is applied spikes upward due to a decrease in the compressible gap 216 between the capacitive force sensor 210 and the ground element 214 attached to the cover. A decrease in the compressible gap 216 results in an increased capacitance of the self-capacitance sense pad 212 of the capacitive force sensor 210. Also upon application of the force, the output 706 of the capacitive force sensor 604 positioned closer to the periphery of the cover 202b spikes downward due to an increase in the gap between the capacitive force sensor 604 and the ground element 214 (e.g., an increase in the gap caused by an air spring effect). An increase in the gap results in a decreased capacitance of the self-capacitance sense pad of the capacitive force sensor 604.

FIG. 7C is a graph 720 of example outputs 702, 704, 706 of the pressure sensor 602 and capacitive force sensors 210, 604 over time, subsequent to the initial application of force to the center of the cover 202b. As shown, P(t) decreases in a non-linear manner as air or fluid escapes the interior volume 204 and the pressure within the interior volume 204 returns to a steady state. Conversely, the outputs 704, 706 of the capacitive force sensors 210, 604 rise in a non-linear manner as the pressure opposing the applied force decreases, allowing the force $F_{finger}$ to move the ground element 214 attached to the cover 202b closer to the self-capacitance sense pads of the capacitive force sensors 210, 604. Between times t0 and t1, force measurements obtained using the capacitive force sensors 210, 604 may be subject to drift and accuracy errors. At time t1, the pressure within the interior volume 204 may once again reach a steady state.

At or around time t0 (e.g., at a first time following a touch detected by a touch sensor), the amount of force applied to the cover 202b may be determined using the signal(s) provided by the pressure sensor 602. At or around time t1 (e.g., at a second time following the touch detected by the touch sensor), or subsequent to time t1, the amount of force applied to the cover 202b may be determined using the signal(s) provided by the capacitive force sensors 210, 604. Between times t0 and t1 (e.g., at a third time following the touch detected by the touch sensor), the amount of force applied to the cover 202b may be determined using a combination of the signal(s) provided by the pressure sensor 602 and the capacitive force sensors 210, 604.

Figure 8:
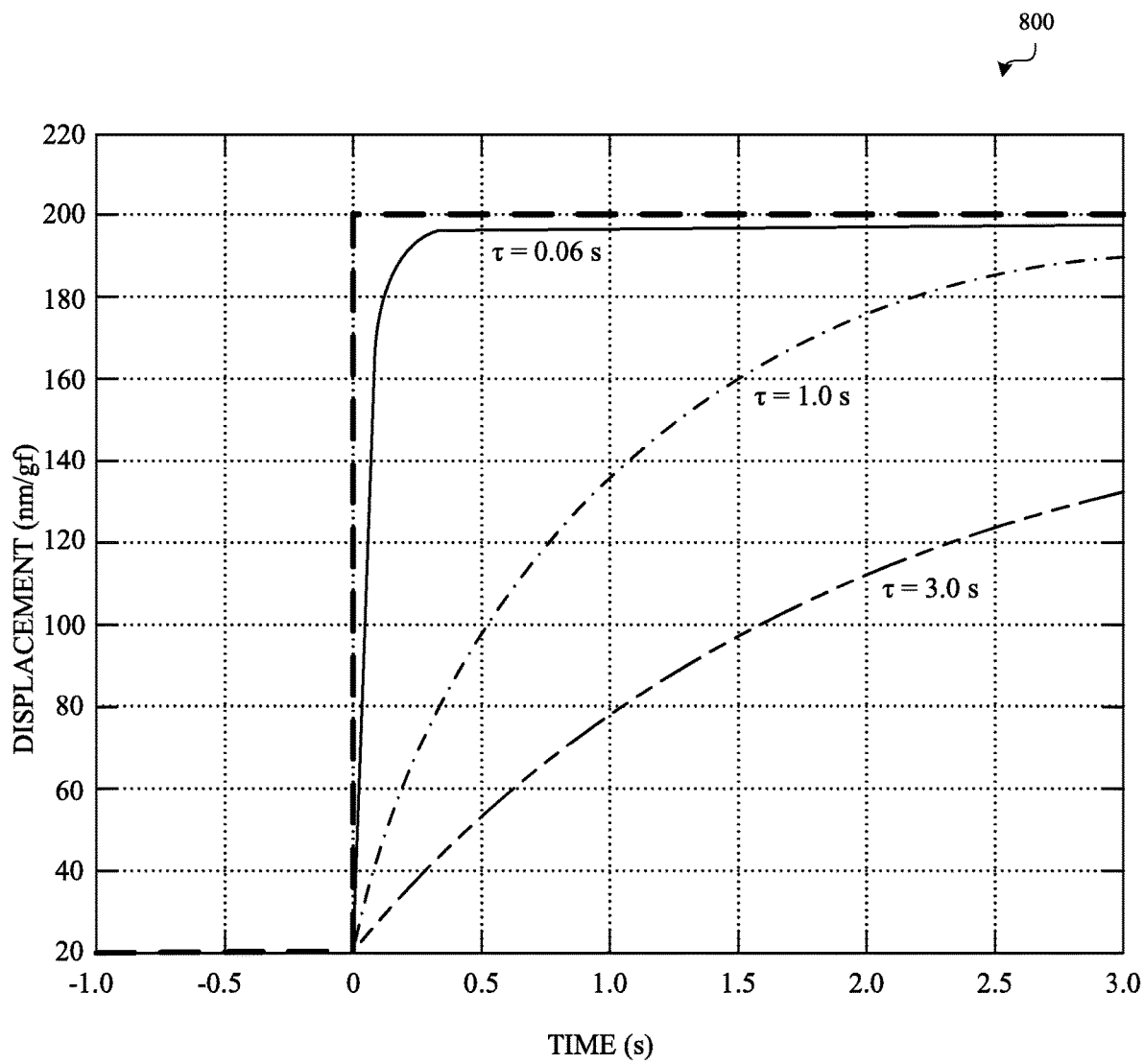
FIG. 8 is a graph showing example displacements of the cover described with reference to FIGS. 6A-6C.

FIG. 8 is a graph 800 showing example displacements of the cover 202b described with reference to FIGS. 6A-6C, in view of a steady-state force applied to the cover 202b and different sealing/venting characteristics of the interior volume 204. The vertical axis shows a range of cover displacements in nanometer/gram-force (nm/gf), and the horizontal axis shows time. The graph 800 assumes that the force is applied to the cover 202b as a steady-state step input.

The different sealing/venting characteristics of the interior volume 204 (e.g., different sealing states) may be defined by a value of tau ($\tau$), which indicates the time it takes the interior volume 204 to reach a steady state pressure following application or release of a steady-state force, $F_{finger}$, to the cover 202b. At lower values of $\tau$ (e.g., $\tau$=0.6 seconds (s)), indicative of a more loosely sealed or well-vented interior volume 204, the cover 202b may reach its maximum displacement in response to a steady-state force $F_{finger}$ very quickly (i.e., in 0.6 s). As $\tau$ increases to higher values (e.g., to 1.0 s or even 3.0 s), indicating a better sealed or less-vented interior volume 204, the cover 202b may reach its maximum displacement in response to the steady-state force $F_{finger}$ more slowly.

Given the impact of higher values of $\tau$ on a capacitive force sensor, the pressure sensor 602 described with reference to FIG. 6 may be used to provide an initial indication of the amount of force applied to the cover 202b, and the capacitive force sensor(s) 210, 604 may be used to provide a steady state indication of the amount of force applied to the cover 202b. The pressure sensor 602 may also be used to provide an indication of an amount of force associated with a tap (i.e., a short duration force) on the cover 202b, while the capacitive force sensor(s) 210, 604 may be used to provide an indication of amounts of force associated with a sustained force or force gesture applied to the cover 202b (i.e., amounts of force corresponding to a user dragging their finger or stylus across the surface of the cover 202b over a longer period of time).

Alternatively, a processor of a device (e.g., the device 200 described with reference to FIGS. 2A and 6A-6C) may determine a sealing state of the interior volume 204, and use the determined sealing state to determine the amount of force applied to the cover 202b using: the signal(s) provided by the pressure sensor 602, the signal(s) provided by the capacitive force sensor(s) 210, 604, or a combination thereof. For example, the processor may obtain a pressure of the interior volume 204 from the pressure sensor 602 in the absence of a force applied to the cover 202b; evaluate the pressure of the interior volume 204 to determine whether the pressure is below a threshold pressure; and upon determining that the pressure of the interior volume 204 is below the threshold pressure, switch from reliance on the pressure sensor 602 to reliance on (or more reliance on) the capacitive force sensor(s) 210, 604 when initially determining an amount of force applied to the cover 202b. The threshold pressure may be a pressure indicating that the interior volume 204 has transitioned from a sealed state to an unsealed state (e.g., as a result of a drop event).

Figure 9:
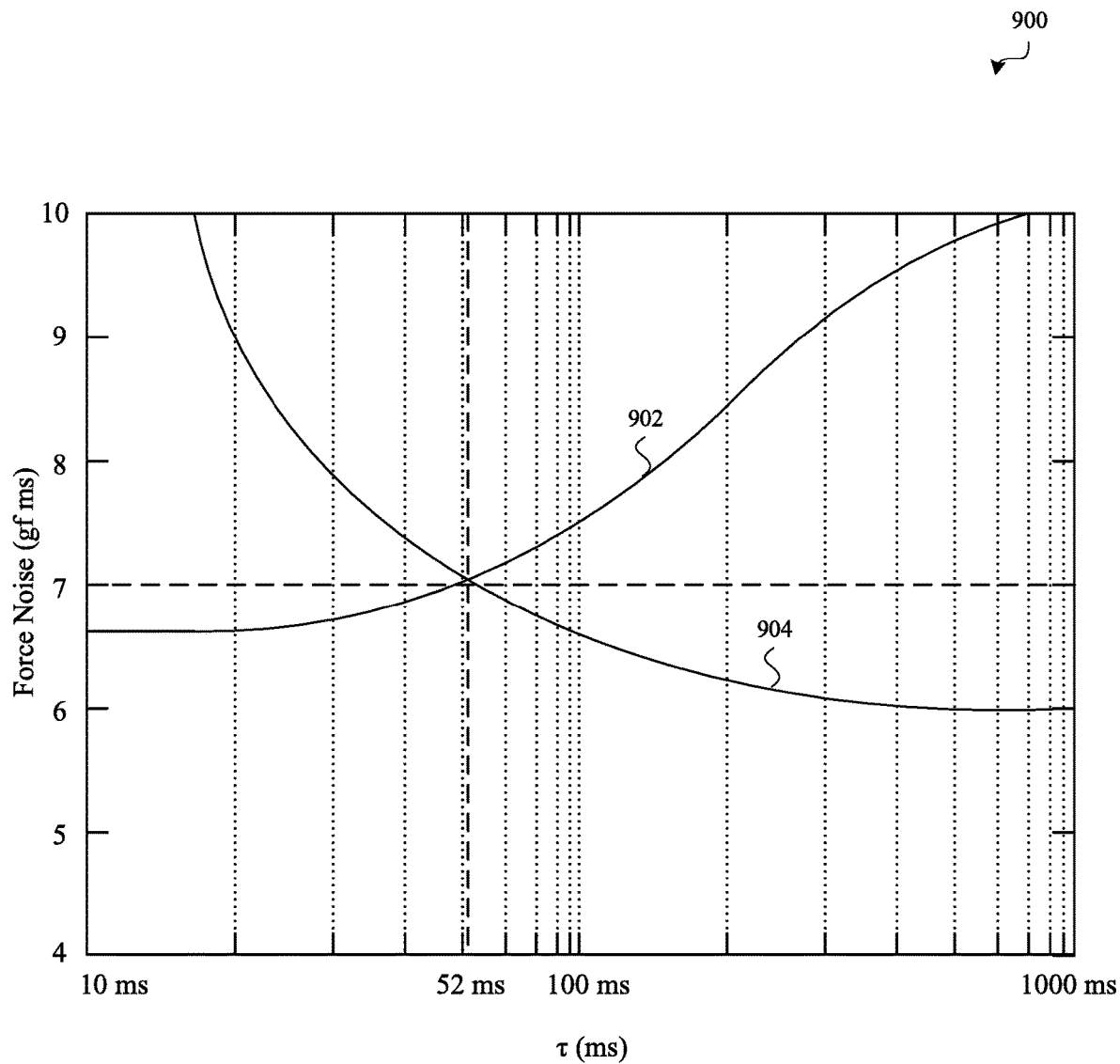
FIG. 9 is a graph that shows an example relationship between the user facing force noise metrics of a capacitive force sensor and a pressure sensor.

FIG. 9 is a graph 900 that shows an example relationship between the user facing force noise metrics of a capacitive force sensor and a pressure sensor. The vertical axis shows a range of user facing force noise between 4 and 10 (in gram-force milliseconds (gf ms), and the horizontal axis shows a range of values for $\tau$. As shown by the curve 902, a capacitive force sensor may be less susceptible to force noise at lower values of $\tau$ (e.g., $\tau \le 52$ ms), and its susceptibility to force noise may increase somewhat quickly for higher values of $\tau$. Conversely, and as shown by the curve 904, a pressure sensor may be less susceptible to force noise at higher values of $\tau$ (e.g., $\tau > 52$ ms), and its susceptibility to force noise may increase somewhat quickly with lower values of $\tau$.

When a capacitive force sensor (or set of multiple capacitive force sensors) is used to determine the force applied to a cover, the applied force may be determined by either measuring a capacitance change of the capacitive force sensor directly, or by converting the capacitance change to a gap change using the following equation:

$$g = \frac{\varepsilon A}{C - C_0}$$

where C is the capacitance of the sensor, $C_0$ is a parasitic capacitance, $\varepsilon$ is an electrical constant, A is the area of the electrode, and g is the distance from the electrode to the ground element.

Figure 10A:
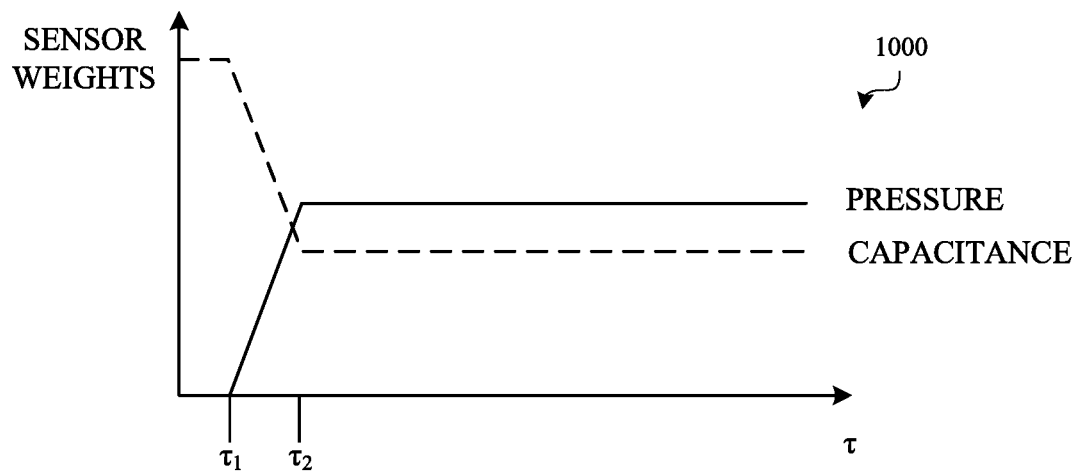
FIGS. 10A-10C provide examples of how capacitance values obtained from a capacitive force sensor, and pressure values obtained from a pressure sensor, may be used to determine an amount of force applied to a cover.
Figure 10B:
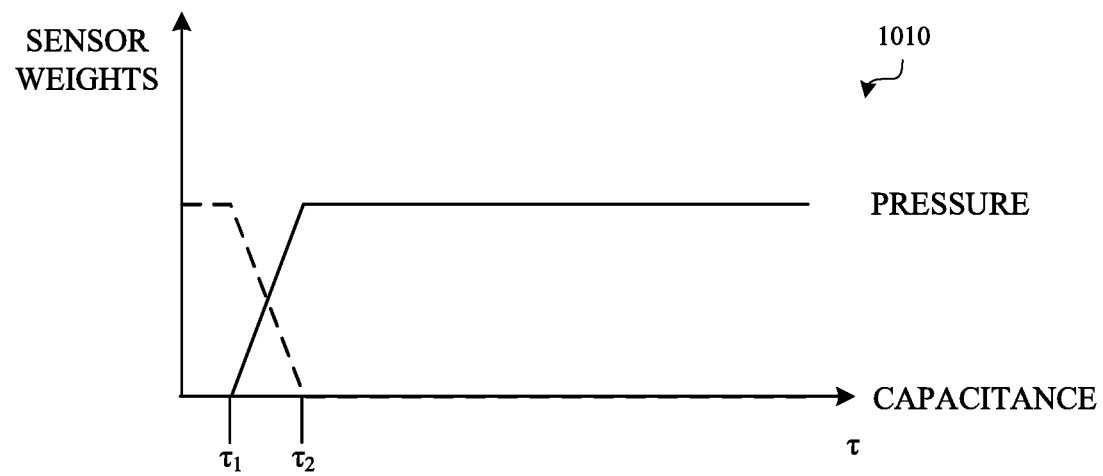
Figure 10C:
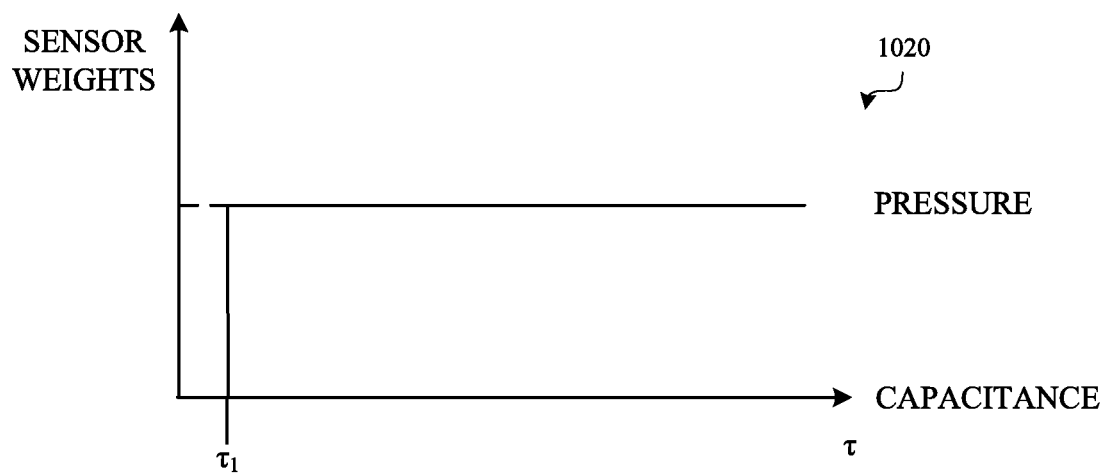

FIGS. 10A-10C provide examples of how capacitance values obtained from a capacitive force sensor (or a set of multiple capacitive force sensor), and pressure values obtained from a pressure sensor (or a set of multiple pressure sensors), may be used to determine an amount of force applied to a device's cover. As shown in the graph 1000 of FIG. 10A, capacitance values obtained from the capacitive force sensor may be used to determine an amount of force on a cover at values of $\tau$ below a first threshold, $\tau_1$, and the pressure sensor may not be used to determine an amount of force at values of $\tau$ below the first threshold. As values of $\tau$ increase from the first threshold to a second threshold, $\tau_2$ (with the second threshold being greater than the first threshold), capacitance values may be given increasingly less weight in determining an amount of force on the cover, and pressure values may be given increasingly more weight. For values of $\tau$ above the second threshold, pressure values may be given more weight than capacitive values, but each may be given weight. Above the second threshold, the relative weights given to pressure values and capacitance values may remain fixed. The respective weights given to capacitance values and pressure values between $\tau_1$ and $\tau_2$ may in some cases be determined through modeling or learning.

Alternatively, and as shown in the graph 1010 of FIG. 10B, capacitance values obtained from the capacitive force sensor may be used to determine an amount of force on a cover at values of $\tau$ below a first threshold, $\tau_1$, and the pressure sensor may not be used to determine an amount of force at values of $\tau$ below the first threshold. As values of $\tau$ increase from the first threshold to a second threshold, $\tau_2$ (with the second threshold being greater than the first threshold), capacitance values may be given increasingly less weight in determining an amount of force on the cover, and pressure values may be given increasingly more weight.

For values of τ above the second threshold, pressure values may be used to determine an amount of force on the cover, and the capacitive force sensor may not be used to determine the amount of force. The respective weights given to capacitance values and pressure values between $\tau_1$ and $\tau_2$ may in some cases be determined through modeling or learning.

Alternatively, and as shown in the graph of 1020 of FIG. 10C, capacitance values obtained from the capacitive force sensor may be used to determine an amount of force on a cover at values of τ below a threshold, $\tau_1$, and the pressure sensor may not be used to determine an amount of force at values of τ below the first threshold. At or above the threshold, pressure values may be used to determine an amount of force on the cover, and the capacitive force sensor may not be used to determine the amount of force.

In some embodiments, a value of τ for an interior volume may be preprogrammed into the device that contains the interior volume. In some embodiments, a value of τ for an interior volume may be dynamically determined or estimated using capacitance values obtained from a capacitive force sensor or pressure values obtained from a pressure sensor.

Figure 11A:
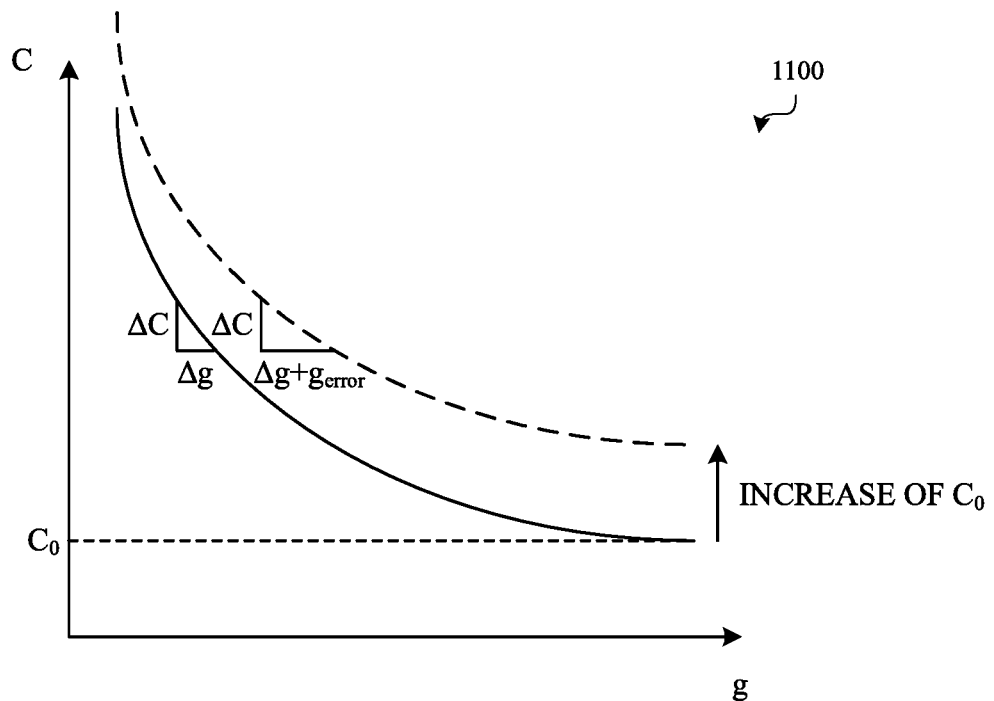
FIG. 11A is a graph showing a relationship between a compressible gap (g) defined between a ground element and a sensing electrode (e.g., the compressible gap described with reference to FIGS. 2A and 2B) and capacitances (C) of the sensing and calibration electrodes.
Figure 11B:
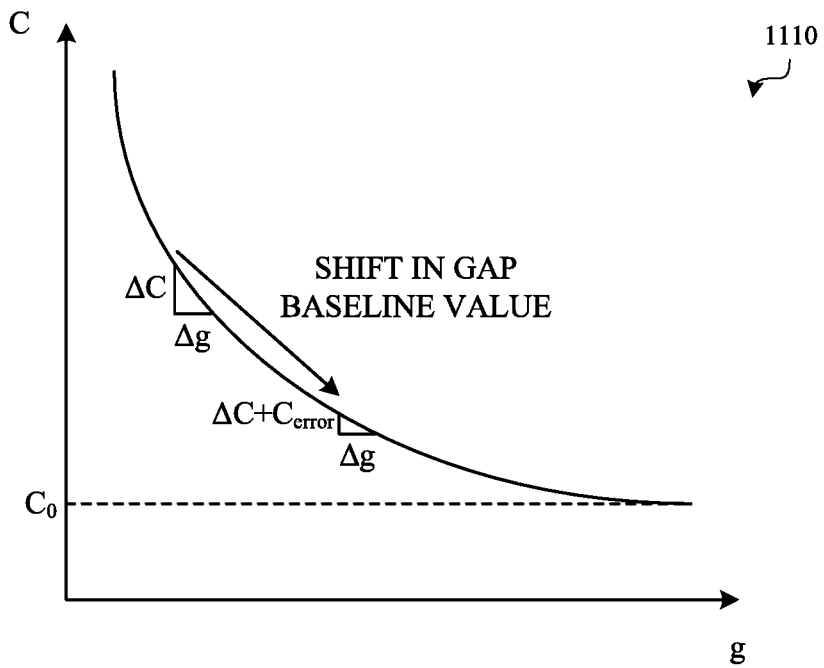
FIG. 11B is another graph showing the relationship between the compressible gap (g) and the capacitances (C) of the sensing and calibration electrodes.

As discussed with reference to FIGS. 4A-4B, a SiP that includes a self-capacitance sense pad (referred to, at times, as a sensing electrode) may also include a second self-capacitance sense pad (referred to, at times, as a calibration electrode). The sensing and calibration electrodes may be operated differentially, such that the calibration electrode can be used to calibrate capacitive measurements obtained using the sensing electrode. FIGS. 11A-11B illustrate conditions for which a capacitive force sensor containing sensing and calibration electrodes may be calibrated.

FIG. 11A is a graph 1100 showing a relationship between a compressible gap (g) defined between a ground element and a sensing electrode (e.g., the compressible gap described with reference to FIGS. 2A-2B) and capacitances (C) of the sensing and calibration electrodes. The relationship between the gap and the capacitances is dependent on a parasitic capacitance ($C_0$) effecting both the sensing electrode and the calibration electrode. When the parasitic capacitances are properly estimated, a differential capacitance (ΔC) between the sensing and calibration electrodes corresponds to a particular gap (Δg, a sense pad gap) between the sensing and calibration electrodes. When the parasitic capacitances or their relationship has shifted (e.g., increased or decreased) and is not properly estimated, the differential capacitance (ΔC) between the sensing and calibration electrodes corresponds to a particular gap plus or minus an error (e.g., $\Delta g + g_{error}$). To calibrate the parasitic capacitance ($C_0$) of each electrode, the gap sensing method described with reference to FIG. 12 may be performed.

FIG. 11B is another graph 1110 showing the relationship between the compressible gap (g) and the capacitances (C) of the sensing and calibration electrodes. The sensed capacitances and their difference (ΔC) depends on a baseline value for the compressible gap (i.e., a value of the compressible gap when no force is applied to the device). When the baseline value is properly estimated, a differential capacitance (ΔC) between the sensing and calibration electrodes corresponds to a particular gap (Δg) between the sensing and calibration electrodes. When the baseline value of the gap has shifted (e.g., as a result of damage to or aging of the device), and is not properly estimated, the differential capacitance detected between the sensing and calibration electrodes may not be appropriate given the gap between the sensing and calibration electrodes, and may be measured as ΔC plus or minus an error (e.g., $\Delta C + C_{error}$). To determine the shifted baseline value of the gap, the capacitance sensing method described with reference to FIG. 13 may be performed.

Figure 12:
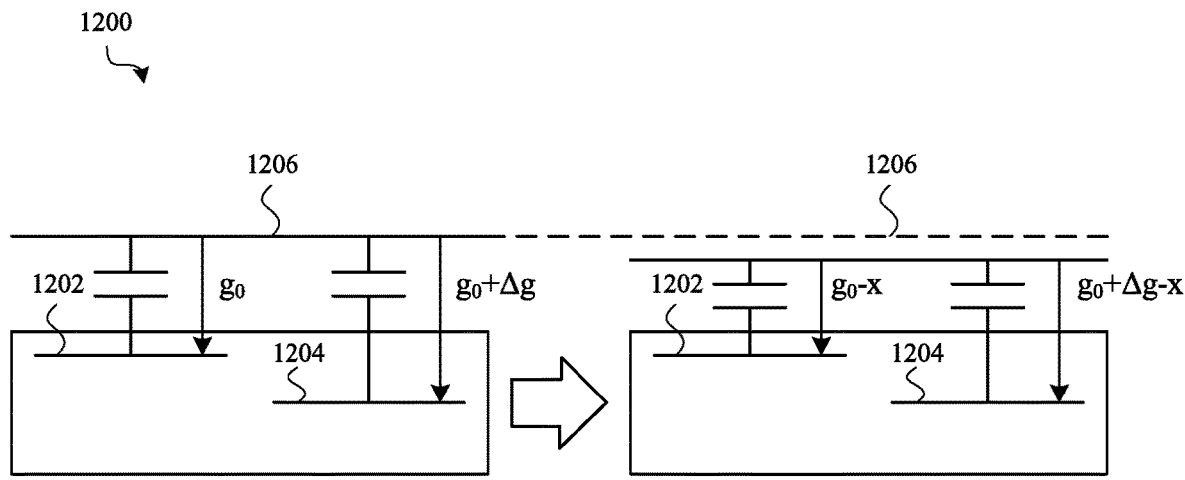
FIG. 12 illustrates a gap sensing method for determining the parasitic capacitances, $C_{Oa}$ and $C_{Ob}$, effecting sensing and calibration electrodes of a capacitive force sensor.

FIG. 12 illustrates a gap sensing method for determining the parasitic capacitances, $C_{sp}$ and $C_{cp}$, effecting sensing and calibration electrodes of a capacitive force sensor. The method is sensitive to shifts in the parasitic capacitances of the sensing and calibration electrodes, but is not sensitive to shifts in the baseline value of a compressible gap between a ground element and the sensing electrode.

As shown in FIG. 12, a capacitive force sensor 1200 may include a sensing electrode 1202 and a calibration electrode 1204. Each of the electrodes 1202, 1204 may be separated from a ground element 1206 by a compressible gap. The compressible gap may have a baseline value of $g_0$ with respect to the sensing electrode 1202, and a value of $g_0+\Delta g$ with respect to the calibration electrode 1204, with Δg being a separation between the electrodes 1202, 1204 in a direction perpendicular to the ground element 1206. Although the electrodes 1202, 1204 are shown to be non-overlapping in FIG. 12, the electrodes 1202, 1204 may alternatively be overlapping, as shown, for example, in FIGS. 4A-4B.

FIG. 12 shows the capacitive force sensor 1200 during different compression states of the compressible gap—a first state in which no force is applied to the ground element 1206 (or to the cover to which the ground element 1206 is attached), and a second state in which the ground element 1206 (or the cover to which the ground element 1206 is attached) is depressed by a distance x. The IC to which the sensing and calibration electrodes 1202, 1204 are connected, in-SiP, may measure the capacitance of each electrode (i.e., the sensing electrode 1202 and the calibration electrode 1204) in each state, and use the measured capacitances to calibrate a force sensing operation of the capacitive force sensor 1200.

For example, the capacitance (C) of each electrode may be determined using the following equation:

$$C - C_0 = \frac{\varepsilon A}{g} \rightarrow g = \frac{\varepsilon A}{C - C_0}$$

where $C_0$ is a parasitic capacitance, ε is an electrical constant, A is the area of the electrode, and g is the distance from the electrode to the ground element. Given the above equation, the capacitance of the sensing electrode 1202, in the absence of a force applied to the ground element 1206 (i.e., in the first state), may be determined using the following equation:

$$C_s = \frac{\varepsilon A_s}{g_0} + C_{sp}$$

where s indicates the sensing electrode 1202.

Similarly, the capacitance of the calibration electrode 1204, in the absence of a force applied to the ground element 1206, may be determined using the following equation:

$$C_c = \frac{\varepsilon A_c}{g_0 + \Delta g} + C_{cp}$$

where c indicates the calibration electrode 1204.

When the ground element 1206 is depressed by the distance x, the capacitances of the sensing and calibration electrodes 1202, 1204 may be determined using the following equations:

$$C_s + \Delta C_s = \frac{\varepsilon A_s}{g_0 - x} + C_{sp}$$

$$C_c + \Delta C_c = \frac{\varepsilon A_c}{g_0 + \Delta g - x} + C_{cp}$$

The above equations for $C_s$ may be subtracted, and the above equations for $C_c$ may be subtracted, to yield the following equations:

$$\Delta C_s = \frac{\varepsilon A_s}{g_0 - x} - \frac{\varepsilon A_s}{g_0}$$

$$\Delta C_c = \frac{\varepsilon A_c}{g_0 + \Delta g - x} - \frac{\varepsilon A_c}{g_0 + \Delta g}$$

These equations may be solved to determine estimates for $g_0$ and x as follows:

$$a = \Delta C_s \varepsilon A_c - \Delta C_c \varepsilon A_s - \Delta C_s \Delta C_c \Delta g$$

$$b = -2\varepsilon A_s \Delta C_c \Delta g - \Delta C_s \Delta C_c \Delta g^2$$

$$c = -\varepsilon A_s \Delta C_c \Delta g^2$$

$$g_{0est} = \frac{-b + \sqrt{b^2 - 4ac}}{2a}$$

$$x_{est} = \frac{\Delta C_s g_{0est}^2}{\Delta C_s g_{0est} + \varepsilon A_s}$$

The values of $g_0$ and x may then be plugged into other equations to determine values for $C_{sp}$ and $C_{cp}$. Determinations of $C_{sp}$ and $C_{cp}$ can be used to determine a $\Delta C_0$. These values may be used (e.g., by the IC on-board a SiP) to dynamically calibrate a force sensing operation of the capacitive force sensor 1200, thereby enabling the capacitive force sensor 1200 to output a digital value related to a capacitance (i.e., an amount of force) sensed by the sensing electrode 1202.

Figure 13:
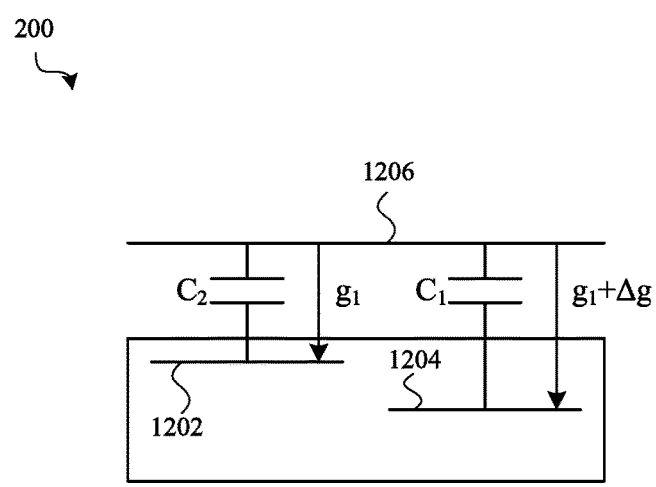
FIG. 13 illustrates a capacitance sensing method for calibrating a differential capacitance between sensing and calibration electrodes of a capacitive force sensor.

FIG. 13 illustrates a capacitance sensing method for calibrating a differential capacitance (ΔC) between sensing and calibration electrodes of a capacitive force sensor. The method is sensitive to shifts in the baseline value of a compressible gap between a ground element and the sensing electrode, but is not sensitive to shifts in the parasitic capacitances of the sensing and calibration electrodes.

FIG. 13 shows the capacitive force sensor 1200 described with reference to FIG. 12, but shows the capacitive force sensor 1200 in a single state (e.g., a rest state). The IC to which the sensing and calibration electrodes 1202, 1204 are connected, in-SiP, may measure the capacitance of each electrode (i.e., the sensing electrode 1202 and the calibration electrode 1204), and use the measured capacitances to calibrate a force sensing operation of the capacitive force sensor 1200.

The capacitance of the sensing electrode 1202 may be determined using the following equation:

$$C_1 = \frac{\varepsilon A}{g_1} + C_0$$

Similarly, the capacitance of the calibration electrode 1204 may be determined using the following equation:

$$C_2 = \frac{\varepsilon A}{g_1 + \Delta g} + C_0$$

The equations for $C_1$ and $C_2$ may be subtracted, and the following equation may be solved to determine $g_1$:

$$C_1 - C_2 = \frac{\varepsilon A}{g_1} - \frac{\varepsilon A}{g_1 + \Delta g}$$

The value of $g_1$ may then be plugged into the equation for $C_1$ or $C_2$ to determine $C_0$, or $C_0$ may be determined as follows:

$$C_0 = \overline{C} - \frac{1}{2}\sqrt{\Delta C\left(\frac{4\varepsilon A}{\Delta g} + \Delta C\right)}$$

$$\Delta C \equiv C_2 - C_1$$

$$\overline{C} \equiv \frac{C_1 + C_2}{2}$$

The values of $g_1$ and $C_0$ may be used (e.g., by the IC on-board a SiP) to statically calibrate a force sensing operation of the capacitive force sensor 1200, thereby enabling the capacitive force sensor 1200 to output a digital value related to a capacitance (i.e., an amount of force) sensed by the sensing electrode 1202.

Figure 14:
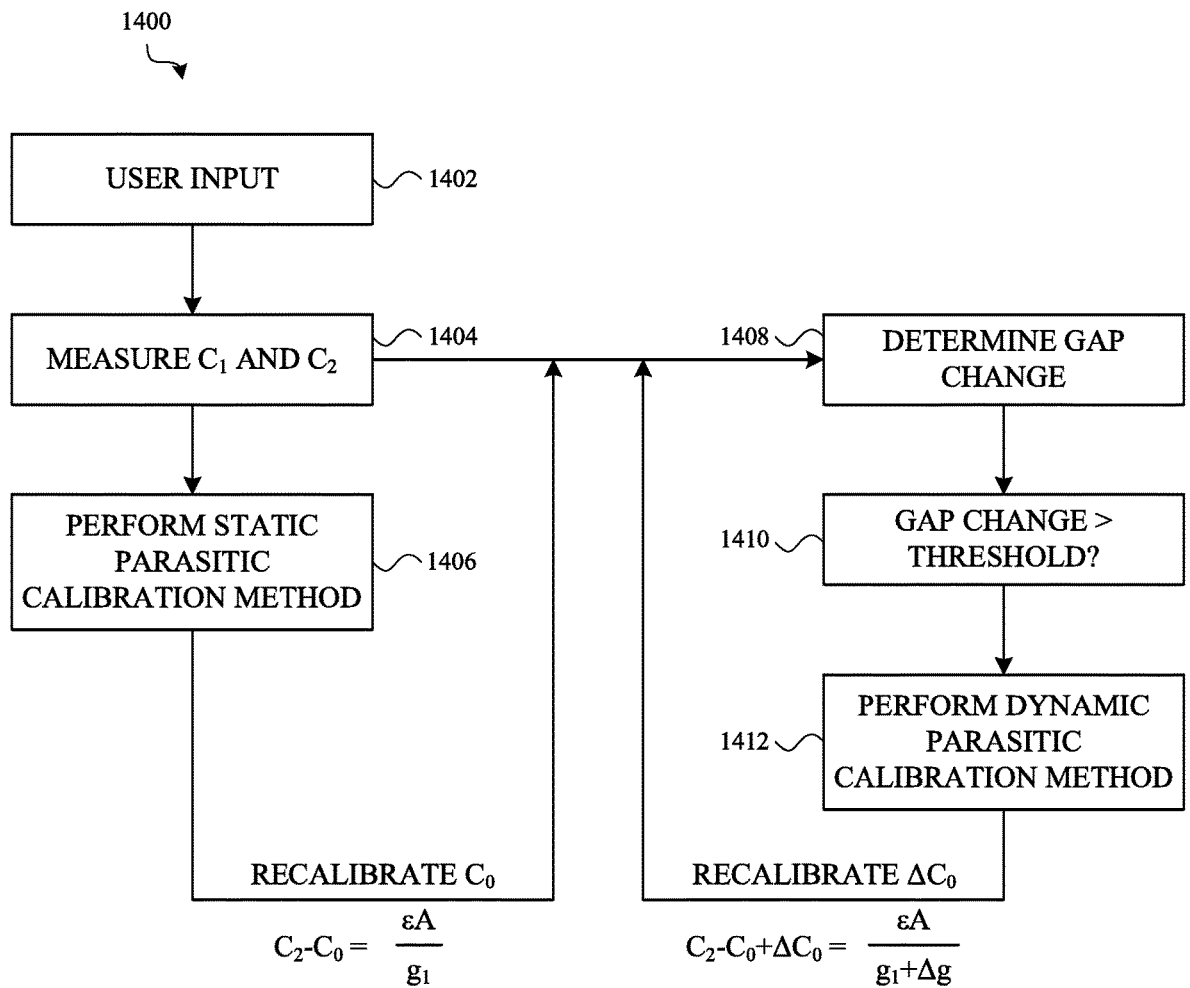
FIG. 14 shows an example method for calibrating a capacitive force sensor.

FIG. 14 shows an example method 1400 for performing the method described with reference to FIG. 12 or 13 in response to user input 1402 requesting calibration of a capacitive force sensor (e.g., one of the capacitive force sensors shown in FIG. 2B, 12, or 13). In response to receiving the user input 1402, the capacitances $C_1$ and $C_2$ may be measured at block 1404, and a static parasitic calibration may be performed at block 1406. Performance of the static parasitic calibration may include performance of the method described with reference to FIG. 13. As a result of performing the static parasitic calibration method, $C_0$ may be recalibrated. At block 1408, the user may depress a cover of a device and determine a change in a compressible gap (e.g., a change by a value x). If x is determined to exceed a threshold at block 1410, a dynamic parasitic calibration may be performed at block 1412. Performance of the dynamic parasitic calibration may include performance of the method described with reference to FIG. 12. As a result of performing the dynamic parasitic calibration method, the parasitic capacitances $C_{0a}$ and $C_{0b}$, or $\Delta C_0$, may be calibrated.

Turning now to FIGS. 15A-15D, there are shown various alternative embodiments of a capacitive force sensor. The capacitive force sensors shown in any of FIGS. 15A-15D may be used in place of, or in combination with, any of the capacitive force sensors described herein with reference to other figures. The capacitive force sensors described with reference to FIGS. 15A-15D may also be used in combination with pressure sensors, barometric sensors, temperature sensors, touch sensors, and other sensors, as described with reference to other figures. In some embodiments, the capacitive force sensors shown in FIGS. 15A-15D may include one or more calibration electrodes and may be calibrated, as described with reference to FIG. 13 or 14.

Figure 15A:
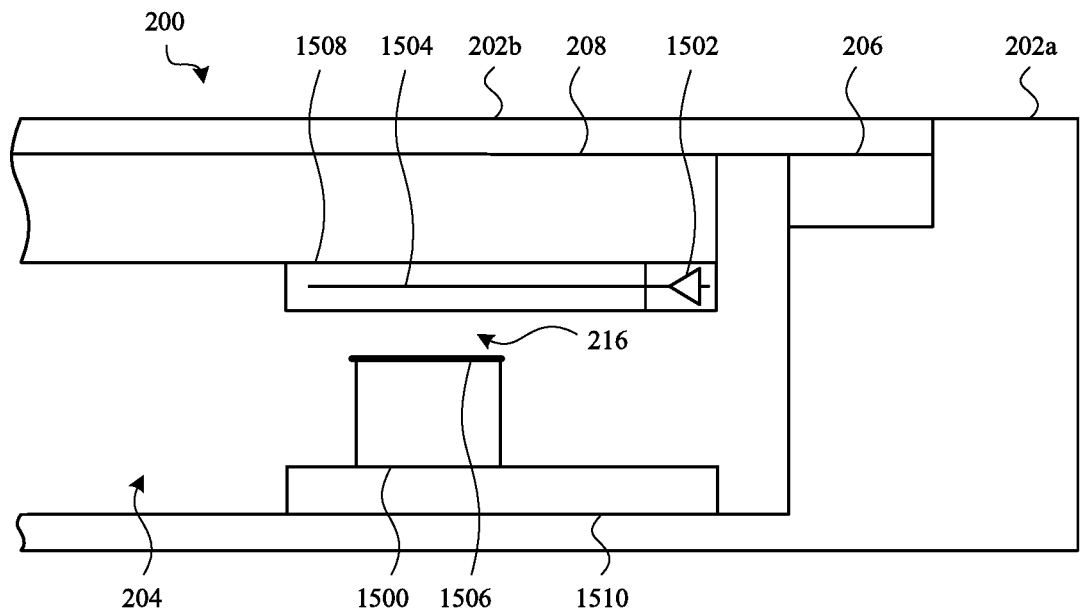
FIGS. 15A-15D show various alternative embodiments of a capacitive force sensor.

In FIG. 15A, an example cross-section of the device 200 described with reference to FIG. 2A is shown. However, in contrast to other example cross-sections of the device 200 shown herein, the capacitive force sensor 1500 is configured for mutual-capacitance sensing (i.e., in a mutual-capacitance sensing mode). For example, a driver 1502 may drive a stimulus (e.g., a signal or waveform) over a conductor 1504 (or set of conductors), and a capacitance sense pad 1506 of the capacitive force sensor 1500 may be configured to sense a mutual capacitance between the conductor 1504 and the capacitance sense pad 1506. In some examples, the capacitive force sensor 1500 may be provided in a SiP, similarly to the capacitive force sensor 210 or 604 described with reference to FIGS. 2A, 6A-6C and other figures. In other examples, the capacitive force sensor 1500 may be provided in another type of package, or on a substrate such as a PCB or semiconductor wafer, as described with reference to FIG. 2B. In some examples, the conductor 1504 may be included in or on a substrate 1508 such as a flex circuit or PCB, or may be printed on an inside of the cover 202b. The conductor 1504 may include, for example, an electrode, a pad (including a free pad on a display substrate, touch sensor substrate, or other substrate), a trace, and/or a metal layer or component.

The driver 1502 may be a driver that is synchronized with the capacitive force sensor 1500. In some embodiments, an IC or other circuitry that is packaged with or associated with the capacitive force sensor 1500 may operate (e.g., provide a control signal or drive waveform to) the driver 1502. In some embodiments, an IC or other circuitry that is packaged with or associated with the driver 1502 may operate, or synchronize with, the capacitive force sensor 1500. In some embodiments, an IC or other circuitry that is separate from both the capacitive force sensor 1500 and the driver 1502 may operate or synchronize both components. The IC or other circuitry may be programmable (e.g., to change the drive waveform) or non-programmable.

In some embodiments, the capacitive force sensor 1500 may be electrically coupled to a substrate 1510 (e.g., a PCB or flex circuit) that is directly or indirectly coupled to the driver 1502. For example, the capacitive fore sensor 1500 may be electrically coupled to a PCB that is coupled to the driver 1502 by a flex circuit and/or electrical connector, or the capacitive force sensor 1500 may be electrically coupled to a flex circuit that is also electrically coupled to the driver 1502.

Figure 15B:
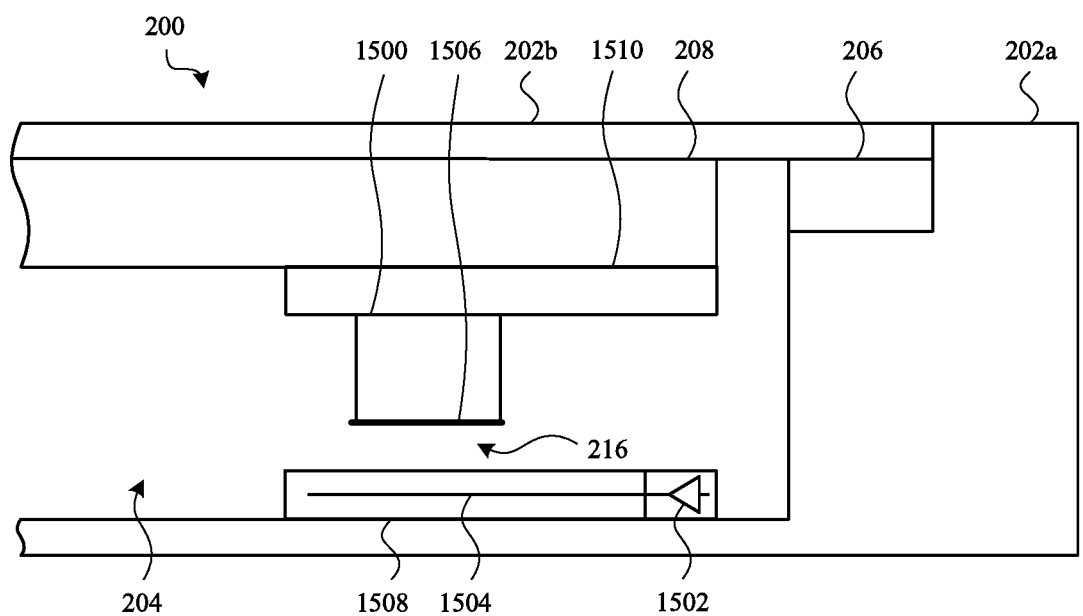

As shown in FIG. 15B, the locations of the capacitive force sensor 1500 (with capacitance sense pad 1506) and conductor 1504 may be swapped, with the capacitive force sensor 1500 being mounted closer to the cover 202b than the conductor 1504. Similarly, the positions of the capacitance force sensors 210, 604 and ground element 214 described with reference to FIGS. 2B and 6A-6C may be swapped.

Figure 15C:
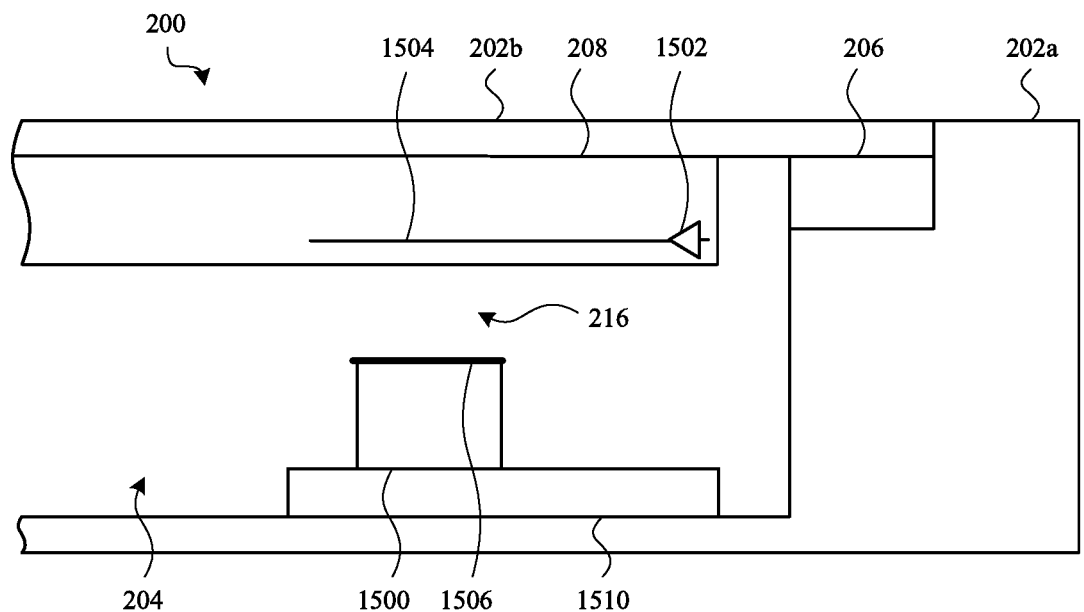

In some embodiments, and as shown in FIG. 15C, the driver 1502 may have a purpose apart from providing a drive waveform that modulates the capacitance sensed by the capacitance sense pad 1506. For example, the driver 1502 may be configured to drive a display signal (e.g., a data line signal or gate line signal or clock signal driven over an electrode or conductive layer of a display, such as a thin-film-transistor (TFT) liquid-crystal display (LCD)), a touch sensor signal (e.g., a touch sensor drive signal driven over an indium-tin-oxide (ITO) electrode or layer in a touch sensor), or other signal within the device stack that includes the display 208. In these embodiments, the capacitive force sensor 1500 may be a mutual-capacitance force sensor, or a self-capacitance force sensor operated in a mutual-capacitance sensing mode. In either case, the capacitive force sensor 1500 may be considered to be operated in a pseudo-mutual-capacitance sensing mode. In the embodiments described in this paragraph, a dedicated driver 1502 may not need to be provided for use with the capacitive force sensor 1500, and circuitry having other purposes can be used to provide a pseudo-mutual-capacitance sensing mode.

Figure 15D:
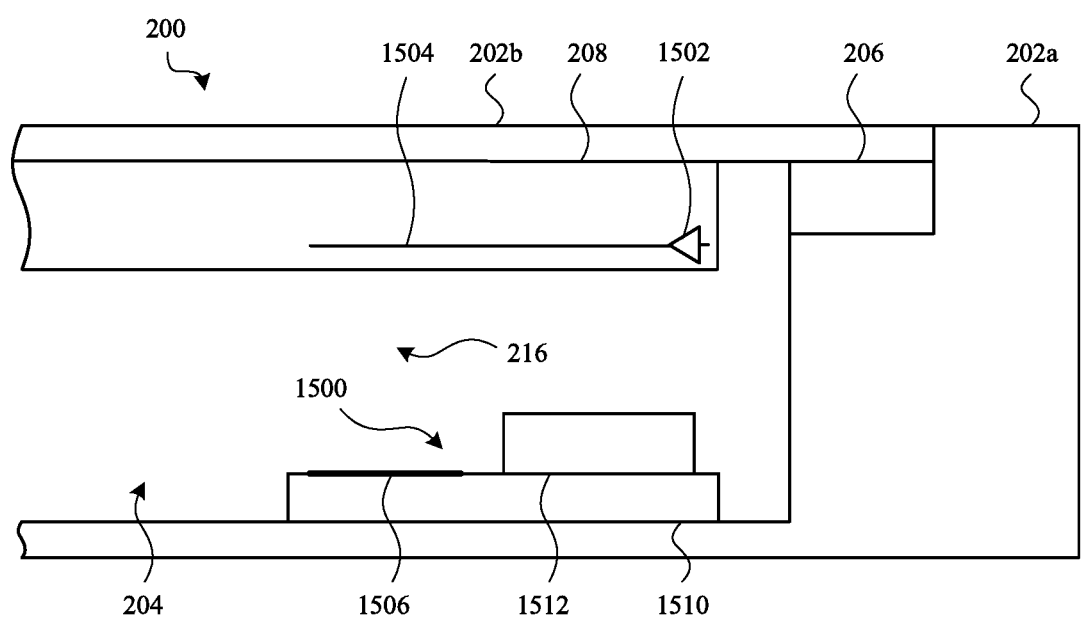

FIG. 15D shows the capacitive force sensor 1500 in an alternative layout, in which the capacitance sense pad 1506 is disposed adjacent an IC or other circuitry 1512 on the substrate 1510 (e.g., a PCB). The capacitive force sensor 1500 shown in FIG. 15C may occupy less z space than the capacitive force sensor 1500 described with reference to any of FIGS. 15A-15C, but may consume more area and/or increase the width of the gap 216.

Figure 16A:
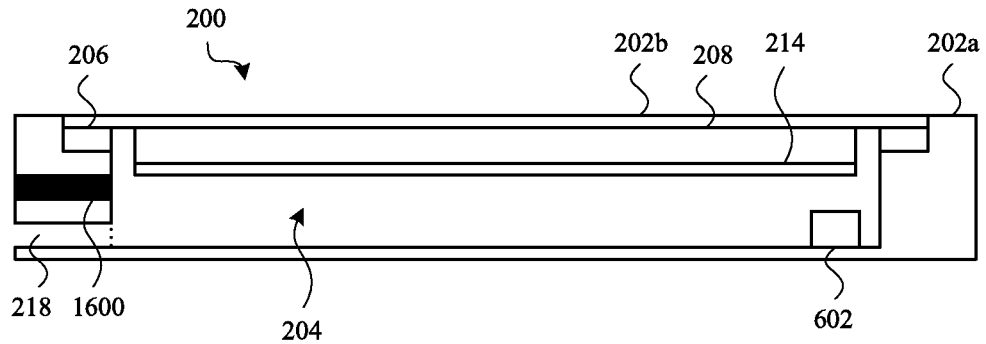
FIGS. 16A-16C show another example cross-section of the device described with reference to FIG. 2A.
Figure 16B:
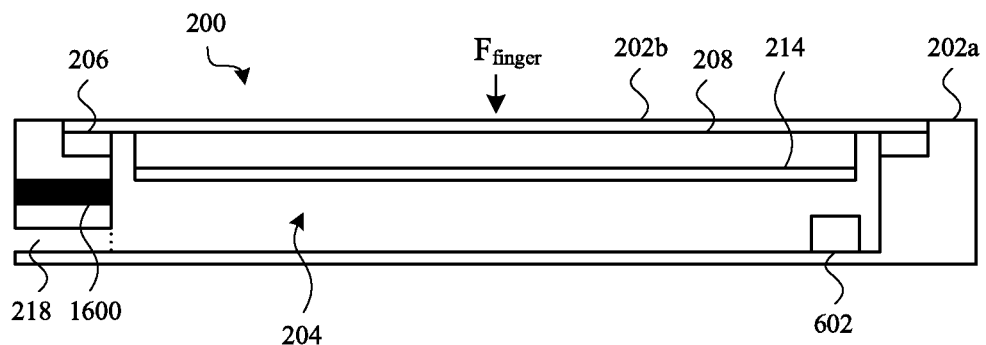
Figure 16C:
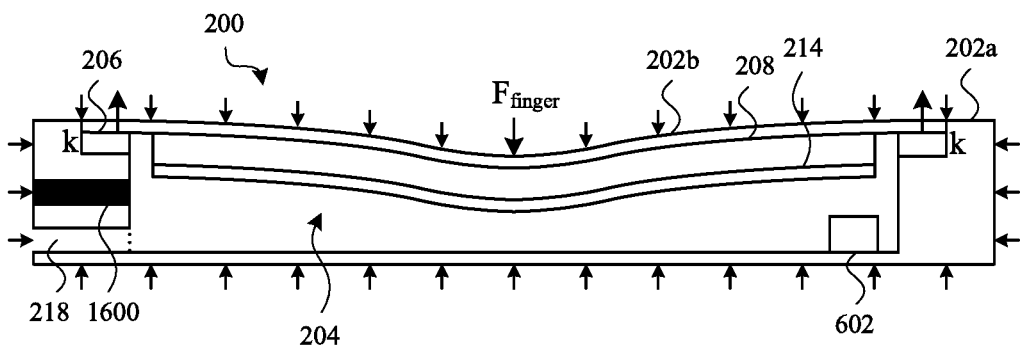

FIGS. 16A-16C show another example cross-section of the device 200 described with reference to FIG. 2A. FIG. 16A shows the cross-section in the absence of a force applied to the cover 202b, and FIGS. 16B-16C show the cross-section after a force is applied to the cover 202b.

Similarly to the cross-section shown in FIGS. 6A-6C, the cross-section shown in FIGS. 16A-16C includes a pressure sensor 602 disposed within the interior volume 204 (i.e., an internal pressure sensor). However, in contrast to the cross-section shown in FIGS. 6A-6C, the cross-section shown in FIGS. 16A-16C includes a barometric pressure sensor 1600 instead of a capacitive force sensor 210 or 604. Alternatively, the device 200 may include a capacitive force sensor 604, a pressure sensor 602, and a barometric pressure sensor 1600, which sensors may be used as described herein or in other ways.

The internal pressure sensor 602 may operate similarly to the pressure sensor described with reference to FIGS. 6A-6C, and in some cases may include a set of multiple pressure sensors distributed within the interior volume 204. Measurements obtained from multiple pressure sensors may be combined (e.g., averaged) to determine the pressure within the interior volume 204. The barometric pressure sensor 1600 may be configured to measure the barometric pressure of an environment exterior to the device 200 (e.g., an ambient pressure of the device 200). In some cases, the barometric pressure sensor 1600 may be used to measure the barometric pressure while a touch or force is being applied to the cover 202b. In some embodiments, the barometric pressure sensor 1600 may include a set of multiple pressure sensors, and measurements obtained from the multiple barometric pressure sensors may be combined (e.g., averaged) to determine the ambient pressure of the device 200.

In some embodiments, the barometric pressure sensor 1600 may extend through a sidewall of the housing 202a, as shown in FIG. 16A, with a pressure sensing element of the barometric pressure sensor 1600 oriented toward the environment exterior to the housing 202a, and an electrical interface of the barometric pressure sensor 1600 oriented toward the interior volume 204. In some cases, an air permeable but liquid water impermeable membrane may be disposed over the pressure sensing element of the barometric pressure sensor 1600, to protect it from water and debris in the environment exterior to the device 200. In some embodiments, a gel or other substance may be disposed over the pressure sensing element to protect it from water and debris.

A processor within the device 200 may be configured to determine an amount of force applied to the cover 202b using a first set of one or more signals generated by the internal pressure sensor 602 (or by a set of multiple internal pressure sensors) and a second set of one or more signals generated by the barometric pressure sensor 1600 (or by a set of multiple barometric pressure sensors).

While a pressure sensor alone may be able to detect a force, or amount of force, applied to the cover 202b, changes in the ambient pressure of the device 200 may be affect the pressure within the interior volume 204, as a result of the port 218 connecting the interior volume 204 to the environment exterior to the device 200. Sudden changes in the ambient pressure (e.g., as may be caused by a car door slam, an open window of a moving vehicle, or a moving elevator) may be more likely to cause an abrupt change in the pressure within the interior volume 204, which pressure change may be indistinguishable from a pressure change caused by a user's intentional press on the cover 202b. This can lead to accidental force triggers (e.g., an accidental selection of a function represented by an icon displayed on the device's display 208, such as the opening of an email while scrolling through a list of emails) or missed force triggers.

When the barometric pressure sensor 1600 is disposed to measure the ambient pressure of the device 200, and when the pressure sensor 602 disposed within the interior volume 204 may be affected by ambient pressure changes, the ambient pressure measured by the barometric pressure sensor 1600 may be used to adjust the pressure measured by the internal pressure sensor 602. For example, the ambient pressure may be subtracted from the internal pressure. The resultant pressure may provide a better indication of whether a force has been applied to the cover 202b, as well as an amount of the applied force. In some cases, the internal pressure may only be adjusted when the ambient pressure undergoes a change, or change above a threshold, within a predetermined period of time. In some cases, the internal pressure may be adjusted for any ambient pressure change. In some embodiments, the ambient pressure may or may not be used to adjust the internal pressure, but may be used as a secondary check to determine whether a force applied to the cover 202b is likely a user-applied force. For example, upon detecting a force using a pressure measurement obtained from the internal pressure sensor 602, an ambient pressure measurement obtained from the barometric pressure sensor 1600 may be used to determine whether a same or similar pressure change occurred external to the device 200. If so, the pressure change detected by the internal pressure sensor 602 may be ignored as not being associated with a user-applied force to the cover 202b. Still further, a sudden change in ambient pressure may be used to temporarily disable force sensing functionality of the device 200 or adjust a force sensing threshold.

FIG. 16B shows a user touching the cover 202b of the device 200 and applying an amount of force (e.g., $F_{finger}$) to the cover 202b. FIG. 16C shows the occurrence of an ambient pressure change while the user is touching the cover 202b (indicated by several smaller arrows applied to the external surfaces of the device 200).

Figure 17A:
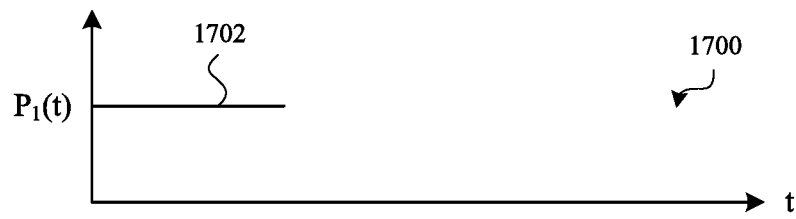
FIGS. 17A-17C are graphs of example outputs of the internal pressure sensor and barometric pressure sensor described with reference to FIGS. 16A-16C.
Figure 17A:
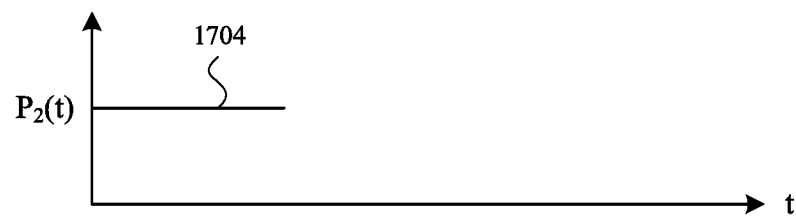
Figure 17B:
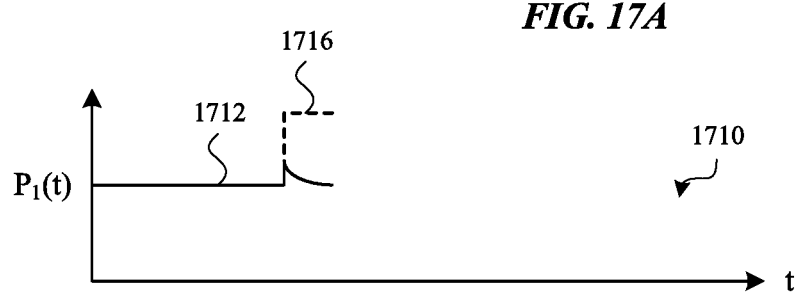
Figure 17C:
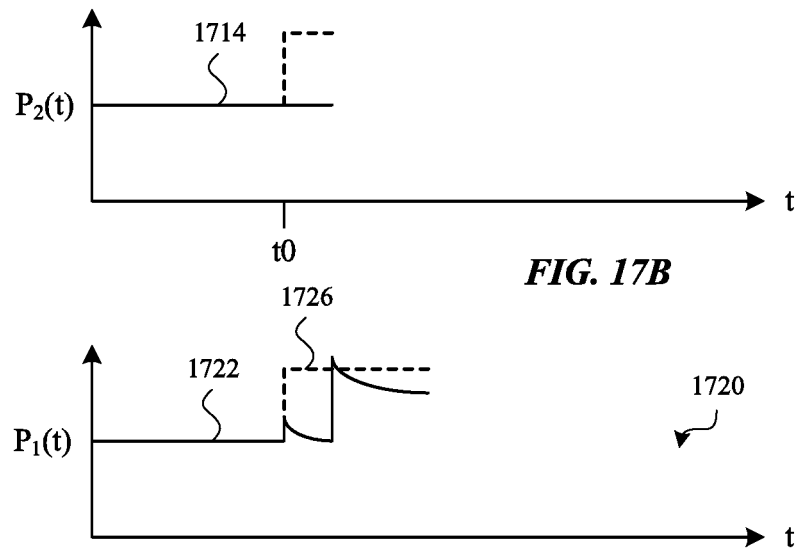
Figure 17C:
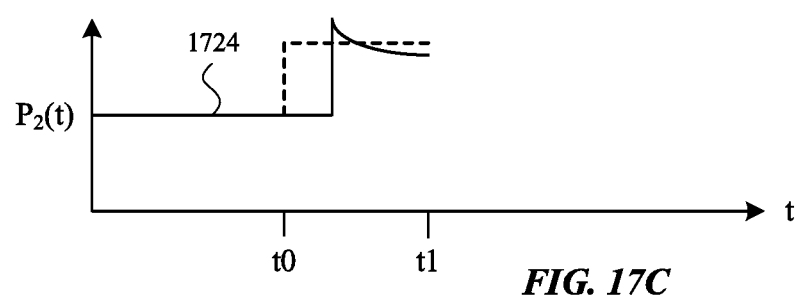

FIGS. 17A-17C are graphs of example outputs of the internal pressure sensor 602 and barometric pressure sensor 1600 described with reference to FIGS. 16A-16C. More particularly, FIG. 17A shows graphs 1700 of example outputs 1702, 1704 of the pressure sensor 602 and barometric pressure sensor 1600, $P_1(t)$ and $P_2(t)$, during the steady state condition shown in FIG. 16A, in which no force is applied to the cover 202b. FIG. 17B shows graphs 1710 of example outputs 1712, 1714 of the pressure sensor 602 and barometric pressure sensor 1600, $P_1(t)$ and $P_2(t)$, in response to a user touching and applying a force to the center of the cover 202b. The touch event is indicated by a dashed stepped waveform 1716. FIG. 17C shows graphs 1720 of example outputs 1722, 1724 of the pressure sensor 602 and barometric pressure sensor 1600, $P_1(t)$ and $P_2(t)$, during a change in ambient pressure that occurs while the user is touching and applying a force to the cover 202b.

As shown in FIG. 17B, a touch on the cover 202b may be detected at a time t0 (as indicated by a dashed stepped waveform 1716). As shown, $P_1(t)$ temporarily spikes due to an increase in pressure within the interior volume 204 at time t0, and then decreases as air in the interior volume escapes through the port 218. The ambient pressure, $P_2(t)$, is unaffected by the force applied to the cover 202b and does not change.

Figure 17D:
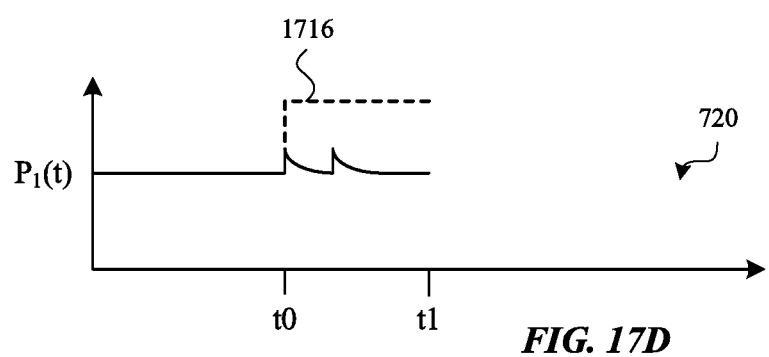
FIG. 17D is a graph of an adjusted internal pressure (adjusted from FIG. 17C)

As shown in FIG. 17C, the ambient pressure of the device, $P_2(t)$, may experience a sudden change at time t1. A similar but lesser change may be experienced within the interior volume 204 of the device 200, and may cause $P_1(t)$ to likewise experience a sudden change. In some cases, the change in $P_1(t)$ may be sufficient to cause $P_1(t)$ to exceed a force detection threshold. However, if $P_1(t)$ is adjusted for the pressure change in $P_2(t)$, the resultant $P_1(t)$ at t1 may be as shown in FIG. 17D, and may not exceed the force detection threshold.

FIGS. 18A-18D show various examples of how a measurement of internal pressure (e.g., a measurement obtained from the internal pressure sensor 602) may be adjusted using a measurement of barometric or ambient pressure (e.g., a measurement obtained from the barometric pressure sensor 1600). The process flows described with reference to FIGS. 18A-18D may be implemented using a processor or other circuit, and may use measurements obtained from an internal pressure sensor 602 and barometric pressure sensor 1600 as inputs. For ease of explanation, the process flows shown in FIGS. 18A-18D are described with reference to the device 200 shown in FIG. 16A.

Figure 18A:
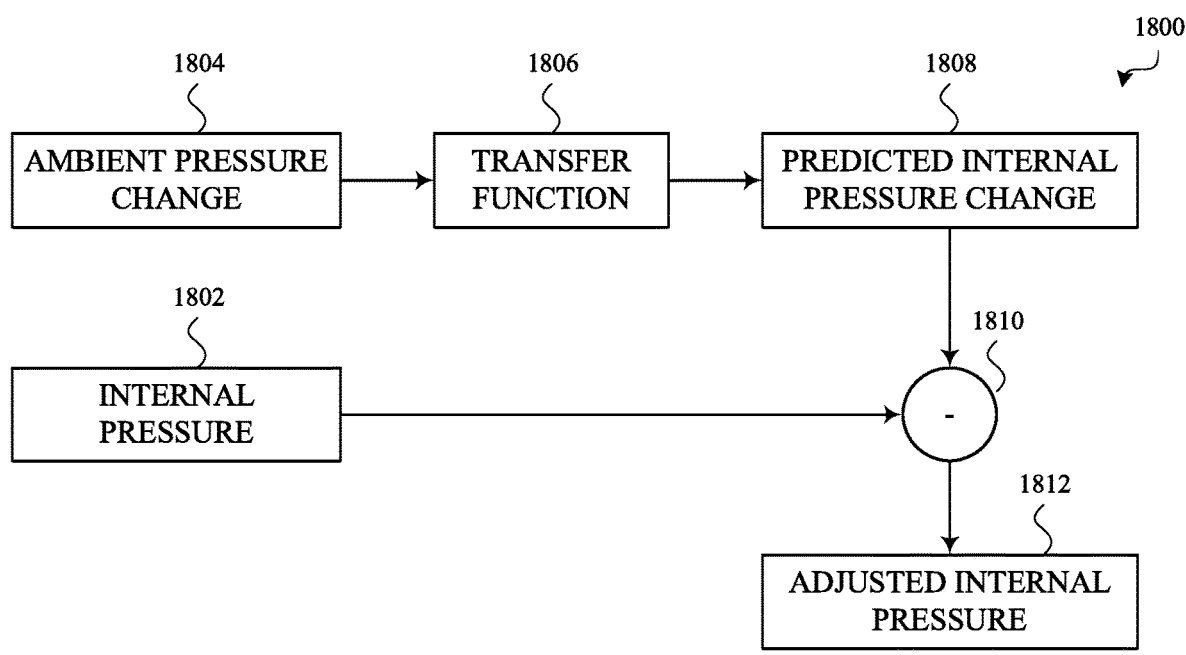
FIGS. 18A-18D show various examples of how a measurement of internal pressure may be adjusted using a measurement of barometric or ambient pressure.

In the flow 1800 shown in FIG. 18A, a measurement of the pressure within a device's interior volume 204 may be obtained at block 1802, and a measurement of the ambient pressure of the device 200 may be obtained at block 1804. In some embodiments, the measurements may be correlated in time (e.g., the measurements may be obtained at the same or approximately same time). In some cases, each of the measurements may be acquired as a time varying measurement (e.g., $P_1(t)$ and $P_2(t)$). At block 1804, a change in ambient pressure may be identified. In some embodiments, the change may be a change that exceeds a predetermined threshold (e.g., a change that causes the ambient pressure to exceed a threshold ambient pressure, or a change in ambient pressure that exceeds a predetermined ambient pressure change threshold or a predetermined percentage change in ambient pressure). In response to identifying the change in ambient pressure, a processor may use a transfer function 1806 to determine how the change in ambient pressure may affect the internal pressure, and may estimate (or predict) an internal pressure change 1808 that is likely to occur in response to the ambient pressure change. At block 1810, the processor may subtract the estimated internal pressure change from the measured internal pressure to yield an adjusted internal pressure 1812.

Figure 18B:
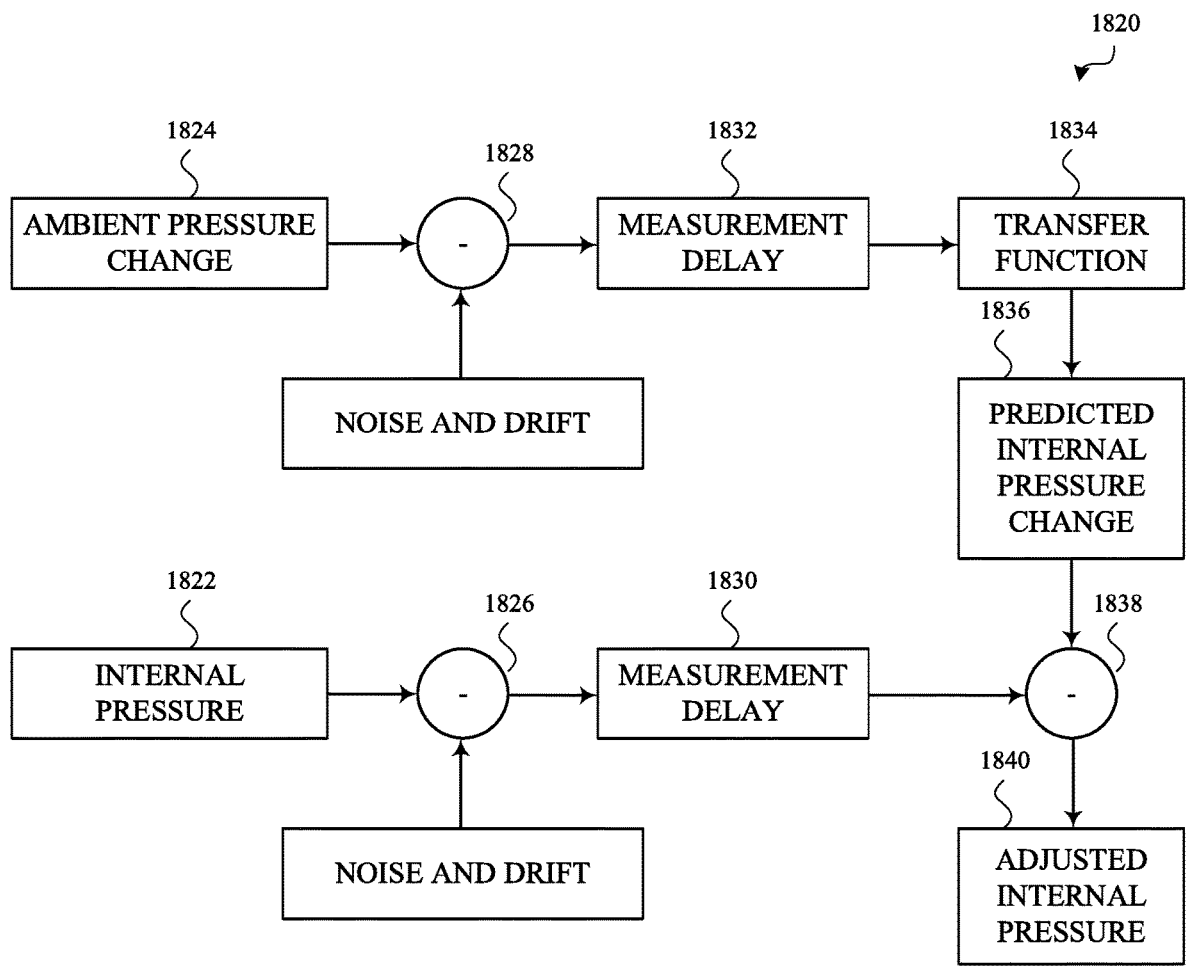

In the flow 1820 shown in FIG. 18B, a measurement of the pressure within a device's interior volume 204 may be obtained at block 1822, and a measurement of the ambient pressure of the device 200 may be obtained at block 1824. In some embodiments, the measurements may be correlated in time (e.g., the measurements may be obtained at the same or approximately same time). In some cases, each of the measurements may be acquired as a time varying measurement (e.g., $P_1(t)$ and $P_2(t)$). At block 1824, a change in ambient pressure may be identified. In some embodiments, the change may be a change that exceeds a predetermined threshold (e.g., a change that causes the ambient pressure to exceed a threshold ambient pressure, or a change in ambient pressure that exceeds a predetermined ambient pressure change threshold or a predetermined percentage change in ambient pressure).

Each of the internal pressure and the ambient pressure (or change in ambient pressure) may be adjusted to account for noise and accuracy drift in the sensors (e.g., at blocks 1826 and 1828). At blocks 1830 and 1832, one or both of the internal pressure and ambient pressure (or change in ambient pressure) may be adjusted to account for measurement delay. In other words, the measurement of ambient pressure may be time-synchronized with the measurement of internal pressure, or vice versa; or the measurement of ambient pressure may be adjusted (e.g., interpolated from measurements of ambient pressure made at times other than the time at which the measurement of internal pressure is obtained, or vice versa). In some embodiments, the internal pressure and ambient pressure may be respectively adjusted according to the functions:

$$H(s)=e^{-sb}; H(s)=e^{-sa}$$

where H(s) is a sensor measurement, a is an electrical delay of the barometric pressure sensor 1600, and b is an electrical delay of the internal pressure sensor 602. In some embodiments, the operations performed through blocks 1830 and 1832 may be performed by the internal pressure sensor 602 and barometric pressure sensor 1600 (or circuitry associated with these sensors).

A processor may use a transfer function 1834 to determine how the change in ambient pressure may affect the internal pressure, and may estimate (or predict) an internal pressure change 1836 that is likely to occur in response to the ambient pressure change. By way of example, the transfer function may be:

$$H(s) = \frac{P_1(s)}{P_2(s)} = \frac{As+1}{(A+B)s+1}$$

where A and B are functions of the port resistance, cover area, cover stiffness, and size of the interior volume. At block 1838, the processor may subtract the estimated internal pressure change from the measured internal pressure to yield an adjusted internal pressure 1840.

Figure 18C:
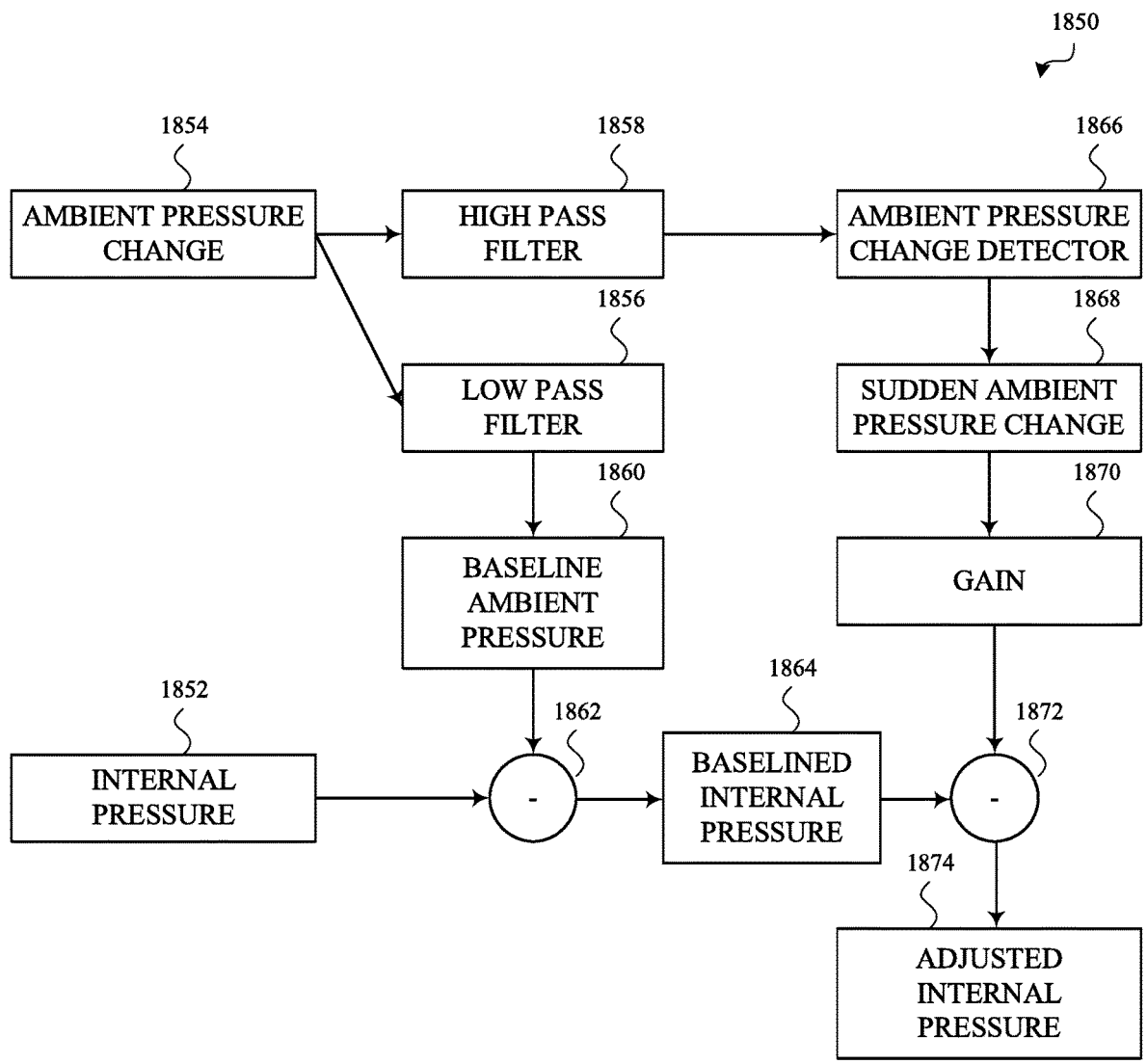
Figure 18D:
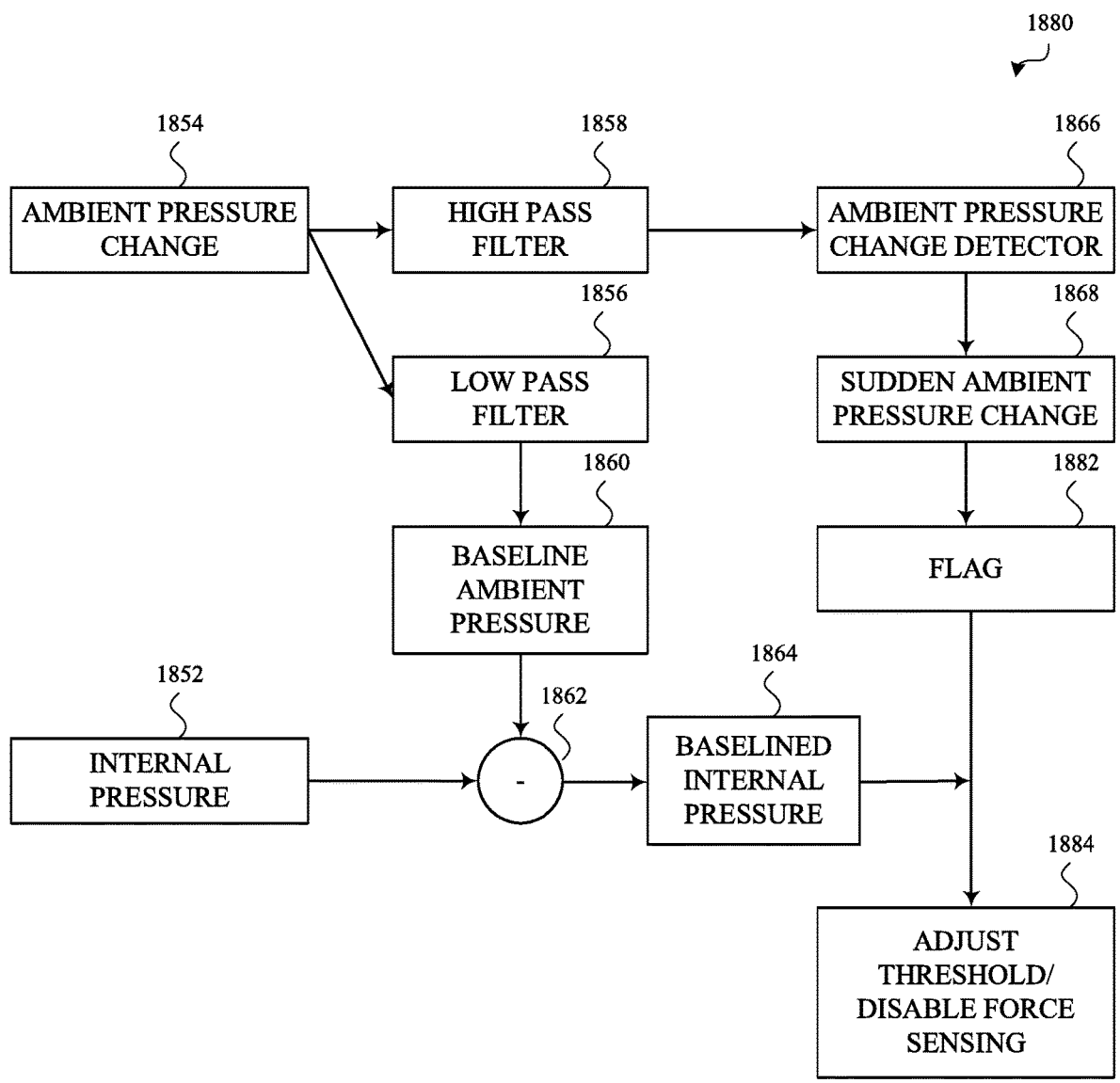

The flows described with reference to FIGS. 18A-18B may be considered full differential adjustment flows. FIGS. 18C-18D show partial differential adjustment flows. Turning now to FIG. 18C, a flow 1850 is shown in which measurements of internal pressure and ambient pressure may be obtained, at blocks 1852 and 1854, as described with reference to FIG. 18A. The ambient pressure measurement may be separately processed by a low pass filter 1856 and a high pass filter 1858. The low pass filtered measurement may be used to determine a baseline ambient pressure 1860, which baseline ambient pressure 1860 may be combined with (e.g., subtracted from) the internal pressure measurement at block 1862 to yield a baselined internal pressure 1864. The high pass filtered measurement 1858 may be used to identify a sudden ambient pressure change (e.g., at blocks 1866 and 1868), which sudden ambient pressure change may be used to determine a gain over the baseline ambient pressure at block 1870. The determined gain may be used to adjust the measured and baseline-adjusted internal pressure measurement 1864 at block 1872, to yield an adjusted internal pressure 1874.

FIG. 18D shows a variation of the flow 1850 described with reference to FIG. 18C. In the flow 1880, the high pass filtered measurement of the ambient pressure may be used to identify a sudden ambient pressure change (e.g., at block 1868), which sudden ambient pressure change may be flagged at block 1882 and used to increase the force detection threshold to which the measured and baseline-adjusted internal pressure 1864 is compared to determine whether an amount of force applied to the cover 202b is sufficient to trigger an action, or to temporarily disable force sensing functionality, or take other actions at block 1884.

Figure 19:
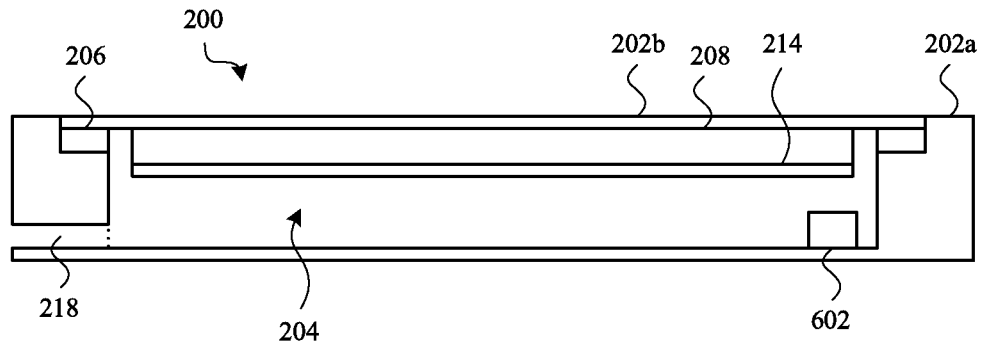
FIG. 19 shows another example cross-section of the device described with reference to FIG. 2A.

FIG. 19 shows another example cross-section of the device 200 described with reference to FIG. 2A. As shown in FIG. 19, the force-sensing mechanism of the device 200 may only include a pressure sensor 602. In alternative embodiments, the device 200 may also include a capacitive force sensor, a barometric pressure sensor, or other sensors that may be used to determine a force applied to the device.

Figure 20:
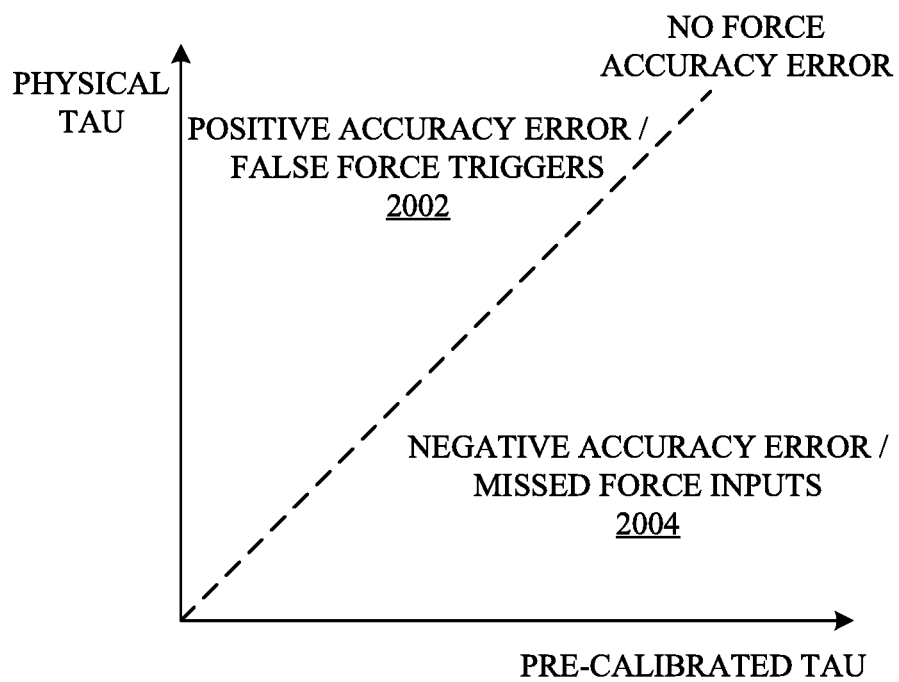
FIG. 20 shows how a change in physical τ (the component of τ dependent on the physical characteristics of a device) can translate to accuracy errors in sensed force determinations.

As discussed with reference to FIGS. 8-10C, the force-sensing capability of a pressure sensor may be depend on a parameter τ. However, the value of τ may depend on the physical characteristics of a device, and may therefore change from a pre-calibrated value as the physical characteristics of the device change (e.g., as a result of device wear over time, or as a result of device damage). As shown in FIG. 20, change in physical τ (the component of τ dependent on the physical characteristics of a device) can translate to accuracy errors in sensed force determinations. A positive accuracy error 2002 (in which physical τ is greater than a pre-calibrated value of τ) can make a force-sensing pressure sensor easier to trigger and increase the risk of false force triggers. A negative accuracy error 2004 (in which physical τ is less than the pre-calibrated value of τ) can make a force-sensing pressure sensor harder to trigger and increase the risk of missed force inputs.

τ is inversely proportional to the vent flow rate of a device (e.g., the flow rate through the port 218 (FIG. 19) that is used to vent the interior volume, or the flow rate through all vent paths, including cracks in the cover 202b, damaged seals, and so on). The vent flow rate through the port 218 (and other paths through which air within the interior volume can escape) can change as a result of device wear, device damage, temperature, ambient pressure change, blockage of the port 218, and so on. Dynamically calibrating τ in the field, and even calibrating τ when a user is using a device, can therefore improve the accuracy of input force detection using a pressure sensor of the device, or can improve an algorithm that determines when a pressure sensor, a capacitive force sensor, another type of sensor, or a combination thereof, is used to determine whether a force has been applied to a device and/or an amount of the force.

In some embodiments, the value of τ can be calibrated by monitoring the pressure equalization interior to a device after a user removes a force applied to a cover of the device (as described with reference to FIGS. 21-23), or by continuously monitoring the pressure difference between internal and ambient pressures of the device, or by correlating pressure data with acceleration data.

Figure 21:
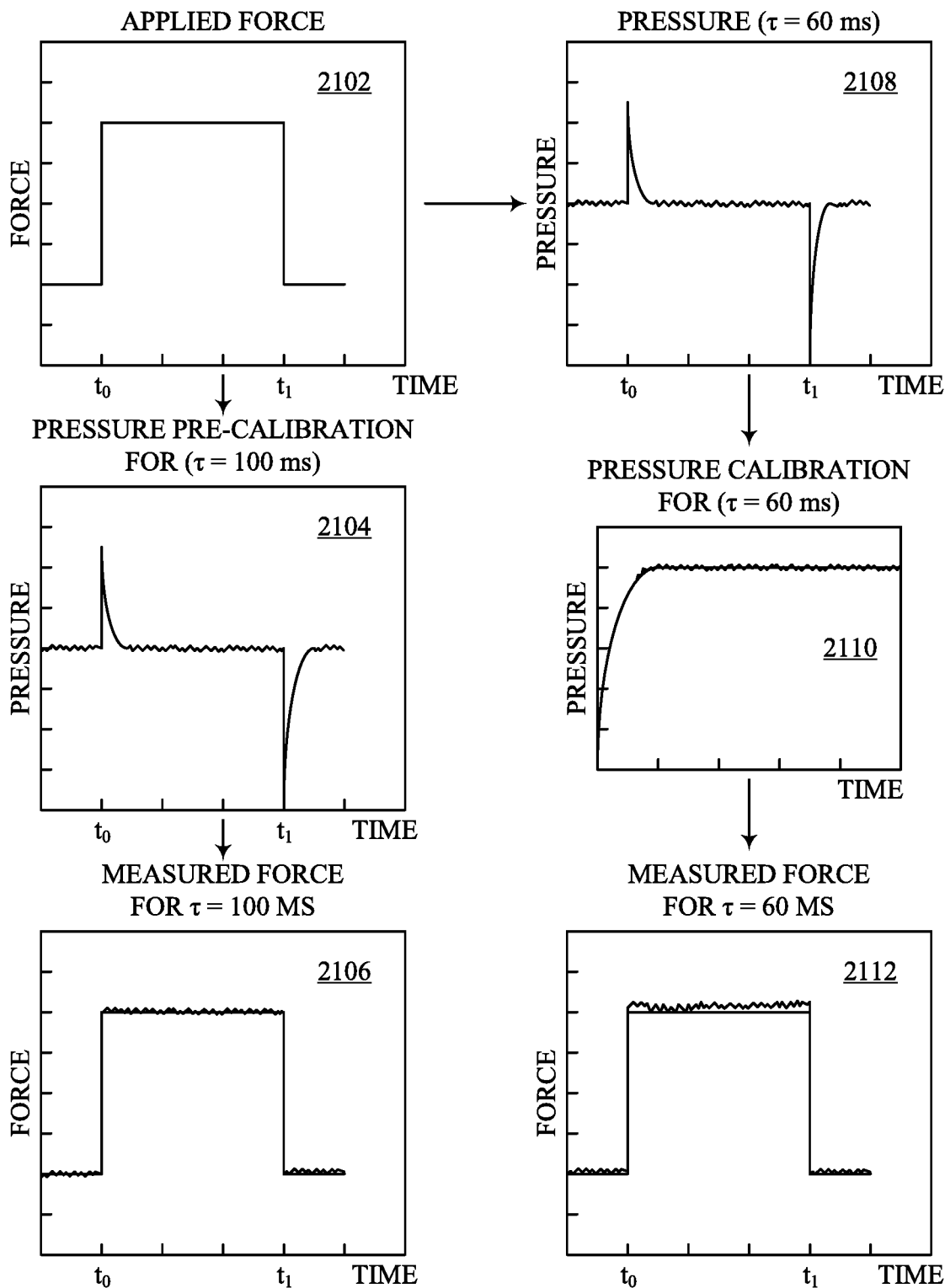
FIG. 21 shows an example of how τ may be pre-calibrated and field calibrated for a device.

FIG. 21 shows an example of how τ may be pre-calibrated and field calibrated for a device. As shown by a graph 2102 of force over time, a user or calibration device may apply a predetermined amount of force (e.g., a 200 gF force) to a cover of a device at time t0. In some embodiments, the device may be the device 200 described with reference to FIG. 19. The user may release the force at time t1. As shown by a graph 2104 of pressure over time, application of the predetermined force at time t0 may cause a temporary positive spike in the device's internal pressure, and release of the predetermined force at time t1 may cause a temporary negative spike in the device's internal pressure. A value of τ may be determined from the time it takes the negative spike in internal pressure to increase to a steady state internal pressure. By way of example, the value of τ may be 100 milliseconds (ms), and this may be the pre-calibrated value of τ. Using the pre-calibrated value of τ, the device may later determine that a 200 gF force has been applied to the cover of the device, as shown by graph 2106. The device may determine when different amounts of force have been applied to the cover of the device by extrapolating from the data shown in graphs 2102, 2104, and 2106, or by interpolating from data obtained by applying different amounts of force to the cover of the device. Force determinations may also be determined using the ideal gas law:

$PV=nRT$

When a user applies a 200 gF force to the cover of the device in the field, the value of τ may have changed, as shown by a graph 2108 of pressure over time. By way of example, the graph 2108 shows τ to have changed to 60 ms. In some cases, the new value of τ may be determined by sampling the pressure at times around the negative spike in internal pressure and subsequent exponential increase in internal pressure, and fitting a curve to sampled internal pressures during the exponential increase in internal pressure, as shown in a graph 2110 of pressure over time. Using the determined new value of τ, the device may determine that a 200 gF has been applied to the cover of the device as shown by graph 2112.

Figure 22:
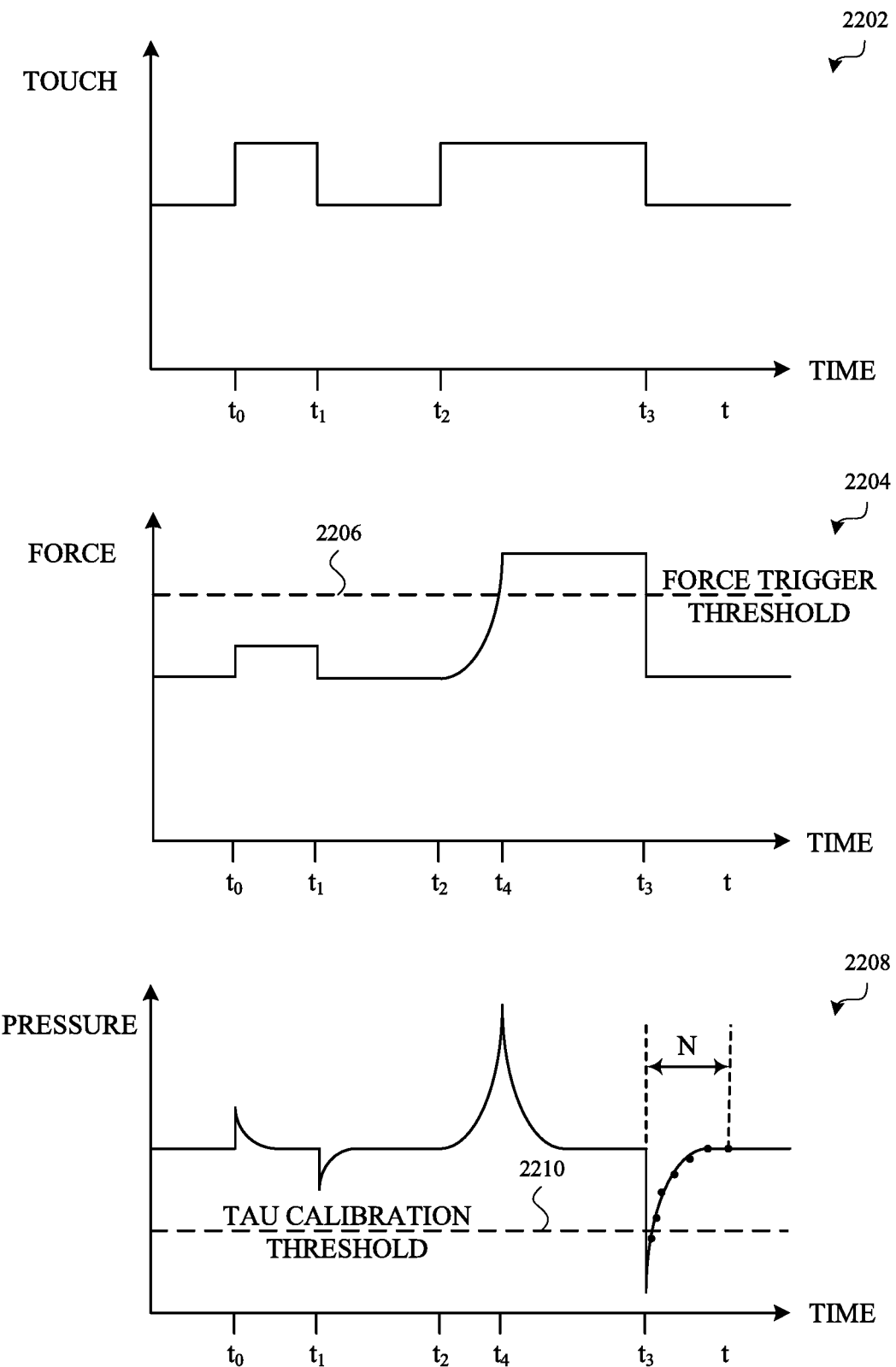
FIG. 22 shows example correlated graphs of touch, force, and pressure on the cover of a device.

FIG. 22 shows example correlated graphs of touch, force, and pressure on the cover of a device. As shown in graph 2202, a user may touch a device at time t0, stop touching the device at time t1, touch the device again at time t2, and stop touching the device again at time t3. As shown in graph 2204, an amount of force associated with the touch between times t0 and t1 may not exceed a force trigger threshold 2206. An amount of force associated with the touch between times t2 and t3 may exceed the force trigger threshold 2206, but not until a time t4, which time is between times t2 and t3. As shown in graph 2208, the pressure internal to the device may spike in a positive direction when an amount of force is applied with each touch (e.g., at times t0 and t2), and spike in a negative direction when an amount of force is released (e.g., at times t1 and t3). The pressure may increase or decrease as the amount of applied force changes (e.g., the pressure may increase with the increase in applied force between times t2 and t4).

Figure 23:
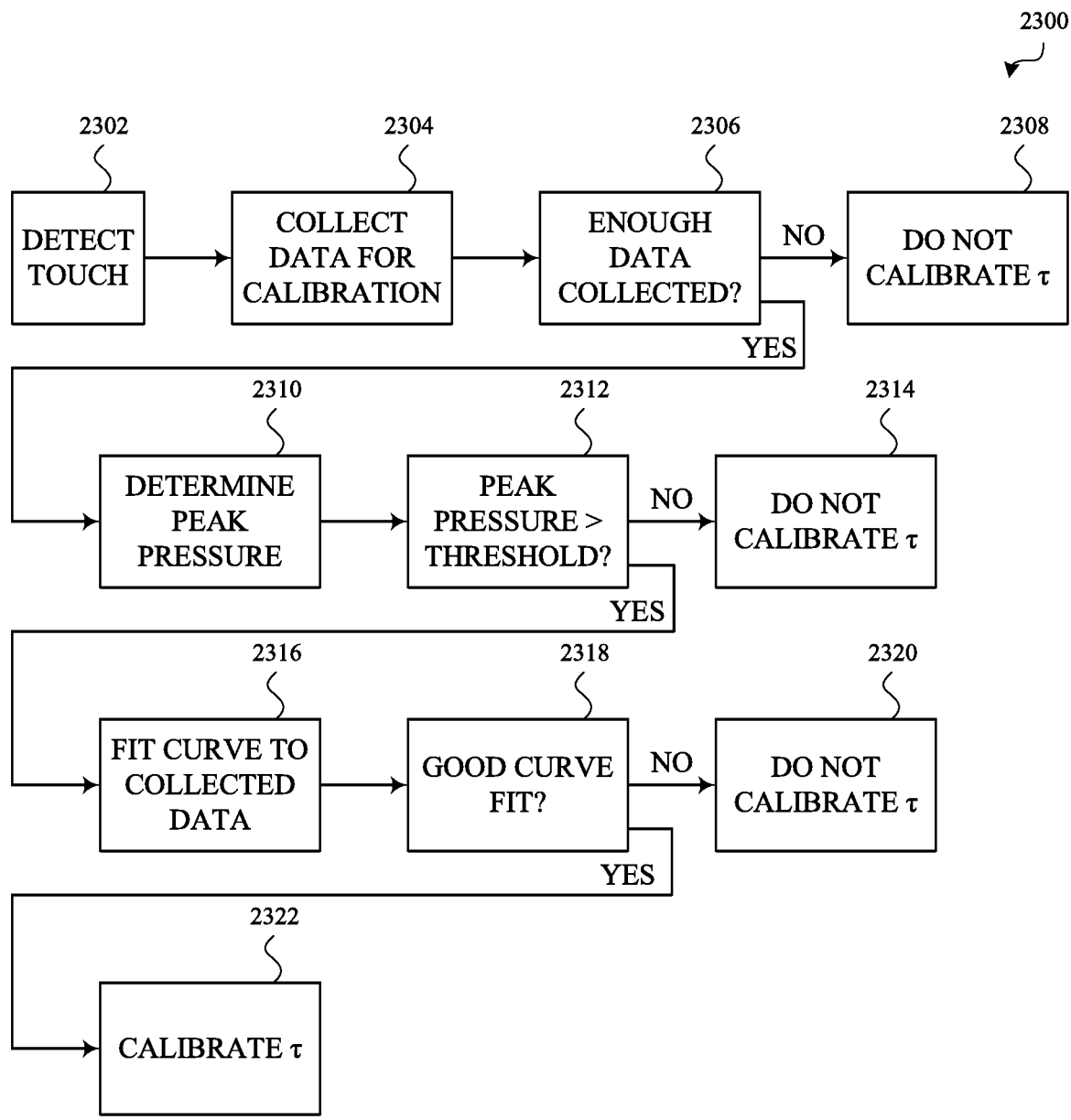
FIG. 23 shows an example method for performing a field calibration of τ.

In some embodiments, a field calibration of τ may only be performed when a negative spike in internal pressure exceeds a τ calibration threshold 2210 and/or when a number of internal pressure samples exceeds a threshold number of samples, N. One example method 2300 for performing a field calibration of τ is shown in FIG. 23. The method 2300 may include detecting a touch (e.g., touch>no touch) at block 2302. At block 2304, data (e.g., internal pressure samples) may be collected for τ calibration. At block 2306, it may be determined whether enough internal pressure samples has been collected before a next touch (e.g., is the number of internal pressure samples>N). If no, a determination to not calibrate τ may be made at block 2308. If yes, a peak pressure during the touch, $P_{peak}$, may be determined at block 2310. It may be determined whether the peak pressure exceeds a τ calibration threshold at block 2312. If no, a determination to not calibrate τ may be made at block 2314. If yes, a curve may be fitted to the sampled internal pressures representing the exponential increase in internal pressure following the negative spike in internal pressure (e.g., at block 2316). The curve may be fit using the following equation:

$P=-P_{peak}^{-t/\tau}$

At block 2318, it may be determined whether the curve fitting satisfies a curve fitting threshold (e.g., a goodness of fit threshold). When the curve fitting threshold is not satisfied, a determination to not calibrate τ may be made at block 2320. When the curve fitting threshold is satisfied, τ may be calibrated to a new value indicated by the curve fitting at block 2322.

In some cases, τ may alternatively be calibrated by continuously monitoring the pressure difference between internal and ambient pressures of a device, and correcting τ using the equation:

$$H(s) = \frac{\theta(\tau s + 1)}{\tau s + 1}$$

where θ represents the difference between the internal and ambient pressures.

As previously mentioned, a pressure detected by a pressure sensor may depend on temperature, as quantified by the ideal gas law. For example, the pressure internal to a device may depend on the temperature within the device, which may differ from the ambient temperature of the device. The temperature within a well-sealed but vented device may depend, for example, on heat produced by one or more processors or other components within the device, thermal conduction from the exterior surfaces of the device (including the front cover of the device), and so on. In some cases, a change in temperature within a device may lead to a change in pressure that is not caused by a user-applied force, but is instead due to the temperature change. It may therefore be useful to measure the temperature within the interior volume of a device, instead of estimating or factoring out temperature effects.

Figure 24:
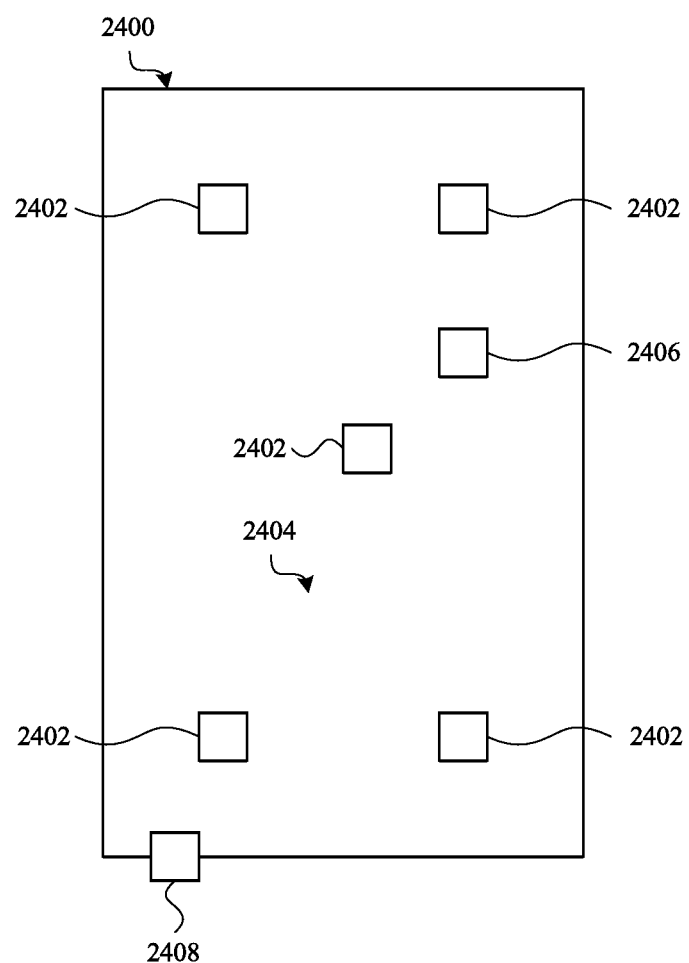
FIG. 24 shows how τ may be calibrated by continuously monitoring the pressure difference between internal and ambient pressures of a device.

FIG. 24 shows an example distribution of temperature sensors 2402 within a device 2400. The device 2400 may be an example of the device described with reference to FIG. 2A, 16A, or 19 (or other devices described herein). Each temperature sensor 2402 may be disposed to measure the temperature of the air within an interior volume 2404 of the device, or the temperature of a component within the interior volume (which component temperature may affect the temperature of the air within the interior volume). In some cases, as few as one temperature sensor may be provided. In other cases, a set of multiple temperature sensors may be provided. Measurements of temperature provided by a set of multiple temperature sensors may be used individually when detecting or determining an amount of force applied to a cover of the device, or measurements of temperature may be combined (e.g., combined to yield an average temperature, or combined to yield a weighted average temperature). A relationship between internal pressure (e.g., one or more internal pressure measurements obtained by one or more pressure sensors 2406) and internal temperature (e.g., one or more temperature measurements obtained by one or more temperature sensors 2402) may be calibrated using the ideal gas law and/or by empirically measuring and quantifying the relationship between internal pressure and internal temperature. Internal pressure measurements taken in the field may be calibrated based on internal temperature measurement(s).

In some embodiments, the device 2400 may include a barometric pressure sensor 2408 and/or other sensors that may be used to detect a force applied to a cover of the device 2400 and determine an amount of the force applied to the cover.

In some cases, the linearity and dynamic range of force sensing technologies that use a device cover as the force transduction layer may be limited by the amount of z space into which the cover may deflect. The range of force sensing between a no force condition in which a cover is at rest, and a maximum force condition in which the cover bottoms out against a housing or other component of the device, is defined herein as a device's dynamic range. Often, larger devices (e.g., a tablet computer) have little or no increase in z space over smaller devices (e.g., a smartphone or electronic watch), and the dynamic range of such larger devices may not provide a good user experience when a device relies on changes in the z space for force sensing. One way to improve a device's z space is to reduce the thickness of its battery. Another way to improve a device's z space is to increase the device's overall thickness. Neither of these alternatives may be attractive.

In some embodiments, the z space of a device may be effectively increased by changing the relationship between the amount of force applied to the device's cover and the amount of deflection (or displacement) of the cover in z space. That is, the cover's deflection in response to a predetermined amount of force may be reduced. This may be accomplished by increasing the spring force that opposes deflection of the cover in response to an applied force.

Figure 25:
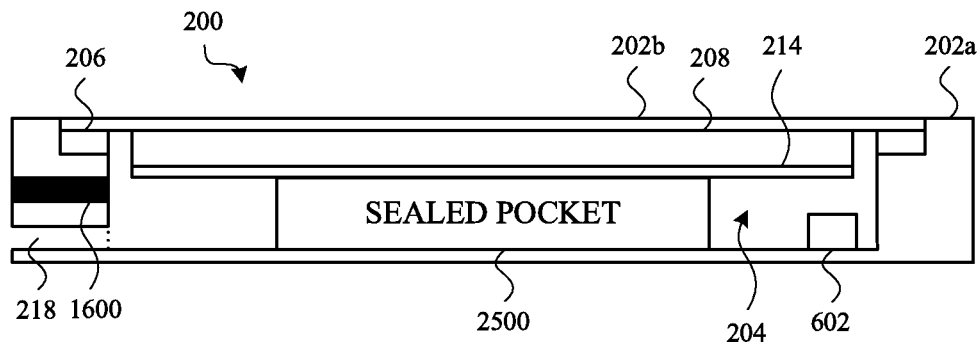
FIG. 25 shows another example cross-section of the device 200 described with reference to FIG. 2A.

FIG. 25 shows another example cross-section of the device 200 described with reference to FIG. 2A. FIG. 25 also shows an alternative to the cross-section described with reference to FIGS. 16A-16C. As shown in FIG. 25, the spring force that opposes deflection of the cover 202*b* may be increased by defining one or more sealed pockets 2500 within the interior volume 204. The sealed pocket 2500 may be less deformable than an air-filled space within the interior volume 2-4, and may operate as a spring that opposes forces applied to the cover 202*b*. The stiffness of the sealed pocket 2500 may depend on the size (e.g., length, width, and height) of the sealed pocket 2500, the density of a gas (e.g., air), liquid, or gel within the sealed pocket, and the material(s) used to define the sealed pocket 2500. In some embodiments, the sealed pocket 2500 may be an air pocket that operates as an air spring. The sealed pocket 2500 may be vented or non-vented, with greater venting tending to decrease the resistance provided by the sealed pocket 2500. An internal pressure sensor 602 may be disposed outside or inside the sealed pocket 2500.

Figure 26:
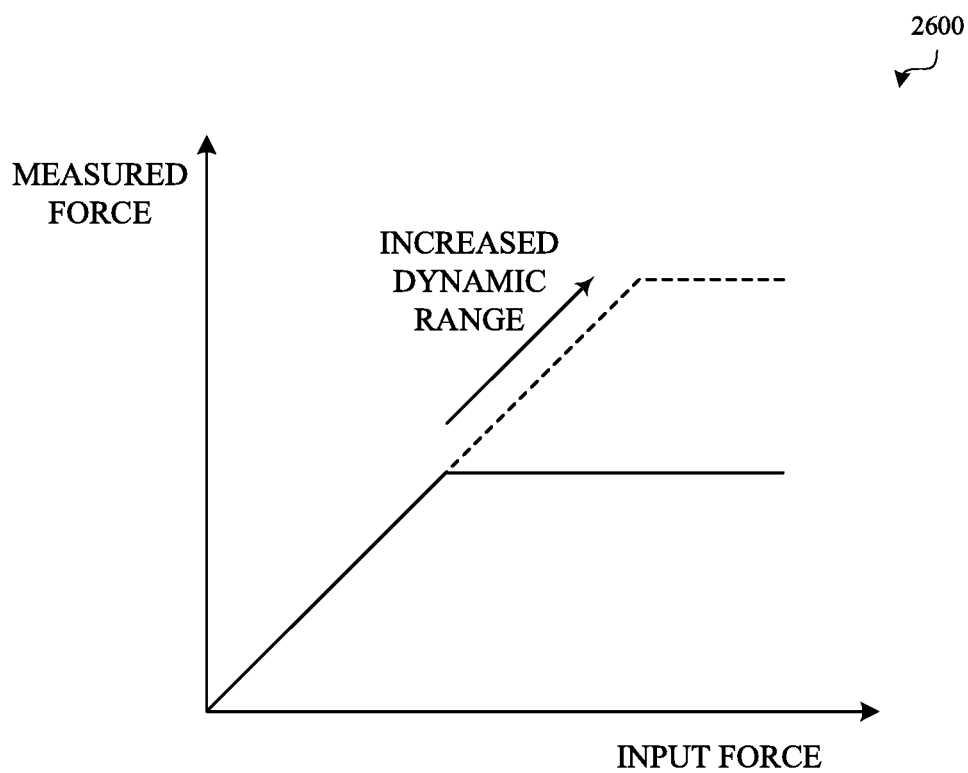
FIG. 26 is a graph of the amount of force applied to a device's cover compared to the amount of force measured by a pressure sensor disposed within an interior volume of the device.

FIG. 26 is a graph 2600 of the amount of force applied to a device's cover compared to the amount of force measured by a pressure sensor disposed within an interior volume of the device. As shown, the sealed pocket 2500 described with reference to FIG. 25 can increase the dynamic range of the device.

In some cases, ambient pressure fluctuation and/or ambient temperature fluctuation can add low frequency noise to the pressure sensed by a pressure sensor interior to a device. Ambient pressure fluctuation can produce what is commonly referred to as red noise, and ambient pressure fluctuation an produce what is commonly referred to as pink noise. Red noise and pink noise are often correlated in time with a user's use of a device, and in some cases can affect the measurement of pressure by a pressure sensor, such that a force input is identified when no force input exists, or such that an intended force input is missed.

Figure 27:
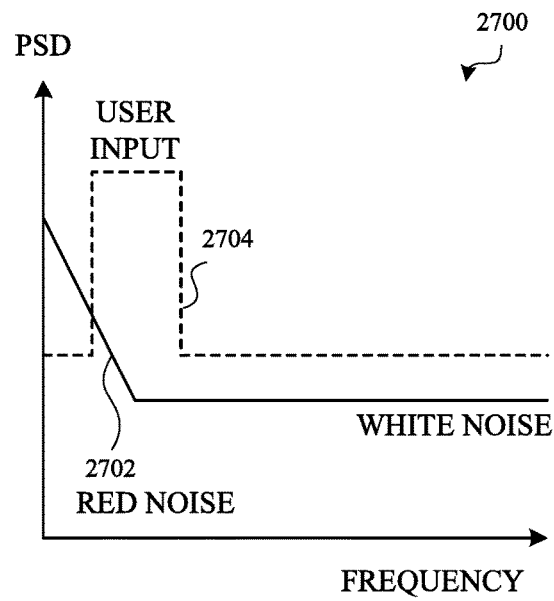
FIG. 27 shows a graph of pressure spectral density (PSD) verses frequency, and illustrates how low frequency noise (e.g., red noise) may interfere with a user input.

FIG. 27 shows a graph 2700 of pressure spectral density (PSD) verses frequency, and illustrates how low frequency noise 2702 (e.g., red noise) may interfere with a user input 2704 (i.e., a force input). To enable separation of the low frequency noise 2702 from the user input 2704, the size of an interior volume of a device may be modulated up to a frequency that is above the cutoff frequency of the low frequency noise 2702. This sort of modulation may be referred to as chopping (or nested chopping). The modulated volume produces a modulated pressure, in accordance with the ideal gas law. Any change in the interior volume of a device, which change is a result of a user-applied force to the cover of the device, may be detected or determined (e.g., measured) by demodulating the pressure signal using the volume modulation frequency.

Figure 28:
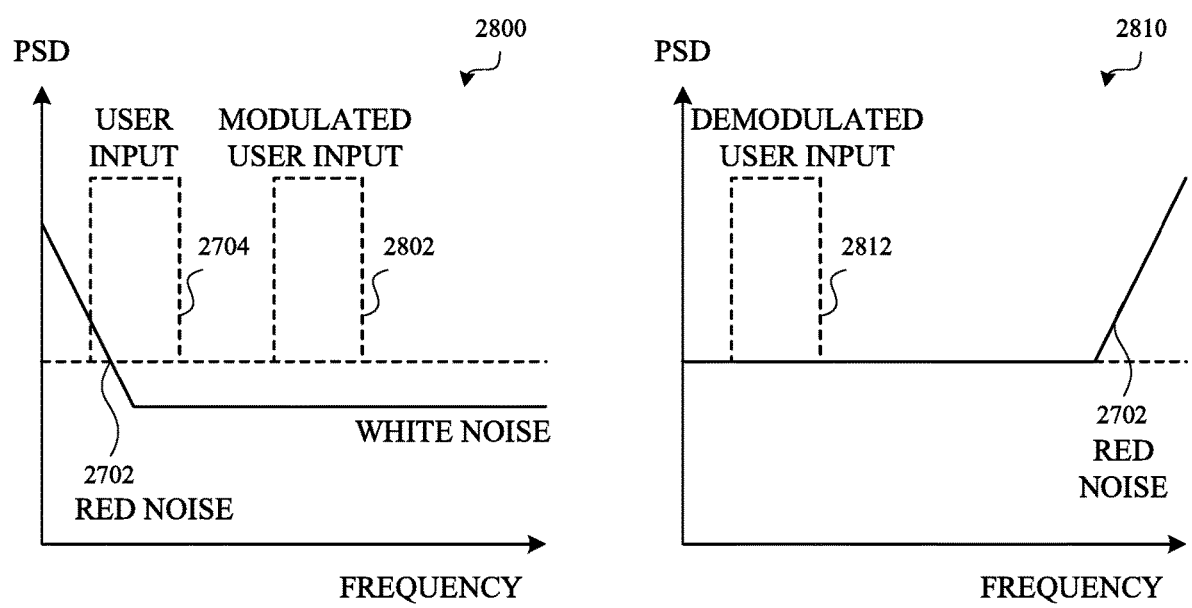
FIG. 28 shows graphs of PSD verses frequency after modulation and demodulation of a user input (e.g., a force input or pressure)

FIG. 28 shows graphs 2800, 2810 of PSD verses frequency after modulation and demodulation of a user input (e.g., a force input or pressure). The user input 2704 may be modulated as modulated user input 2802, as shown in graph 2800, by modulating the size of a device's interior volume. The modulated user input 2802 may be demodulated as demodulated user input 2812, as shown in graph 2810, using the volume modulation frequency. As can be appreciated from the graph 2810, the modulation and demodulation can separate the user input from the low frequency noise.

Figure 29:
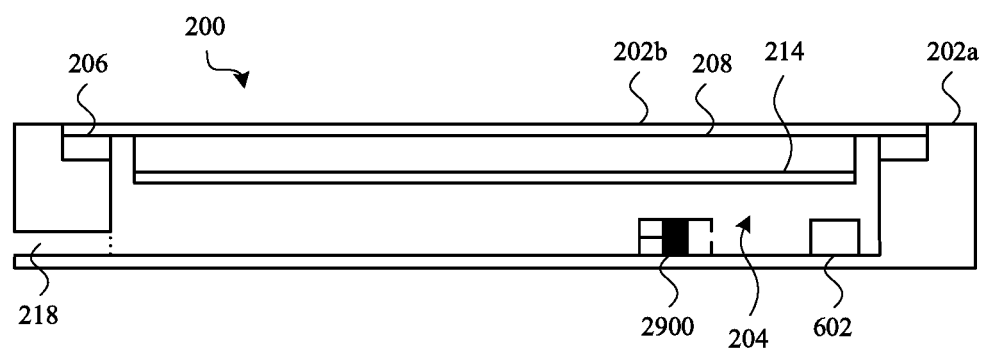
FIG. 29 shows another example cross-section of the device described with reference to FIG. 2A.

FIG. 29 shows another example cross-section of the device 200 described with reference to FIG. 2A. As shown in FIG. 29, the device 200 may include an internal pressure sensor 602 and a volume modulation device 2900 (e.g., a pressure chopper). In some examples, the volume modulation device 2900 may include a haptic engine, an open back speaker, or an open vent Arc, disposed in or near the interior volume 204. In some embodiments, the volume modulation frequency may be less than 20 Hertz (Hz), to mitigate ambient pressure drifts.

Figure 30:
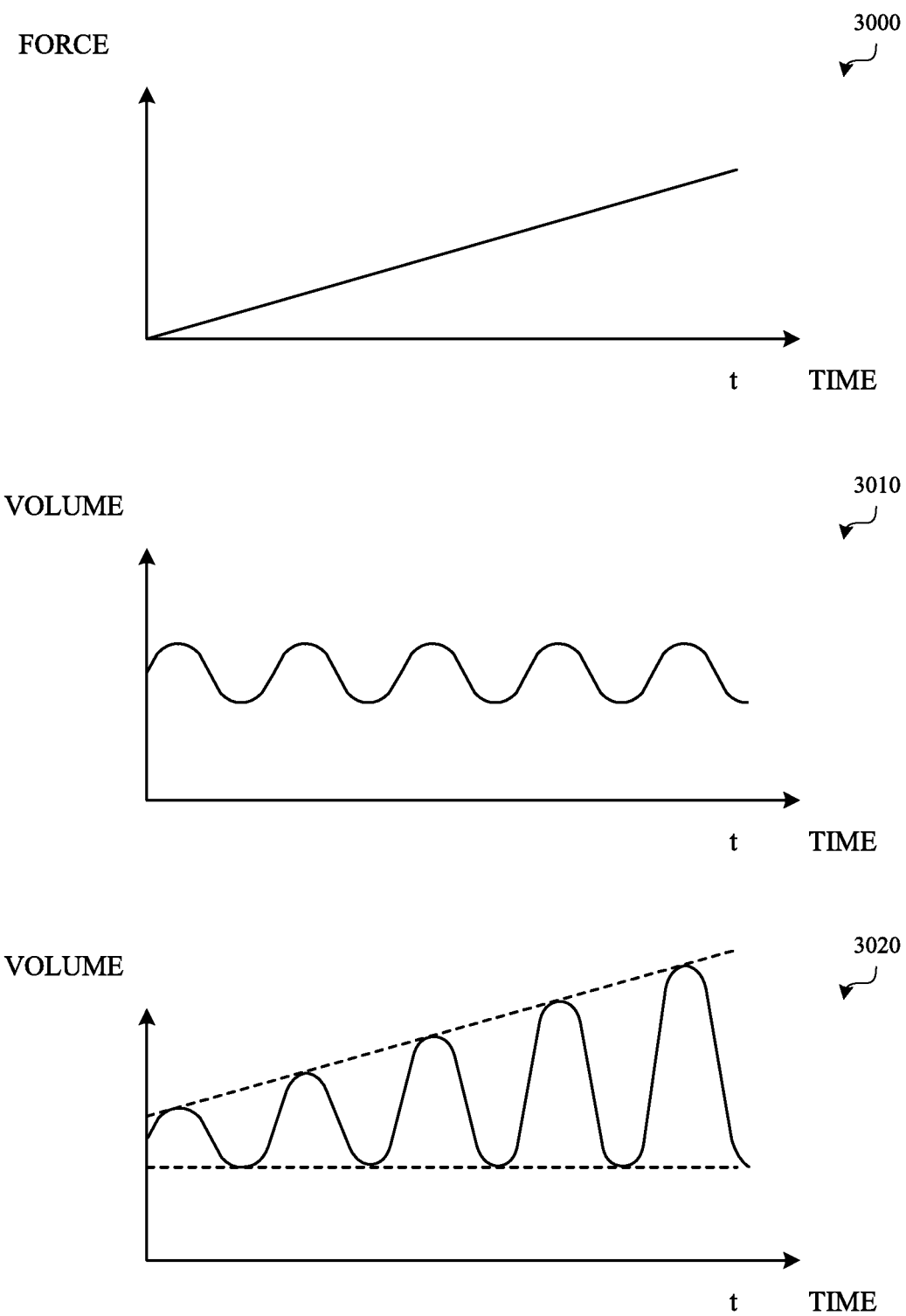
FIG. 30 shows example correlated graphs of force, volume, and pressure on the cover of a device.

FIG. 30 shows example correlated graphs of force, volume, and pressure on the cover of a device (e.g., on the cover 202*b* of the device 200 described with reference to FIG. 29). A graph 3000 of force over time arbitrarily shows that a force applied to a cover of a device increases over time. A graph 3010 of volume over time shows that the interior volume of the device may be modulated (e.g., in accordance with a volume modulation frequency). A graph 3020 of pressure over time shows that the pressure may modulate over time in relation to an amount of the applied force. By demodulating the pressure using the volume modulation frequency, the amount of the applied force may be determined.

In some cases, the pressure (or change in pressure) measured by a pressure sensor disposed within an interior volume of a device may be very small. Conventional pressure sensors are designed to measure absolute pressure, rather than relative pressure change, and may be accurate over the entire atmospheric pressure range on earth (e.g., 30 kPA-110 kPA). When a pressure sensor is designed to measure pressure over a wide dynamic range, the noise floor for measuring relative pressure change may be high. For a pressure sensor disposed within the interior volume of a device and configured to measure small changes in pressure resulting from a user-applied force input to the device, sensitivity to small relative pressure changes may be more critical than absolute pressure accuracy over a wide dynamic range.

Figure 31:
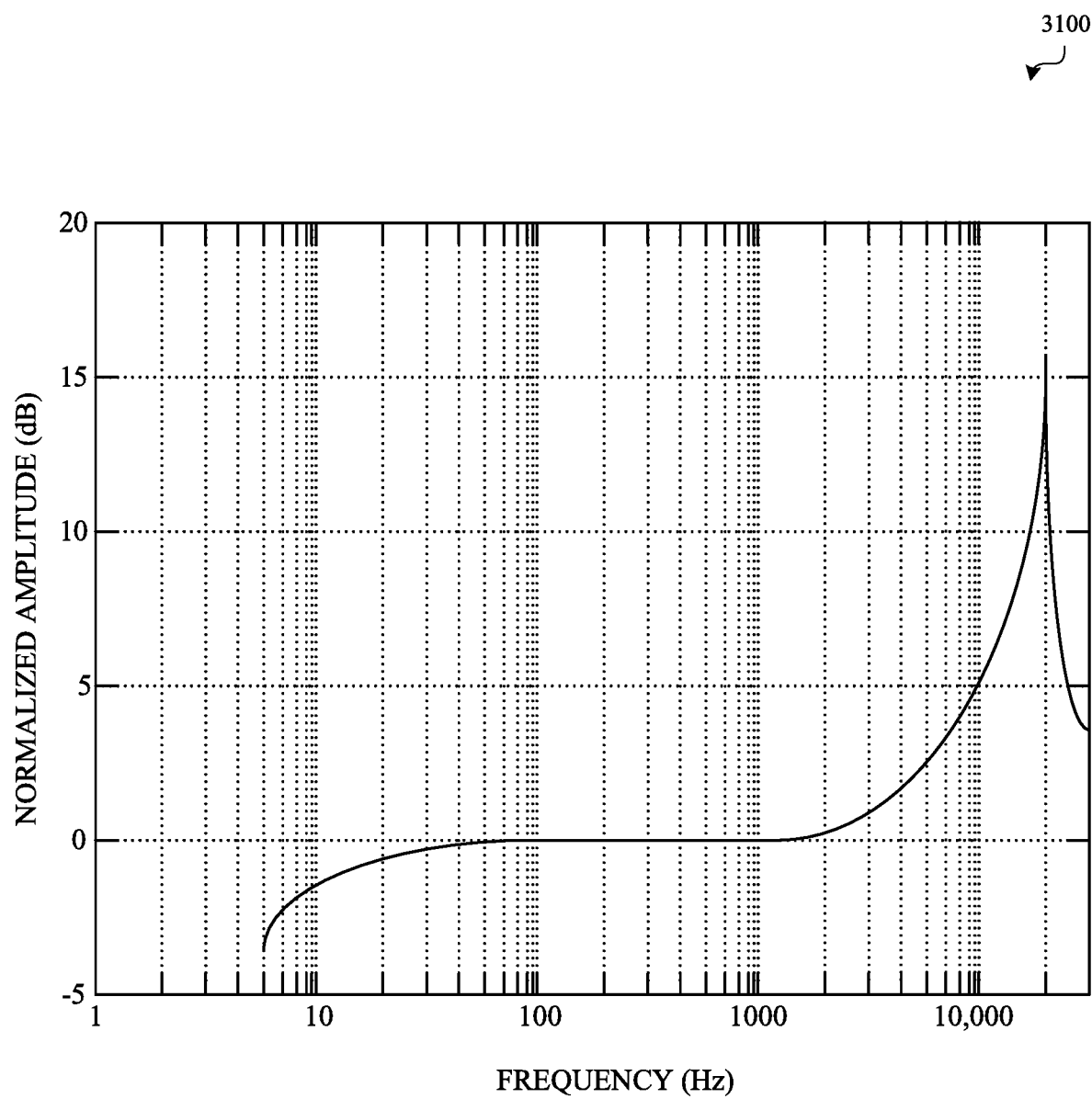
FIG. 31 shows a graph of normalized amplitude response verses frequency for an example microphone.

One type of pressure sensor that may be used as any of the internal pressure sensors or barometric pressure sensors described herein is a microphone. Microphones may be used to measure relative pressure change and may have a much better signal-to-noise ratio (SNR) than a typical pressure sensor (e.g., an SNR on the order of 100× or more greater than that of a typical pressure sensor). In essence, a microphone may be used to 'listen' for low frequency acoustic waves generated by pressure changes. FIG. 31 shows a graph 3100 of normalized amplitude response verses frequency for an example microphone. As shown, the microphone may be sensitive to frequencies less than 20 Hz.

The output of a microphone may be low-pass filtered to reject audio noise. In some embodiments, the acoustic-sensing diaphragm of a microphone may include a capacitive, piezoresistive, or piezoelectric film.

Figure 32:
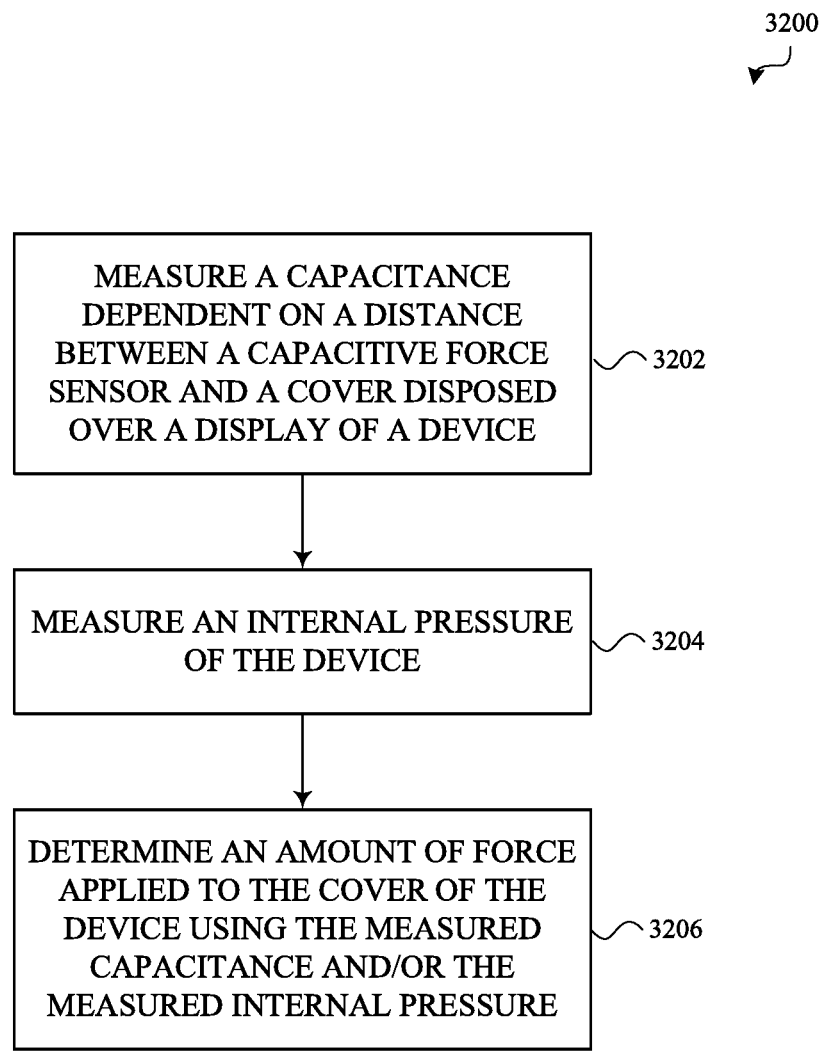
FIGS. 32-36 shows example methods for determining an amount of force applied to a cover of a device.

FIG. 32 shows an example method 3200 for determining an amount of force applied to a cover of a device.

At block 3202, the method 3200 may include measuring a capacitance that is dependent on a distance between a capacitive force sensor and the cover. In some embodiments, the capacitance may be measured using a capacitive force sensor disposed within an interior volume of the device. The capacitive force sensor may be configured to generate a first set of one or more signals related to an amount of force applied to the cover.

At block 3204, the method 3200 may include measuring an internal pressure of the device. In some embodiments, the internal pressure may be measured using a pressure sensor disposed within the interior volume. The pressure sensor may be configured to generate a second set of one or more signals related to the amount of force applied to the cover.

At block 3206, the method 3200 may include determining an amount of force applied to the cover of the device using the measured capacitance and/or the measured internal pressure. The amount of force may be determined by a processor that uses at least one of the first set of one or more signals or the second set of one or more signals.

In some embodiments, the method 3200 may include determining the amount of force applied to the cover using the second set of one or more signals when the amount of force applied to the cover is determined for a first time following a touch detected by a touch sensor of the device. The method 3200 may include determining the amount of force applied to the cover using the first set of one or more signals when the amount of force applied to the cover is determined for a second time following the touch detected by the touch sensor. In some embodiments, the method 3200 may include determining the amount of force applied to the cover using the first set of one or more signals and the second set of one or more signals when the amount of force applied to the cover is determined for a third time following the touch detected by the touch sensor. The third time may be between the first time and the second time.

In some embodiments, the method 3200 may include determining a sealing state of the interior volume; determining the amount of force applied to the cover using the first set of one or more signals when the sealing state is determined to be below a threshold; and determining the amount of force applied to the cover using the second set of one or more signals when the sealing state is determined to be above the threshold.

In some embodiments, the method 3200 may include determining a sealing state of the interior volume; determining the amount of force applied to the cover using the first set of one or more signals when the sealing state is determined to be below a first threshold; and determining the amount of force applied to the cover using the first set of one or more signals and the second set of one or more signals when the sealing state is determined to be between the first threshold and a second threshold.

In some embodiments, the method 3200 may include determining a sealing state of the interior volume; determining the amount of force applied to the cover using the first set of one or more signals when the sealing state is determined to be below a first threshold; determining the amount of force applied to the cover using the first set of one or more signals and the second set of one or more signals when the sealing state is determined to be between the first threshold and a second threshold; and determining the amount of force applied to the cover using the second set of one or more signals when the sealing state is determined to be above the second threshold.

In some embodiments, the method 3200 may include determining an ambient pressure of the device. The ambient pressure may be determined using a barometric pressure sensor disposed within the housing and configured to generate a third set of one or more signals related to an ambient pressure of the device. In these embodiments, a processor may be configured to determine the amount of force applied to the cover using at least one signal from each of the first set of one or more signals, the second set of one or more signals, and the third set of one or more signals.

In some embodiments, the method 3200 may include determining an internal pressure from the first set of one or more signals; determining a distance (d) between the cover and the capacitive force sensor using the second set of one or more signals; determining an ambient pressure of the device from the third set of one or more signals; and determining a pressure difference between the internal pressure and the ambient pressure. Alternatively, the pressure difference may be determined using a differential pressure sensor (e.g., a sensor having a deformable element positioned between the volume interior to the device and an environment exterior to the device). In these embodiments, a processor may determine the amount of force applied to the cover from the distance and the pressure difference. For example, the amount of force may be determined based on a compensated displacement, $\delta$, where:

$$\delta = d - s(P_2 - P_1)$$

and s is a constant or function.

In some embodiments of the method 3200, a measured internal pressure may be used to adjust or compensate a measured capacitance. In other embodiments, a measured capacitance may be used to adjust or compensate a measured internal pressure. In some embodiments, the type of adjustment or compensation applied, or whether force sensing is enabled or temporarily disabled, may depend on a processor's assessment of the condition(s) of the environment exterior to the device (e.g., is the ambient pressure changing quickly, has there been a sudden change in ambient pressure, and so on).

Figure 33:
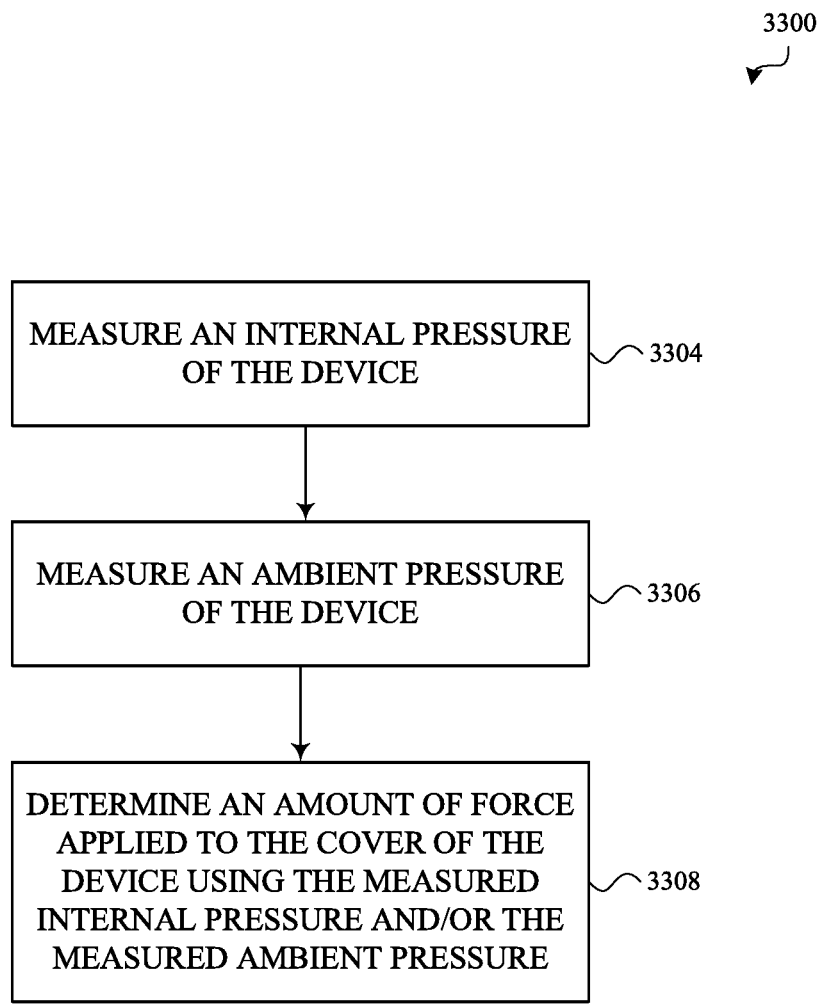

FIG. 33 shows another example method 3300 for determining an amount of force applied to a cover of a device.

At block 3302, the method 3300 may include measuring an internal pressure of the device. The internal pressure may be measured using an internal pressure sensor disposed within the interior volume and configured to generate a first set of one or more signals related to an amount of force applied to the cover.

At block 3304, the method 3300 may include measuring an ambient pressure of the device. The ambient pressure may be a barometric pressure sensor disposed within the housing and configured to generate a second set of one or more signals related to an ambient pressure of the device.

At block 3306, the method 3300 may include determining an amount of force applied to the cover of the device using the measured internal pressure and/or the measured ambient pressure. For example, the amount of force applied to the cover may be determined by a processor that uses the first set of one or more signals and the second set of one or more signals.

In some embodiments, the method 3300 may further include determining an internal pressure of the device from the first set of one or more signals, determine an ambient pressure of the device from the second set of one or more signals, and using the processor to determine an amount of force applied to the cover using the internal pressure and the ambient pressure. In some embodiments, the processor may be further configured to determine whether the amount of force applied to the cover indicates a user input.

In some embodiments of the method 3300, the processor may be further configured to adjust a force detection threshold to which an internal pressure is compared. The internal pressure may be adjusting using (or based on) the ambient pressure. In these embodiments, the processor may identify a force input (i.e., an intended force input or force input trigger) when the internal pressure satisfies the adjusted force detection threshold.

In some embodiments, the method 3300 may further include characterizing the ambient pressure, and ceasing to determine the amount of force applied to the cover, for a period of time, in response to the characterization of the ambient pressure. For example, if the ambient pressure characterized as indicative of a door slam (e.g., a car door slam), force sensing operations may be temporarily disabled due to the effect that a door slam may have on the internal pressure sensor.

In some embodiments, the ambient pressure determined at block 3304 may be a time-varying ambient pressure, and the method 3300 may further include identifying, from the time-varying ambient pressure, an ambient pressure rate of change above a threshold; and adapting, in response to identifying the ambient pressure rate of change above the threshold, how the amount of force applied to the cover is determined.

In some embodiments, the type of adjustment or compensation applied to an internal pressure, or whether force sensing is enabled or temporarily disabled, may depend on a processor's assessment of the condition(s) of the environment exterior to the device (e.g., is the ambient pressure changing quickly, has there been a sudden change in ambient pressure, and so on).

Figure 34:
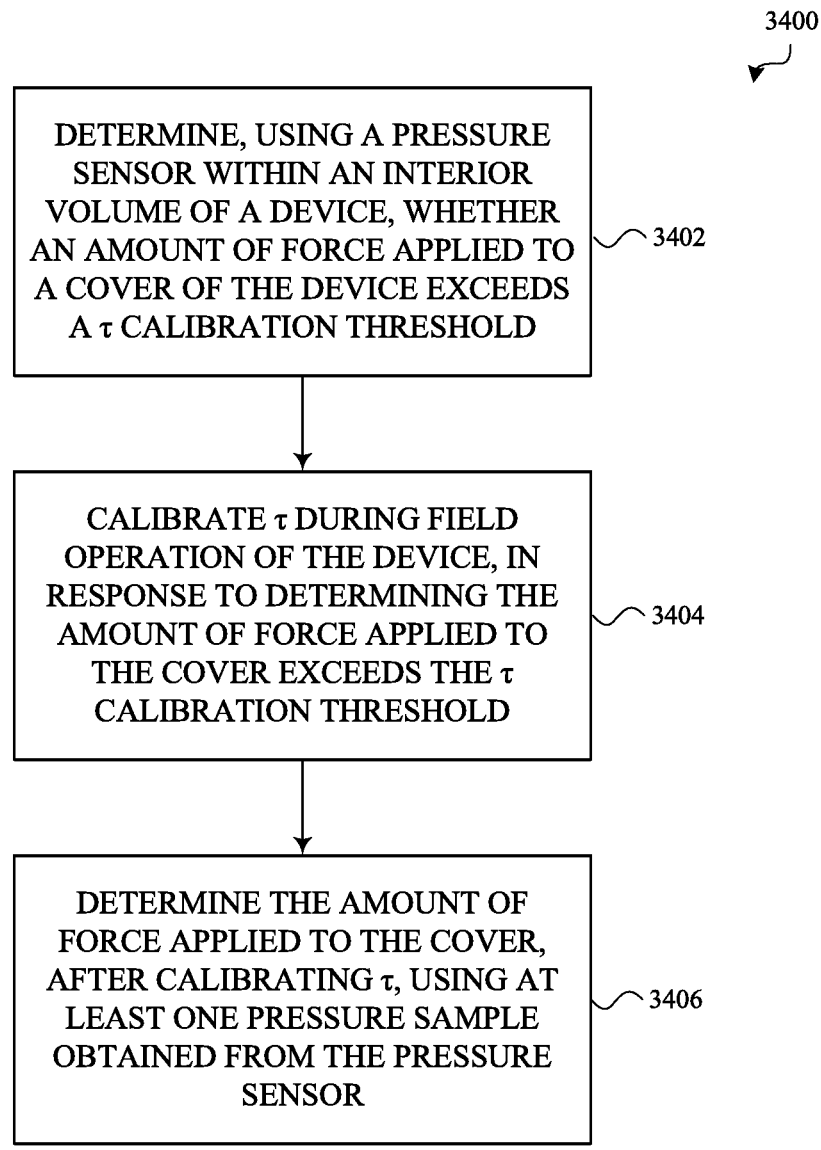

FIG. 34 shows an example method 3400 for determining an amount of force applied to a cover of a device.

At block 3402, the method 3400 may include determining, using a pressure sensor within an interior volume of the device, whether an amount of force applied to the cover exceeds a $\tau$ calibration threshold (i.e., a predetermined amount of force applied to the cover). In some embodiments, the determination may be made from a set of pressure samples obtained from the pressure sensor. The $\tau$ calibration threshold may be based on application or release of an applied force. As previously discussed, $\tau$ is the time it takes the interior volume to reach a steady state pressure following the application or release of the force applied to the cover;

At block 3404, the method 3400 may include calibrating $\tau$ during field operation of the device, in response to determining that the amount of force applied to the cover exceeds the $\tau$ calibration threshold.

At block 3406, the method 3400 may include determining an amount of force applied to the cover of the device, after calibrating $\tau$, using at least one pressure sample obtained from the pressure sensor and the calibrated $\tau$.

In some embodiments, the method 3400 may further include determining that a number of pressure samples obtained after a release of the force applied to the cover, and before a next touch on the cover, exceeds a threshold number of samples. In these embodiments, the operations at block 3404 may be performed in response to a combination of both 1) determining the amount of force applied to the cover exceeds the $\tau$ calibration threshold, and 2) determining that a number of pressure samples obtained after a release of the force applied to the cover, and before a next touch on the cover, exceeds a threshold number of samples.

In some embodiments, the method 3400 may further include determining whether $\tau$ satisfies an interior volume leak threshold, and notifying a user of the device when $\tau$ is determined to satisfy the interior volume leak threshold. For example, a notification may be displayed on a display of the device, or an audible or haptic notification may be provided to the user. The notification may enable the user to take extra precautions in situations where their device might be exposed to water or other contaminants.

Figure 35:
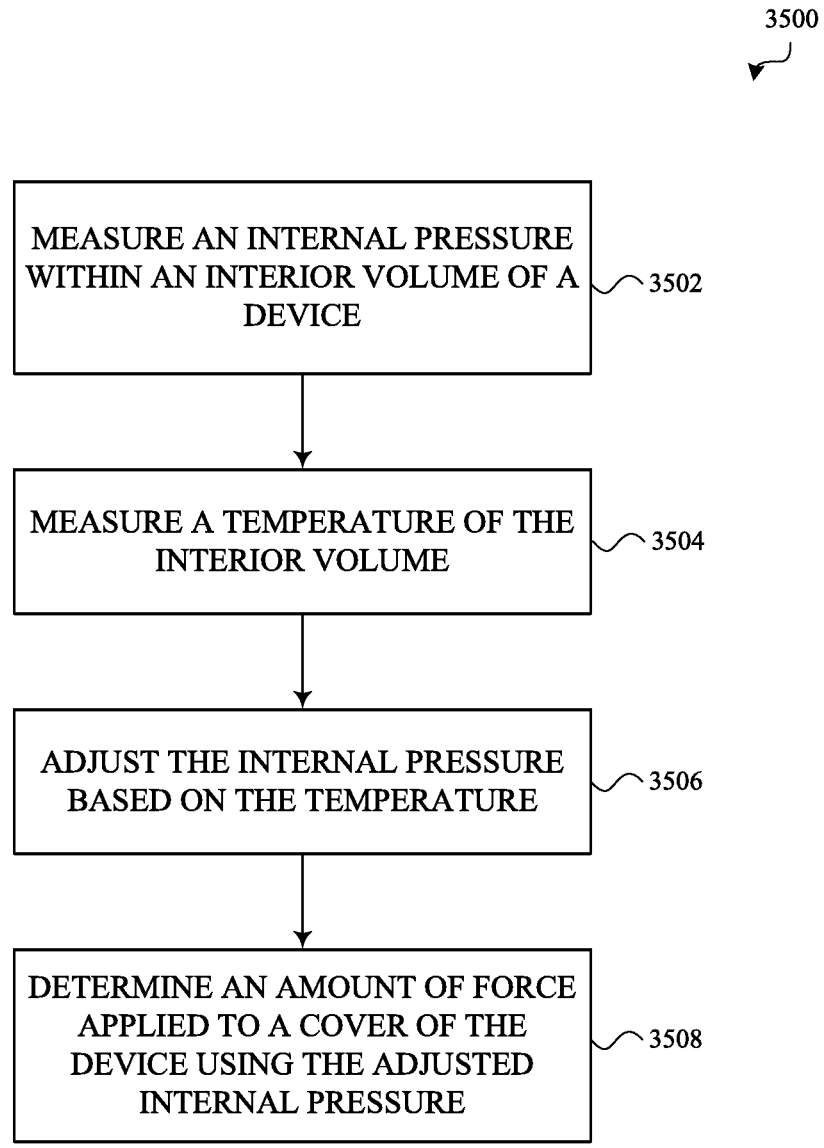

FIG. 35 shows another example method 3500 for determining an amount of force applied to a cover of a device.

At block 3502, the method 3500 may include measuring a pressure within an interior volume of the device. In some cases, an internal pressure sensor (e.g., a pressure sensor within the volume that is interior to the device) may generate a first set of one or more modulated signals related to an amount of force applied to the cover.

At block 3504, the method 3500 may include measuring a temperature of the interior volume. In some cases, a temperature sensor disposed within the interior volume may generate a second set of one or more signals related to a temperature within the interior volume.

At block 3506, the method 3500 may include adjusting the internal pressure based on the temperature (e.g., adjusting at least one signal in the first set of signals using at least one signal in the second set of signals).

At block 3508, the method 3500 may include determining an amount of force applied to the cover of the device using the adjusted internal pressure (e.g., at least one adjusted signal from the first set of signals).

Figure 36:
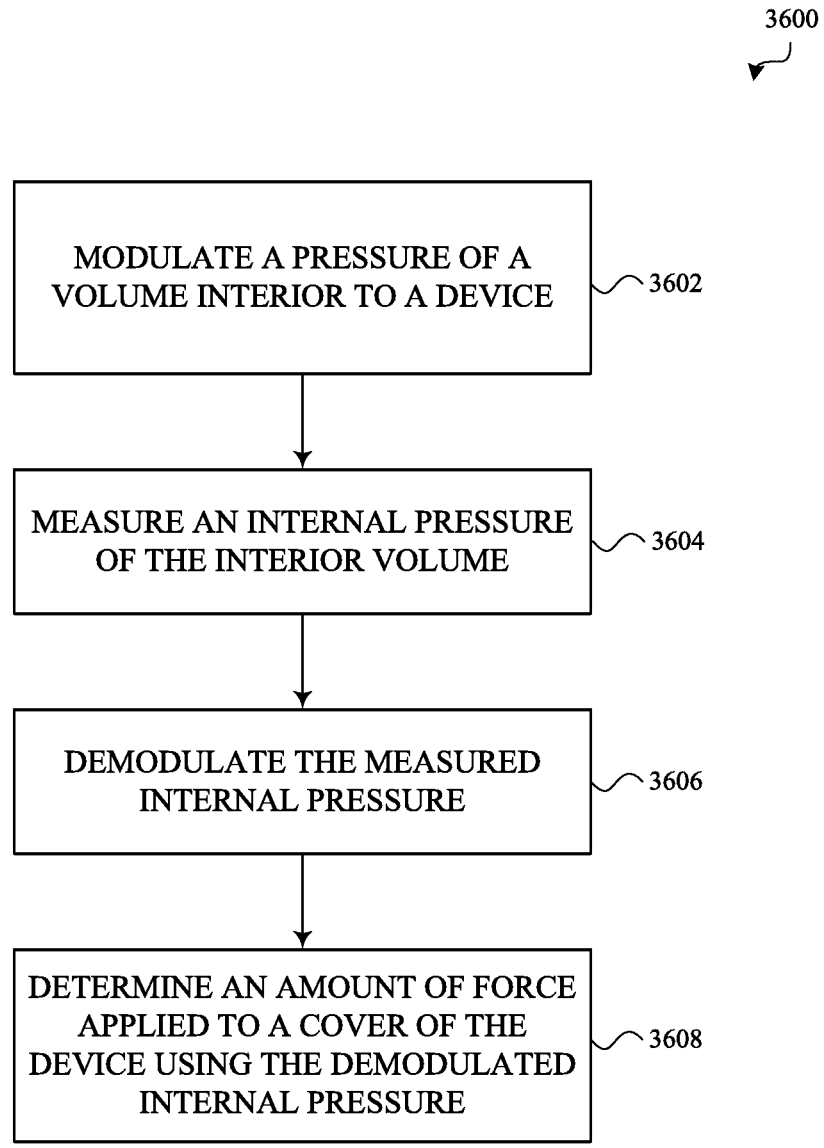

FIG. 36 shows another example method 3600 for determining an amount of force applied to a cover of a device.

At block 3602, the method 3600 may include modulating a pressure of a volume interior to the device. The pressure may be modulated using a pressure modulation device (or pressure chopper), as described with reference to FIG. 29.

At block 3604, the method 3600 may include measuring an internal pressure of the interior volume. In some cases, an internal pressure sensor (e.g., internal to the volume that is interior to the device) may generate a first set of one or more modulated signals related to an amount of force applied to the cover.

At block 3606, the method 3600 may include demodulating the measured internal pressure. In some cases, a processor may generate a second set of one or more demodulated signals using a modulation frequency of the pressure modulation device.

At block 3608, the method 3600 may include determining an amount of force applied to the cover of the device using the demodulated internal pressure (e.g., the demodulated signal(s) from block 3606).

Various configuration of capacitive force sensors and/or pressure sensors within a device may provide various advantages, depending on their configuration. For example, a pressure sensor may be used to provide rate-based click detection (e.g., of a tap force), whereas a capacitive force sensor may be used to provide absolute force detection. A device having both a capacitive force sensor and a pressure sensor may provide both rate-based click detection and absolute force detection. Rate-based click detection can enable click detection on a low signal-to-noise ratio (SNR) or poorly sealed device. A capacitive force sensor and/or pressure sensor may in some cases provide for low-latency click detection or tap discrimination using temporal features of a measured signal.

In some examples, an applied force or rate of applied force may be determined using a pressure sensor and inverting a system using $\tau$, whereas a capacitive force sensor may determine an applied force or rate of applied force using displacement sensing. In some examples, and when a device includes both a capacitive force sensor and a pressure sensor), the displacement of a capacitive force sensor may be compensated using an overpressure (e.g., from an interior/exterior pressure differential) when $\tau$ is not known, or using sensor fusion when $\tau$ is known and capacitance and pressure measurements are available.

In some embodiments, a device including a capacitive force sensor and/or pressure sensor may determine $\tau$ when an applied pressure is removed from a device, and/or $\tau$ may be classified as high or low after one or more taps on a device. In a device including both a capacitive force sensor and a pressure sensor, $\tau$ may be determined by correlating the outputs of both sensors when the device is touched.

In some embodiments, a device having a capacitive force sensor and/or pressure sensor may also have a barometric pressure sensor, which sensor may enable low-noise tracking of the device's ambient pressure. The ambient pressure may be used to detect high-intensity ambient pressures that may affect the capacitive force sensor and/or pressure sensor and, for example, 1) compensate for the ambient pressure, 2) adjust a force sensing threshold or force trigger threshold, 3) or temporarily disable force detection. In this manner, false force triggers may be avoided in scenarios such as, when a device is used in an elevator, in a vehicle or other room in which a door is slammed, on a high-speed train, in a vehicle with an open window, and so on.

In some cases, one of the devices described herein may be immersed in a fluid. When the device is immersed in a fluid (e.g., water), the pixels of the device's touch sensor may saturate, rendering the touch sensor unable to determine where a user is touching the device's cover or display. In this regard, FIG. 37 shows an example top plan view of the device 100 described with reference to FIGS. 1A-1B, wherein the device 100 has been provided with a collection of sensors that enable the device 100 to determine a location of a user's touch on the cover 102b when the device is immersed in a fluid.

Figure 37:
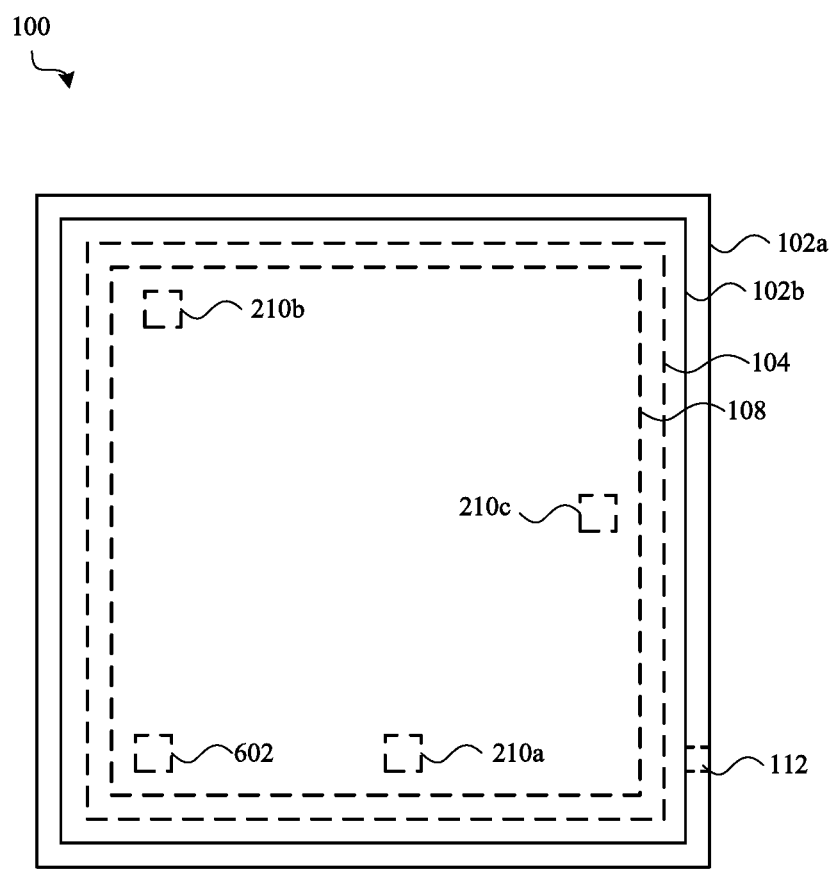
FIG. 37 shows an example top plan view of the device described with reference to FIGS. 1A and 1B.

As shown in FIG. 37, and in some embodiments, the force sensing system 108 of the device 100 may include a set of pressure sensors (e.g., at least one pressure sensor 602) and a set of displacement sensors 210 (e.g., one or more displacement sensors, including, for example, a first displacement sensor 210a, a second displacement sensor 210b, and a third displacement sensor 210c). The displacement sensors 210a, 210b, 210c may be positioned at different locations beneath the cover 102b. In some cases, the displacement sensors 210a, 210b, 210c may be capacitive force sensors. When a fluid immersion detector indicates that the device 100 is immersed in a fluid, the processor 110 (FIG. 1B) may determine a location of a touch on the cover 102b using signals received form the pressure sensor 602 and set of displacement sensors 210a, 210b, 210c, as described, for example, with reference to any of FIGS. 42-46. When the fluid immersion detector indicates that the device 100 is not immersed in a fluid, the processor 110 may determine an amount of force applied to the cover 102b, as described, for example, with reference to any of FIGS. 1-36.

The fluid immersion detector may in some cases take the form of a particular output or state of the touch sensing system 106. For example, the fluid immersion detector may be an output of a touch sensor, which output indicates that a set of pixels of the touch sensor (e.g., a majority or all of the pixels of the touch sensor) is saturated. In other cases, the fluid immersion detector may take the form of a fluid detector, such as a fluid detector mounted in a port of the device 100. The fluid immersion detector may also or alternatively include a barometric pressure sensor that indicates when the device 100 is likely to be under water; or a processor that analyzes the outputs of one or more types of fluid immersion detectors. Analysis of the outputs or multiple fluid immersion detectors can reduce the likelihood that the device 100 is falsely determined to be immersed.

Figure 38:
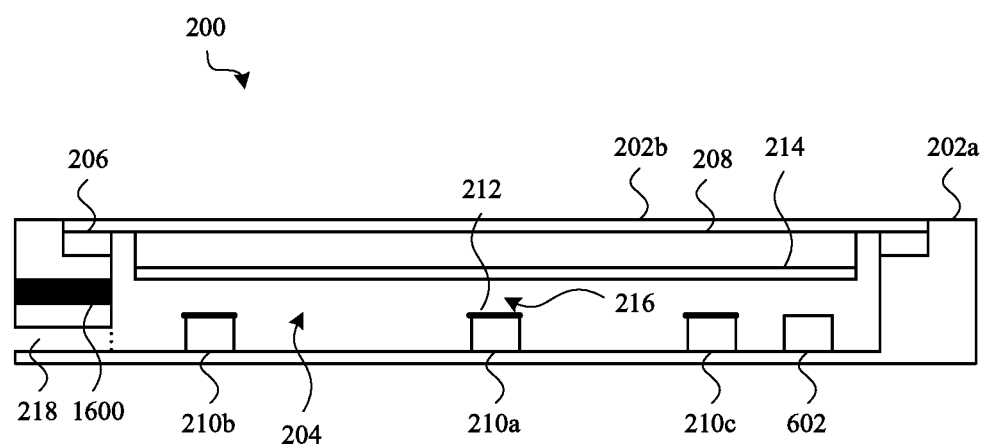
FIG. 38 shows an example alternative cross-section of the device shown in FIG. 2A.

Building on the principles introduced with respect to FIG. 37, FIG. 38 shows an example alternative cross-section of the device 200 described with reference to FIG. 2A. In the alternative cross-section, different numbers and/or types of sensors are included in the interior volume 204. For example, a pressure sensor 602 may be disposed within the interior volume 204. The pressure sensor 602 may be configured to generate (and output) a first set of one or more signals, or time-dependent sequence of pressure measurements, related to (i.e., in response to) an amount of force applied to the cover 202b (e.g., a force applied to the cover 202b by a user's finger or stylus). In some cases, the first set of one or more signals may also or alternatively be related to an amount of force applied to a side or back of the device 200. In some examples, the pressure sensor 602 may be a capacitive pressure sensor or resistive (e.g., strain gauge) pressure sensor. The pressure sensor 602 may be opportunistically positioned within the interior volume 204 (e.g., the pressure sensor 210 may be positioned where space exists or where convenient). For example, the pressure sensor 602 may be attached to a logic board (e.g., a printed circuit board) mounted within the interior volume 204, or attached to an available area on a flex circuit used for force sensing or other purposes. The pressure sensor 602 need not be positioned toward a side of the device 200, but may be. In some embodiments, the pressure sensor 602 may be positioned under the center of the cover 202b (e.g., the positions of the sensor 210a and pressure sensor 602 may be swapped, or the sensors 210a, 602 may be positioned near each other under the center of the cover 202b).

A capacitive force sensor 210a or other type of displacement sensor may also be disposed within the interior volume 204, or otherwise disposed to detect displacement (e.g., distortion) of the interior volume 204. The capacitive force sensor 210a may be configured to generate (and output) a second set of one or more signals, or first time-dependent sequence of displacement measurements, related to an amount of force applied to the cover 202b. In some embodiments, the capacitive force sensor 210a may be provided by a SiP mounted within the interior volume 204. For example, a SiP may include a self-capacitance sense pad 212 (i.e., an electrode) adjacent (or on) a first surface of the SiP, a set of solder structures (e.g., solder balls or solder posts) attached to a second surface of the SiP (opposite the first surface), and an integrated circuit (IC) coupled to the self-capacitance sense pad 212. The IC may be configured to output, at one or more of the solder structures, an analog or digital value related to a measured capacitance of the self-capacitance sense pad 212 (i.e., the capacitive force sensor 210a may be configured in a self-capacitance sensing mode). The digital value may be indicative of a force or amount of force applied to the cover 202b, or a displacement of the cover 202b at the location of the capacitive force sensor 210a. The SiP may be mounted upside down with respect to the cover 202b, such that the first surface of the SiP is positioned closer to the cover 202b than the second surface of the SiP. The first surface of the SiP may be oriented parallel (or substantially parallel) to the exterior surface of the cover 202b.

The SiP may be opportunistically positioned within the interior volume 204 (e.g., the SiP may be positioned where space exists or where convenient). For example, the SiP may be attached to a logic board (e.g., a printed circuit board) mounted within the interior volume 204, or attached to an available area on a flex circuit used for force sensing or other purposes. The SiP need not be positioned under the center of the cover 202b, but may be. The solder structures may be reflowed to electrically and mechanically attach the SiP to another structure (e.g., a logic board or flex circuit). Some solder structures of the SiP may be used to provide power, signals, or instructions to the SiP (e.g., to the IC).

In some embodiments, and as shown in FIG. 38, a ground element 214 may be mounted within the interior volume 204, and the self-capacitance sense pad 212 may be separated from the ground element 214 by a compressible gap 216. The ground element 214 may be a layer of the stack (or may be provided within a layer of the stack), and may be positioned between the display 208 and the self-capacitance sense pad 212. Alternatively, the ground element 214 may be positioned within the display 208, or between the display 208 and the cover 202b, or in various positions as described with reference to FIGS. 15A-15C for example). By way of example, FIG. 38 shows the ground element 214 positioned between the display 208 and the self-capacitance sense pad 212. In some examples, the ground element 214 may be provided on a substrate such as a PCB (e.g., a display PCB), on a flex circuit (e.g., a display flex circuit, a touch sensor flex circuit, or a camera flex circuit), or on a surface of a substrate such as the cover 202b. When a user applies a force to the cover 202b, the distance (i.e., displacement) between the ground element 214 and the self-capacitance sense pad 212 may decrease, thus changing the capacitance of the self-capacitance sense pad 212 and enabling an amount of force to be detected by the IC within the SiP. Different amounts of force applied to the cover 202b may compress the compressible gap 216 to different extents. In alternative embodiments, the capacitive force sensor 210a may be configured in a mutual-capacitance sensing mode, and the ground element 214 may instead be a conductor through which a drive waveform is propagated.

In some alternative embodiments, the SiP may be mounted within the interior volume 204 with the first surface oriented toward an edge or the back of the device 200. With these orientations, the SiP may be used to sense a force or amount of force applied to the edge or back of the device 200 (though the SIP may also sense a force or amount of force applied to the edge or back of the device 200 when positioned as shown in FIG. 38).

In some embodiments, the device 200 may include a plurality of pressure sensors and/or a plurality of displacement sensors. When the device 200 includes a plurality of pressure sensors, the measurements of the pressure sensors may be averaged, combined, or selected in various ways to determine the pressure within the internal volume. A plurality of pressure sensors may enable the device 200 to adjust a time-dependent sequence of pressure measurements for the effects of high heat producing components within the device 200, ambient effects, and so on.

By way of example, the device 200 is shown to have three displacement sensors (e.g., a first capacitive force sensor 210a, a second capacitive force sensor 210b, and a third capacitive force sensor 210c). The capacitive force sensors 210a, 210b, 210c may be positioned at different locations beneath the cover 202b, and may generate different signals (or different time-dependent sequences of displacement measurements) in response to displacement of the cover 202b at different locations with respect to a surface of the cover 202b. In some embodiments, the capacitive force sensors 210a, 210b, 210c may be generally distributed as shown with reference to FIG. 37. The capacitive force sensors 210a, 210b, 210c may also be distributed beneath the cover 202b in other ways.

In some embodiments, the device 200 may include a barometric pressure sensor 1600 that extends through the housing 202a (e.g., with a pressure sensing element of the barometric pressure sensor 1600 oriented toward an environment exterior to the housing 202a, and an electrical interface of the barometric pressure sensor 1600 oriented toward the interior volume 204). The barometric pressure sensor 1600 may be configured to measure the barometric pressure of an environment exterior to the device 200 (e.g., an ambient pressure of the device 200). In some cases, the barometric pressure sensor 1600 may be used to measure the barometric pressure while a touch or force is being applied to the cover 202b. In some embodiments, the barometric pressure sensor 1600 may include a set of multiple pressure sensors, and measurements obtained from the multiple barometric pressure sensors may be combined (e.g., averaged) to determine the ambient pressure of the device 200.

In some cases, an air permeable but liquid water impermeable membrane may be disposed over the pressure sensing element of the barometric pressure sensor 1600, to protect it from water and debris in the environment exterior to the device 200. In some embodiments, a gel or other substance may be disposed over the pressure sensing element to protect it from water and debris.

A processor within the device 200 may be configured to determine an amount of force applied to the cover 202b (or in some cases, an amount of force applied to an edge or back of the device 200) using the time-dependent sequence of pressure measurements received from the pressure sensor 602 (or from a set of multiple pressure sensors) and/or the time-dependent sequence of displacement measurements received from the capacitive force sensor 210a (or time-dependent sequences of displacement measurements received from multiple capacitive force sensors 210a, 210b, 210c). In some cases, the processor may determine the amount of force applied to the cover 202b using only the time-dependent sequence of pressure measurements, or a subset thereof, or only the time-dependent sequence(s) of displacement measurements, or a subset thereof. The processor may be configured to use one or the other time-dependent sequences of measurements in response to evaluating a set of one or more conditions (including, for example, a current or past value of a venting state of the interior volume 204). In some cases, the processor may determine the amount of force applied to the cover 202b using time-dependent sequences of pressure and displacement measurements. The processor may also use a location of a touch (or locations of multiple touches, or a location of a touch centroid) to determine the amount of force applied to the cover 202b. For example, measurements obtained from the pressure sensor 602 or capacitive force sensor(s) 210a, 210b, 210c may be mapped to different amounts of force based on where a user touches the device 200.

The capacitive force sensors 210a, 210b, 210c or other displacement sensors may in some cases be used for different purposes, depending on whether the device 200 is immersed in a fluid (e.g., water). For example, when the device 200 is not immersed in fluid, the capacitive force sensors 210a, 210b, 210c may be used to determine an amount of force applied to the cover 202b. However, when the device 200 is immersed in fluid, the capacitive force sensors 210a, 210b, 210c may be used to determine the location of a user's touch on the cover 202b. When the device 200 is immersed in a fluid, the presence and/or pressure of the fluid on the cover 202b may saturate a majority or all of the pixels of the device's touch sensor (e.g., a touch sensor included in the stack that includes the display 208), rendering the touch sensor inoperable for the purpose of detecting a location of a user's touch. However, in such a case, the device's processor may determine a location of a user's touch using signals received form the pressure sensor 602 and set of capacitive force sensors (or other displacement sensors) 210a, 210b, 210c, as described, for example, with reference to FIGS. 42-46.

The signals produced by the pressure sensor 602 and capacitive force sensor(s) 210a, 210b, 210c may be selectively used for amount of force determination and/or touch location detection based on the output of a fluid immersion detector. The fluid immersion detector may in some cases take the form of a particular output or state of the device's touch sensor. For example, an output of the touch sensor indicating that a set of pixels of the touch sensor (e.g., a majority or all of the pixels of the touch sensor) is saturated may cause the processor to use the signals produced by the pressure sensor 602 and capacitive force sensor(s) 210a, 210b, 210c to determine a location of a touch on the cover 202b. In other cases, the fluid immersion detector may take the form of a fluid detector, such as a fluid detector mounted in a port 218 of the device 200. The fluid immersion detector may also or alternatively include the barometric pressure sensor 1600, which may generate an output indicating that the device 200 is likely immersed in a fluid; or a processor that analyzes the outputs of one or more types of fluid immersion detectors.

Although FIGS. 2A and 38 show a particular form-factor and layout for the device 200, the structures and techniques described with reference to FIGS. 2A and 38 may be used to deploy pressure-based force sensing alone, capacitive (or displacement-based) force sensing alone, a combination of pressure-based and capacitive force sensing, or combinations of other types of force sensing. A single force sensing type, or combination of force sensing types, may be deployed in almost any kind of device having an interior volume 204 that is capable of compressing or otherwise changing shape, including, for example, a tablet computer or electronic watch. In some embodiments, capacitive force sensing may be deployed in a form factor other than in a SiP. For example, a capacitance sense pad may be disposed on a PCB or other substrate, adjacent an ASIC or other controller that senses a capacitance of the capacitance sense pad. As another example, a capacitance sense pad may be disposed on a semiconductor wafer (i.e., a semiconductor "chip"), and a circuit for sensing the capacitance of the capacitance sense pad may be formed on the wafer. PCBs or wafers may occupy less z space than a SiP, but may increase the size of the gap 216. In some embodiments, a PCB or wafer may be elevated using a standoff, or disposed on top of another component that positions it closer to the ground element 214 or cover 202b. A wafer may provide the smallest form factor for a capacitance sense pad and related circuitry, but at a higher cost than a PCB or SiP implementation.

FIGS. 39A-39E show the device cross-section of FIG. 38 when, and after, a force is applied to the cover 202b. The force may be applied to the cover 202b while the device 200 is immersed in a fluid or surrounded by air. When the device 200 is immersed in a fluid, the cover 202b may begin at a position that is pushed inward, or somewhat flexed, with respect to the cover position shown in FIG. 39A.

Figure 39A:
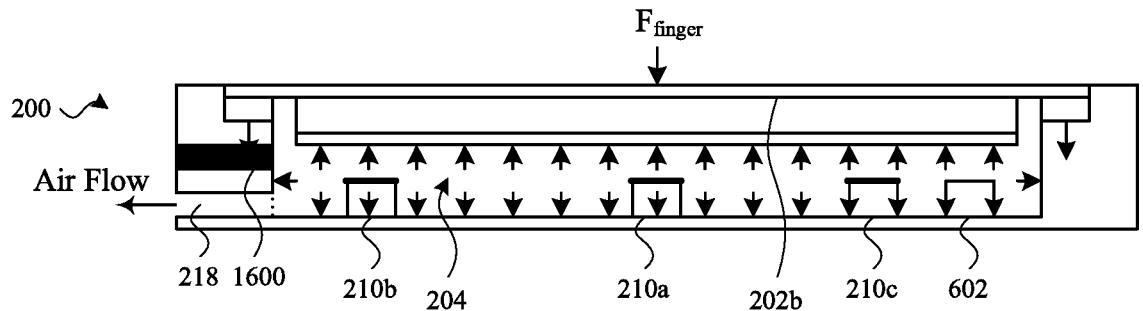
FIGS. 39A-39E show the device cross-section of FIG. 38 when, and after, a force is applied to a cover of the device.

FIG. 39A shows an initial application of force (e.g., $F_{finger}$) to the cover 202b. That is, FIG. 39A shows an initial application of a force related to a user's touch, whether the touch be with a user's finger, stylus, or other body part or implement. When the port 218 is small in size compared to the interior volume 204, and a gas (e.g., air) contained within the interior volume 204 is unable to escape the interior volume 204 freely, the air contained within the interior volume 204 may operate as a spring on the cover 202b (e.g., an air spring). The spring effect (e.g., air spring effect) may provide a pressure or resistance that opposes the force (e.g., $F_{finger}$) applied to the cover 202b. For example, and referring to FIG. 39A, a force applied to the center of the cover 202b may be opposed by the forces represented by the small arrows within the interior volume 204.

Figure 39B:
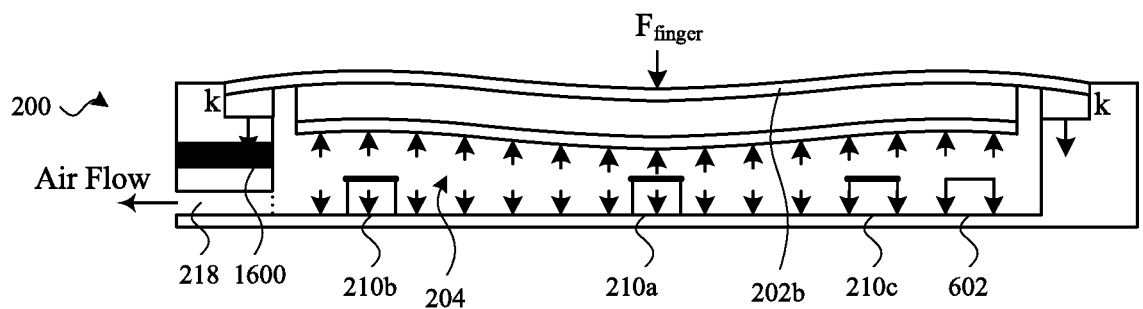

As the force continues to be applied to the cover 202b, and as shown in FIG. 39B, the air spring effect may cause portions of the cover 202b to bow outward upon continued application of the force $F_{finger}$. The portions of the cover 202b may bow outward as a result of the pressure within the interior volume 204 increasing, and as a result of air within the interior volume 204 being compressed. Also upon application of the force $F_{finger}$, the gasket 206 that bonds the cover 202b to the housing 202a (with spring constant k) may apply an inward force to the edges of the cover 202b. In other cases (not illustrated in FIG. 39B), the force distribution inside the interior volume 204 as a result of the air spring effect may differ. For example, the gasket 206 may apply an outward force to the edges of the cover 202b. More generally, whether or not a gasket such as the gasket 206 applies an inward force, outward force, or any force to the edges of the cover 202b may be a function of the interior volume 204, the aspect ratio (e.g., length, width, and thickness) of the cover 202b, and other factors. The forces (if any) applied to the edges of the cover 202b by the gasket 206 are the result of a force balancing problem involving the force $F_{finger}$ applied to the cover 202b, the pressure within the interior volume 204 when the force $F_{finger}$ is applied (e.g., a back pressure force), and the gasket force. The force balancing problem may be modeled for a particular device using finite element analysis (FEA). In general, a gasket may be expected to apply an inward force to the edges of a cover when a device has a long, thin, glass cover, as may be the case in the device 200; and a gasket may be expected to apply an outward force to the edges of a cover when a device has a short, thick, glass cover, as may be the case in an electronic watch.

Figure 39C:
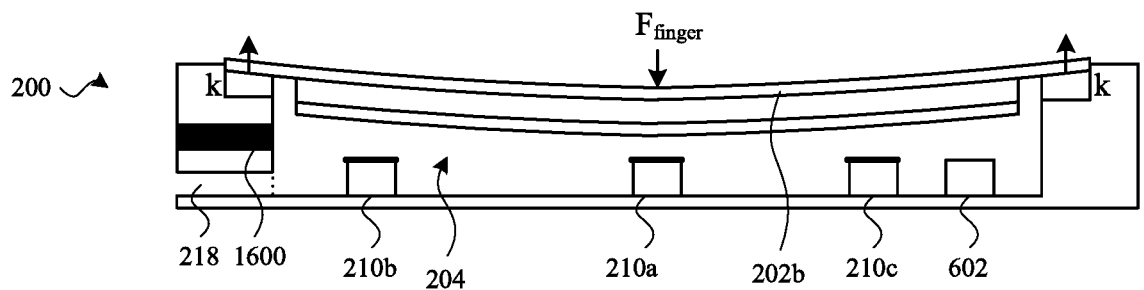

When the interior volume 204 is vented, thereby enabling air contained within the volume 204 to escape after application of the force $F_{finger}$ (but not escape immediately upon application of the force $F_{finger}$), the air spring effect illustrated with reference to FIG. 39B may decrease over time (assuming that the device 200 is not immersed in a fluid). Air flow out of the interior volume 204 is indicated by the arrow directed away from the port 218 in FIG. 39B. As air escapes the interior volume 204, the pressure within the interior volume 204 may exponentially decrease until the steady state shown in FIG. 39C is reached. In the steady state, the force $F_{finger}$ may not be opposed by the pressure or distribution of air within the interior volume 204, and the edges of the cover 202b may apply an outward force (or alternatively, an inward force) to the gasket 206. As shown in FIG. 39C, different capacitive force sensors 210a, 210b, 210c may sense different displacements of the cover 202b, depending on the locations of the capacitive force sensors 210a, 210b, 210c beneath the cover 202b.

When the device 200 is immersed in a fluid, air may not be able to escape the interior volume 204 through the port 218 when the force $F_{finger}$ is applied to the cover 202b, and a steady state similar to what is shown in FIG. 39C may be reached very more quickly, without air escaping the interior volume 204 as shown in FIG. 39B. Also, the cover 202b may not deflect as much as shown in FIG. 39C when air is unable to escape the interior volume 204.

Figure 39D:
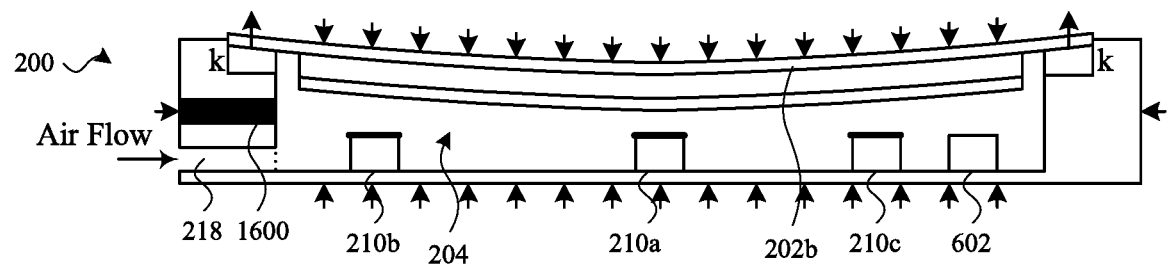
Figure 39E:
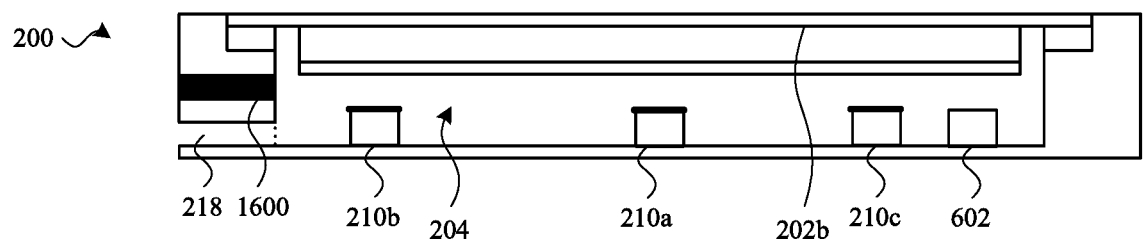

FIG. 39D shows the device 200 immediately after removal (liftoff) of the force $F_{finger}$. As shown, the ambient environment of the device 200 (air or water) may initially oppose return of the cover 202b to a steady state position. As air flows back into the interior volume 204 (or in the case of a device immersed in fluid, as the force $F_{finger}$ is lifted off), the device 200 may return to a steady state, as shown in FIG. 39E.

Between the time that the force $F_{finger}$ is initially applied to the cover 202b (as shown in FIG. 39A) and the time the pressure within the interior volume 204 reaches a steady state following application of the force $F_{finger}$ (as shown in FIG. 39C), the capacitance measurements generated by the capacitive force sensors 210a, 210b, 210c may change. The changes in the capacitance measurements may be caused by a change in the distance between the ground element 214 attached to the cover 202b and the self-capacitance sense pads of the capacitive force sensors 210a, 210b, 210c. Also between the time the force $F_{finger}$ is initially applied to the cover 202b and the time the pressure within the interior volume 204 reaches a steady state following application of the force $F_{finger}$, and assuming a fluid sealed or slowly vented interior volume 204, the pressure measurements generated by the pressure sensor 602 may change. The capacitance measurements and pressure measurements may also change between the time the force is lifted off of the cover 202b and the time the pressure within the interior volume 204 reaches a steady state following lift off of the force.

Figure 40A:
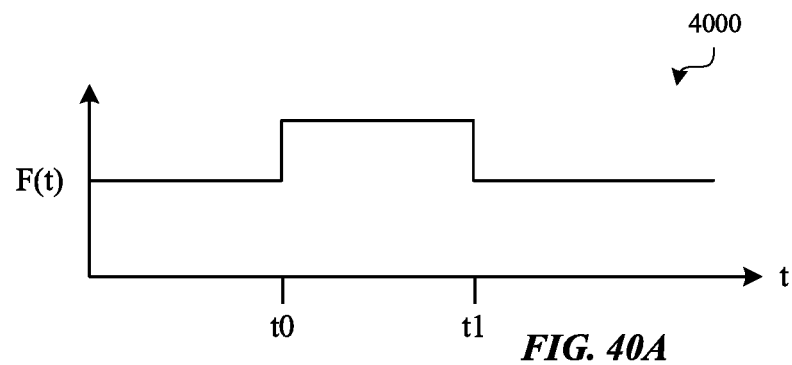
FIG. 40A-40C are graphs of example outputs of the pressure sensor and one of the capacitive force sensors described with reference to FIGS. 38 and 39A-39E, in response to the application and removal (liftoff) of a force on a device.
Figure 40B:
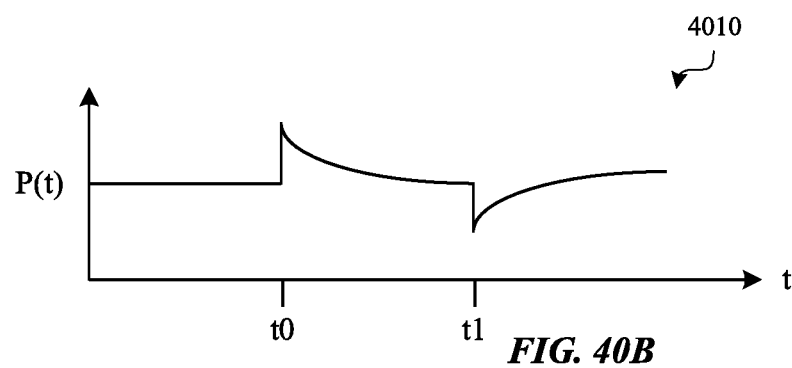
Figure 40C:
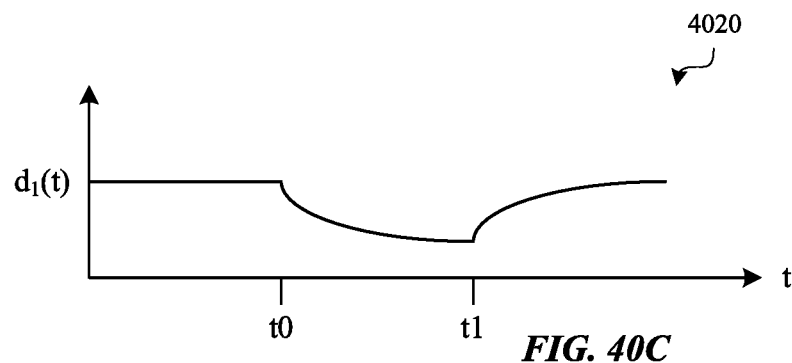

FIGS. 40A-40C are graphs of example outputs of the pressure sensor 602 and a capacitive force sensor (e.g., the capacitive force sensor 210a) described with reference to FIGS. 38 and 39A-39E, in response to application and removal (liftoff) of a force on the cover 202b, when the device 200 is not immersed in a fluid. FIG. 40A shows a graph 4000 of the force over time, F(t). FIG. 40B shows a graph 4010 of the pressure sensor's response to the force, P(t). 40C shows a graph 4020 of the capacitive force sensor's response to the force, in terms of displacement, d1(t), of a ground element (e.g., the ground element 214 described with reference to FIGS. 38 and 39A-39E).

As shown in FIG. 40A, a steady state force may be applied to the cover 202b at a time t0, and lifted off at a time t1. As shown in FIG. 40B, the pressure measured by the pressure sensor 602 may spike upward when the force is initially applied to the cover 202b at time t0, as a result of an air spring effect, and then exponentially decay as air (or another gas) flows out of the interior volume 204. Similarly, the pressure measured by the pressure sensor 602 may spike downward when the force is initially lifted off at time t1, and exponentially increase after liftoff. As shown in FIG. 40C, the capacitance (or displacement) measured by the capacitive force sensor 210a may decrease exponentially, beginning when the force is applied to the cover 202b at time t0. Similarly, the capacitance (or displacement) measured by the capacitive force sensor 210a may increase exponentially after liftoff of the force, beginning at time t1. When the device to which the force is applied is immersed in a fluid (e.g., water), the pressure spike shown in FIG. 40B at time t0 may be smaller; there may be less or no decay of the pressure between times t0 and t1; and the pressure before the force is lifted off at time t1 may be a positive pressure. Also when the device is immersed in a fluid, the cover 202b may experience a smaller change in displacement and the capacitance (or displacement) change measured by the capacitive force sensor 210a in FIG. 40C may be less.

Figure 41:
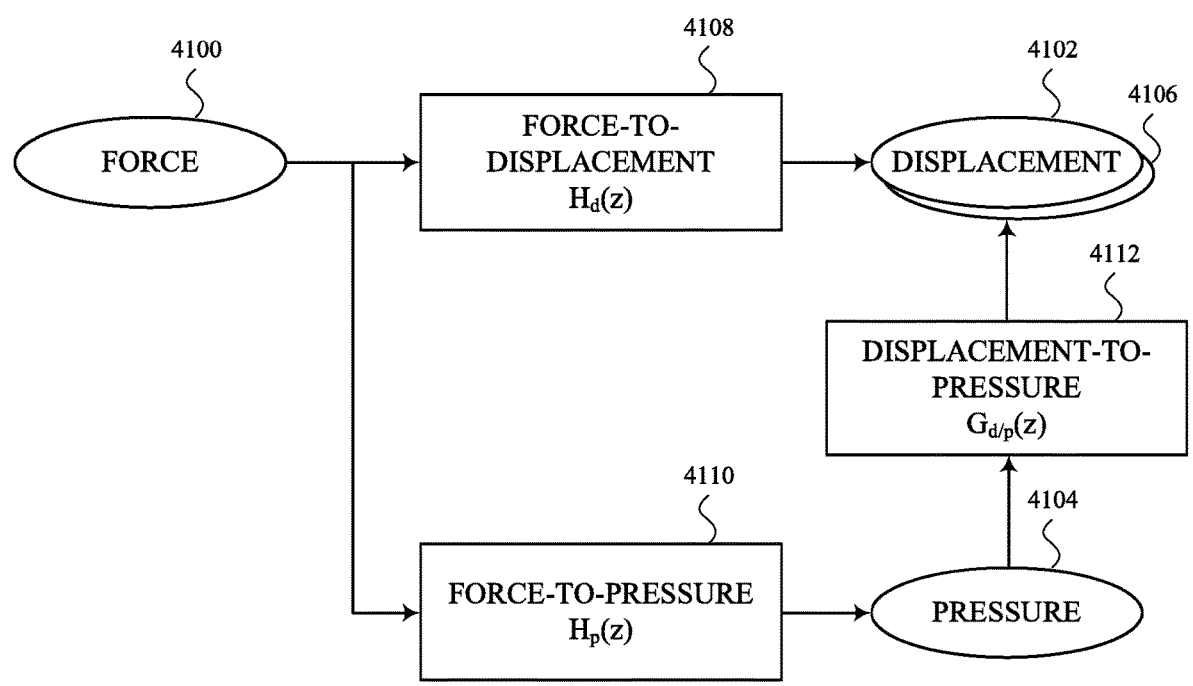
FIG. 41 shows relationships between a force applied to a device, measurements of displacement derived from a capacitive force sensor positioned in or in relation to an interior volume of the device, measurements of pressure derived from a pressure sensor positioned within the interior volume, and estimates of displacement derived from the measurements of pressure.

FIG. 41 shows relationships between a force 4100 applied to a device (e.g., the device 100 described with reference to FIGS. 1A-1B and 37, or the device 200 described with reference to FIGS. 2A, 38, and 39A-39E), measurements of displacement 4102 derived from a capacitive force sensor positioned in or in relation to an interior volume of the device, measurements of pressure 4104 derived from a pressure sensor positioned within the interior volume, and estimates of displacement 4106 derived from the measurements of pressure 4104. The relationships shown in FIG. 41 may be used, when the device is surrounded by air or otherwise not immersed in a fluid, to determine the amount of force applied to the device. The relationships shown in FIG. 41 may be used, when the device is immersed in a fluid, to determine a location of a touch on the device (e.g., the location of a touch on a cover of a display), and in some cases may also or alternatively be used to determine an amount of force associated with the touch.

As shown, the measured displacement 4102 may be related to the applied force 4100 by a force-to-displacement transfer function $H_d(z)$ 4108, the measured pressure 4104 may be related to the applied force 4100 by a force-to-pressure transfer function $H_p(z)$ 4110, and the estimated displacement 4106 may be related to the measured pressure 4104 by a displacement-to-pressure transfer function $G_{d/p}(z)$ 4112. Each of the transfer functions may depend on various system parameters, such as a venting state ($\tau$) of the interior volume; a uniform load (uniform pressure) sensitivity $S_{up}$; a steady-state sensitivity ($S_{ss}^{(x,y)}$) of a displacement sensor (e.g., a capacitive force sensor) in response to a force applied to the device; a steady-state sensitivity ($S_{p2}^{(x,y)}$) of a pressure sensor in response to a force applied to the device; and/or a relative sensitivity $$\left(S_r^{(x,y)} = \frac{S_{ss}^{(x,y)}}{S_{p2}^{(x,y)}}\right)$$

between the steady-state sensitivity of the displacement sensor and the steady-state sensitivity of the pressure sensor. In each of these quantities, (x,y) is a location on a surface for which touch detection is provided.

When a device is immersed in fluid, the venting state of the device's interior volume may be considered to approach infinity. The steady-state sensitivity of the displacement sensor may nonetheless be characterized in terms of the steady-state displacement seen at the sensor's location from each gram Force (gF) applied at a touch location on a device (e.g., nanometer/gF=nm/gF). The steady-state sensitivity of the pressure sensor may be characterized in terms of the steady-state pressure change in the interior volume from each gF applied at the touch location (e.g., Pascal/gF=pa/gF).

Figure 42:
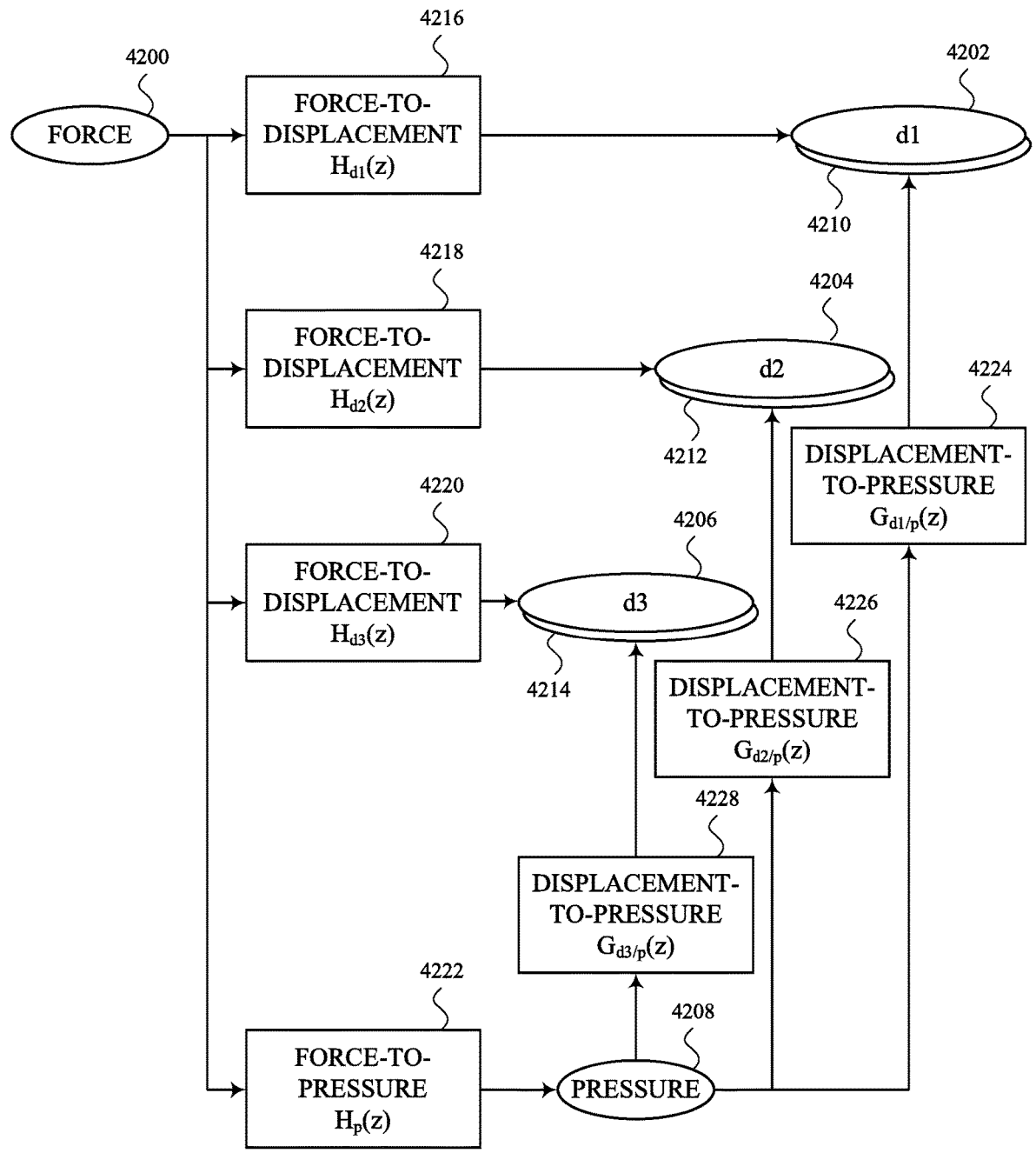
FIG. 42 shows relationships between a force applied to a device, measurements of displacement derived from each of three capacitive force sensors positioned in or in relation to an interior volume of the device, measurements of pressure derived from a pressure sensor positioned within the interior volume, and estimates of displacement derived from the measurements of pressure.

FIG. 42 shows relationships between a force 4200 applied to a device (e.g., the device 100 described with reference to FIGS. 1A-1B and 37, or the device 200 described with reference to FIGS. 2A, 38 and 39A-39E), measurements of displacement 4202, 4204, 4206 derived from each of three capacitive force sensors positioned in or in relation to an interior volume of the device, measurements of pressure 4208 derived from a pressure sensor positioned within the interior volume, and estimates of displacement 4210, 4212, 4214 derived from the measurements of pressure 4208. The relationships shown in FIG. 42 may be used, when the device is surrounded by air or otherwise not immersed in a fluid, to determine the amount of force applied to the device. The relationships shown in FIG. 42 may be used, when the device is immersed in a fluid, to determine a location of a touch on the device (e.g., the location of a touch on a cover over a display).

Similarly to what is described with reference to FIG. 41, the displacement (d1) 4202 measured by a first capacitive force sensor (or other type of displacement sensor) may be related to the applied force 4200 by a first force-to-displacement transfer function $H_{d1}(z)$ 4216, the displacement (d2) 4204 measured by a second capacitive force sensor (or other type of displacement sensor) may be related to the applied force 4200 by a second force-to-displacement transfer function $H_{d2}(z)$ 4218, and the displacement (d3) 4206 measured by a third capacitive force sensor (or other type of displacement sensor) may be related to the applied force 4200 by a third force-to-displacement transfer function $H_{d3}(z)$ 4220. Also, the measured pressure 4208 may be related to the applied force 4200 by a force-to-pressure transfer function $H_p(z)$ 4222. The estimated displacement d1 4210 may be related to the measured pressure 4208 by a first displacement-to-pressure transfer function $F_{d1/p}(z)$ 4224, the estimated displacement d2 4212 may be related to the measured pressure 4208 by a second displacement-to-pressure transfer function $G_{d2/p}(z)$ 4226, and the estimated displacement d3 4214 may be related to the measured pressure 4208 by a third displacement-to-pressure transfer function $G_{d3/p}(z)$ 4228. Each of the transfer functions may depend on various system parameters, such as a venting state ($\tau$) of the interior volume; the steady-state sensitivity ($S_{ss_i}^{(x,y)}$) of each displacement sensor (e.g., each capacitive force sensor) in response to a force applied to the device, for $i \in \{1,2,3\}$; the uniform-load (uniform pressure) sensitivity ($S_{up_i} = \alpha_i$) of each displacement sensor; a steady-state sensitivity ($S_{p2}^{(x,y)}$) of the pressure sensor in response to a force applied to the device; and/or a relative sensitivity $$\left( S_{r_i}^{(x,y)} = \frac{S_{ss_i}^{(x,y)}}{S_{p2}^{(x,y)}} \right)$$

between the steady-state sensitivity of a displacement sensor and the steady-state sensitivity of the pressure sensor.

When a device is immersed in fluid, the venting state of the device's interior volume may approach infinity. The steady-state sensitivity of each displacement sensor may nonetheless be characterized in terms of a steady-state displacement seen at the sensor's location from each gram Force (gF) applied at a touch location on a device (e.g., nanometer/gF=nm/gF). The steady-state sensitivity of the pressure sensor may be characterized in terms of the steady-state pressure change in the interior volume from each gF applied at the touch location (e.g., Pascal/gF=pa/gF). The uniform-load sensitivity is independent of touch location.

The transfer functions $H_{d_i}(z)$, $H_p(z)$, and $G_{d_i/p}(z)$ can be characterized as follows:

$$H_{d_i}(z) = \lim_{\tau \to \infty} \frac{S_{ss_i}^{(x,y)}\left(\frac{T_s}{2\tau}+1\right) + S_{up_i} S_{p2}^{(x,y)} + \left(S_{ss_i}^{(x,y)}\left(\frac{T_s}{2\tau}-1\right) - S_{up_i} S_{p2}^{(x,y)}\right)z^{-1}}{\left(\frac{T_s}{2\tau}+1\right) + \left(\frac{T_s}{2\tau}-1\right)z^{-1}}$$

$$= S_{ss_i}^{(x,y)} + S_{up_i} S_{p2}^{(x,y)}$$

$$H_p(z) = \lim_{\tau \to \infty} S_{p2}^{(x,y)} \frac{1-z^{-1}}{\left(\frac{T_s}{2\tau}+1\right) + \left(\frac{T_s}{2\tau}-1\right)z^{-1}} = S_{p2}^{(x,y)}$$

$$G_{d_i/p}(z) =$$

$$\frac{D_i(z)}{P(z)} = H_p^{-1}(z) x H_{d_i}(z) = \frac{S_{ss_i}^{(x,y)} + S_{up_i} S_{p2}^{(x,y)}}{S_{p2}^{(x,y)}} = S_{r_i}^{(x,y)} + S_{up_i} = S_{r_i}^{(x,y)} + \alpha_i$$

where $T_s$ is the sampling period.

A displacement measurement for a capacitive force sensor may be estimated using pressure measurements and past displacement measurements for the capacitive force sensor, or a pressure measurement may be estimated using past displacement measurements and past pressure measurements, at any point in time. The estimation may be simpler when each of the transfer functions $H_{d1}(z)$, $H_{d2}(z)$, $H_{d3}(z)$, $H_p(z)$, $G_{d1/p}(z)$, $G_{d2/p}(z)$, and $G_{d3/p}(z)$ have the same poles between application and removal of a force to a device (e.g., between times t0 and t1 in FIGS. 40A-40C).

Under ideal conditions (e.g., known values of system parameters and no coexistence issues caused by ambient noise (e.g., ambient pressure change) or internal noise (e.g., heat, or electrical or magnetic noise), estimated measurements such as the estimated displacement measurements should equal the actual displacement measurements. Under non-ideal conditions, the difference (or error) between estimated measurements and actual measurements can be quantified (and minimized) as follows:

$$\min\left\| \begin{bmatrix} d_i(n) \\ \vdots \\ d_i(0) \end{bmatrix} - \begin{bmatrix} \hat{d}_i(n) \\ \vdots \\ \hat{d}_i(0) \end{bmatrix} \right\|^2 = \min \|d_i - \hat{d}_i\|^2 = \min \|d_i - (S_{r_i} + \alpha_i)p\|^2$$

where d(n) corresponds to the actual displacement and d^(n) corresponds to the displacement estimated from pressure, and where in the time domain, $\hat{d}_i(n) = (S_{r_i}^{(x,y)} + \alpha_i)p(n)$.

A relative sensitivity of the pressure sensor and a particular displacement sensor may be determined using the quantified error in the below convex optimization problem, as follows:

$$\min[\Phi(S_{r_i}, \alpha_i)] = \min\left[\left\| d_i - \hat{d}_i \right\|^2\right] = \min[\|d_i - (S_{r_i} + \alpha_i)p\|^2] =$$

$$\min[d_i T d_i - 2 S_{r_i} d_i T p - 2\alpha_i d_i T p + S_{r_i}^2 p T p + \alpha_i^2 p T p + 2\alpha_i S_{r_i} p T p] =$$

-continued $$\min[S_{r_i}^2 pTp + S_{r_i}(-2d_iTp + 2\alpha_i pTp) + d_iTd_i - 2\alpha_i d_iTp + \alpha_i^2 pTp]$$

or $$S_{r_i}^{(x,y)*} = \frac{d_iTp}{pTp} - \alpha_i, \text{ for } i \in \{1, 2, 3\}$$

Using the relative sensitivity of the pressure sensor and a particular displacement sensor, or the relative sensitivities of the pressure sensor and each displacement sensor in a set of multiple displacement sensors, a touch location may be determined as described with reference to any of FIGS. 43-45.

Figure 43:
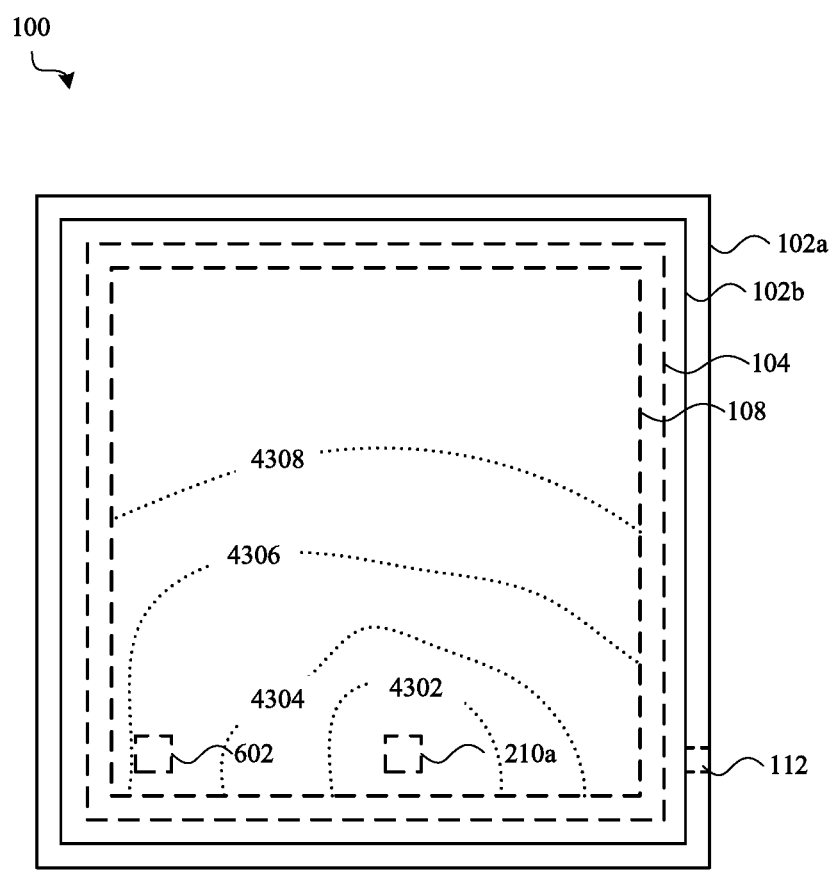
FIGS. 43-45 show example plan views of the device described with reference to FIGS. 1A-1B and 37, when one or more of its capacitive force sensors are used in combination with its pressure sensor to determine a location of a touch on the device's cover.

FIG. 43 shows a plan view of the device described with reference to FIGS. 1A-1B and 37, but only shows one of the displacement sensors 210 (i.e., the displacement sensor 210a). The relative sensitivities of the displacement sensor 210a and the pressure sensor 602 may be determined before the device 100 is immersed in liquid. A relative sensitivity may be determined for each or several touch location on the cover 102b. In some cases, relatively sensitivities within different ranges may be grouped into relative sensitivity zones, such as the relative sensitivity zones 4302, 4304, 4306, and 4308. Regardless of whether relative sensitivities are grouped into zones, a map that associates relative sensitivities of the displacement sensor 210a and the pressure sensor 602 with locations (e.g., discrete locations or zones) may be generated and electronically stored.

When the device 100 is immersed in a fluid, a location of a user's touch on the cover 102b may be determined by retrieving, from the map, a location associated with a relative sensitivity determined using the techniques described with reference to FIG. 42. Given measurements generated by only one displacement sensor 210a, the "location" may be limited to a "zone" or region of the cover 102b.

Figure 44:
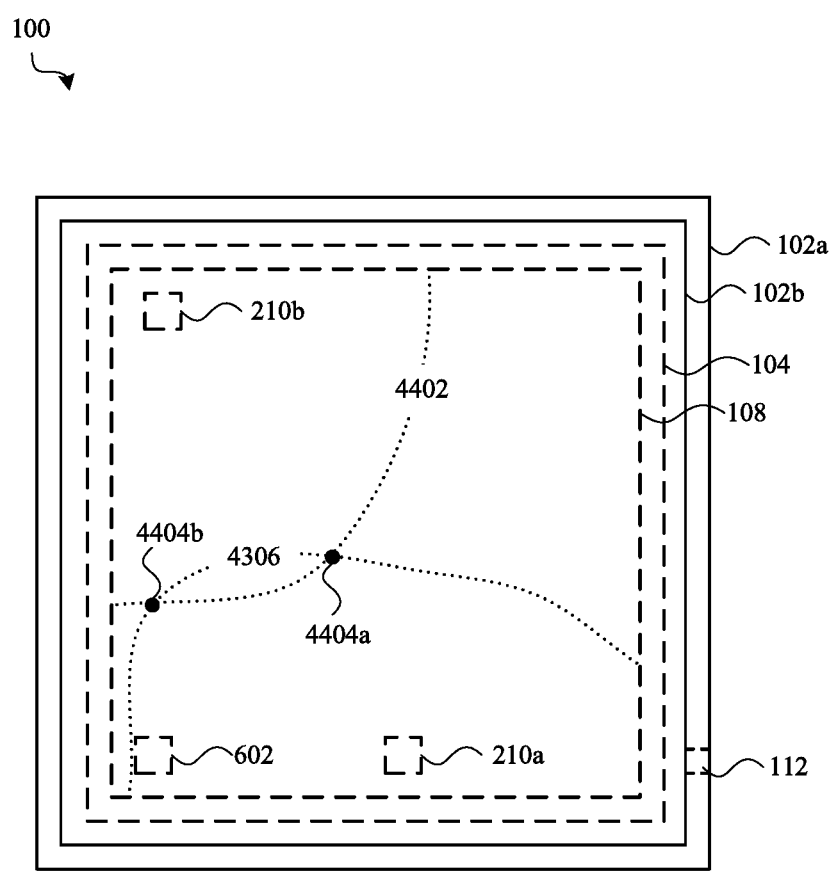

FIG. 44 builds on what is shown in FIG. 43 and shows how determining a relative sensitivity for each of first and displacement sensors 210a, 210b in relation to the pressure sensor 602 enables a touch location on the cover 102b to be determined as one of two discrete locations 4404a or 4404b where boundaries of the relative sensitivity zones 4306, 4402 for the first and second displacement sensors 210a, 210b intersect.

Figure 45:
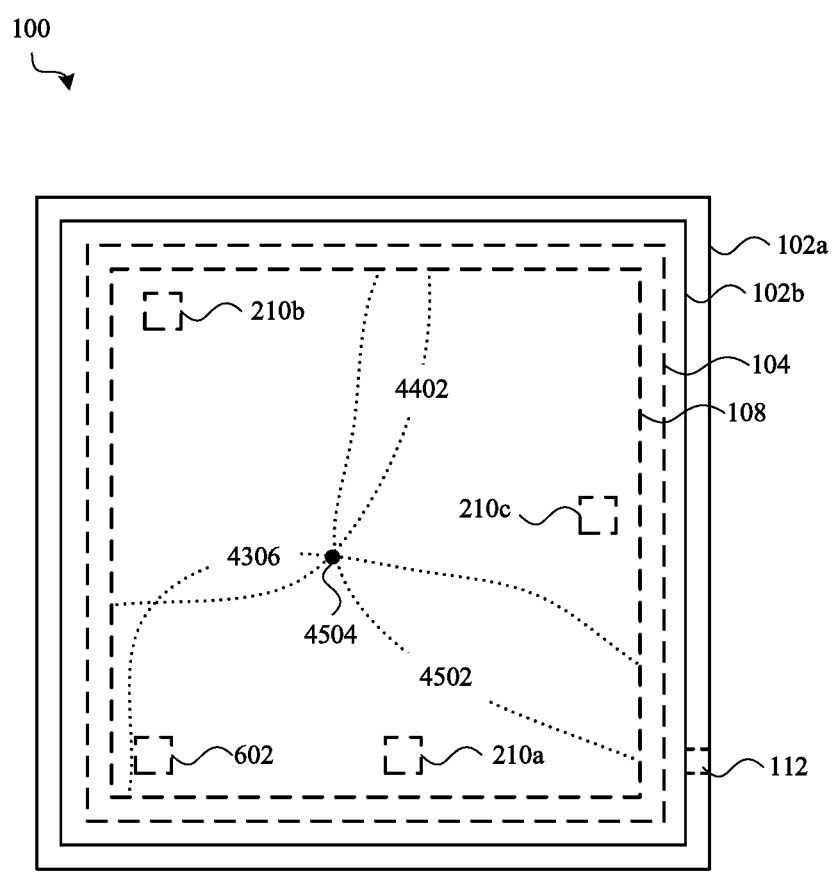

FIG. 45 builds on what is shown in FIG. 44 and shows how determining a relative sensitivity for each of first, second, and third displacement sensors 210a, 210b, 210c in relation to the pressure sensor 602 enables a discrete touch location on the cover 102b to be determined as a location 4504 where boundaries of the relative sensitivity zones 4306, 4402, 4502 for the first, second, and third displacement sensors 210a, 210b, 210c intersect (i.e., the location 4504 is based on a relationship of three candidate locations defined by the relative sensitivity zones 4306, 4402, and 4502).

Figure 46:
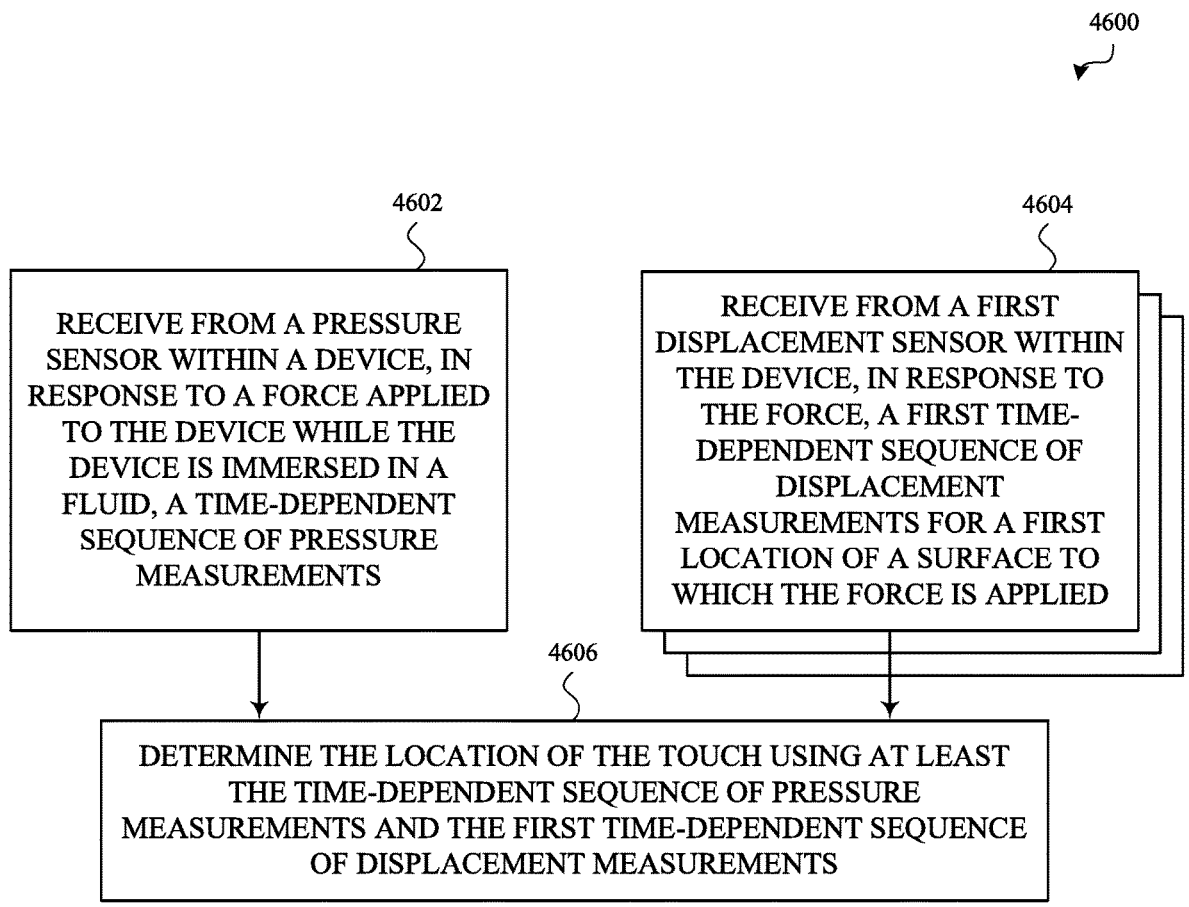
FIG. 46 shows an example method of determining a location of a touch on a surface of a device when the device is immersed in a fluid.

FIG. 46 shows an example method 4600 of determining a location of a touch on a surface of a device, when the device is immersed in a fluid (e.g., water). The operations included in the method 4600 may in some cases be performed by a processor of the device.

At block 4602, the method 4600 may include receiving, from a pressure sensor within the device and in response to a force applied to the device while the device is immersed in the fluid, a time-dependent sequence of pressure measurements.

At block 4604, the method 4600 may include receiving, from a first displacement sensor within the device and in response to the force, a first time-dependent sequence of displacement measurements. The first time-dependent sequence of displacement measurements may include displacement measurements for a first location on the surface.

At block 4606, the method 4600 may include determining the location of the touch using at least the time-dependent sequence of pressure measurements and the first time-dependent sequence of displacement measurements.

In some embodiments of the method 4600, determining the location of the touch may include estimating a set of measurements in the first time-dependent sequence of displacement measurements using at least the time-dependent sequence of pressure measurements, as described with reference to FIG. 42. An error between generated and estimated measurements in the first time-dependent sequence of displacement measurements may then be quantifies; a relative sensitivity of the first displacement sensor and the pressure sensor may be quantified using the quantified error; and the determined relative sensitivity may be used to retrieve, from a map that associates relative sensitivities of the first displacement sensor and the pressure sensor with locations on the surface of the device, the location of the touch.

In some embodiments of the method 4600, the method 4600 may further include receiving, from a second displacement sensor within the device and in response to the force, a second time-dependent sequence of displacement measurements. The second time-dependent sequence of displacement measurements may include displacement measurements for a second location of the surface to which the force is applied. The method 4600 may also include receiving, from a third displacement sensor within the device and in response to the force, a third time-dependent sequence of displacement measurements. The third time-dependent sequence of displacement measurements may include displacement measurements for a third location of the surface to which the force is applied. A set of measurements in each of the first time-dependent sequence of displacement measurements, the second time-dependent sequence of displacement measurements, and the third time-dependent sequence of displacement measurements may be estimated using at least the time-dependent sequence of pressure measurements. Errors between generated and estimated measurements in each of the first time-dependent sequence of displacement measurements, the second time-dependent sequence of displacement measurements, and the third time-dependent sequence of displacement measurements may be quantified. A first relative sensitivity of the first displacement sensor and the pressure sensor using a first quantified error, a second relative sensitivity of the second displacement sensor and the pressure sensor using a second quantified error, and a third relative sensitivity of the third displacement sensor and the pressure sensor using a third quantified error may be determined. The determined first, second, and third relative sensitivities may be used to retrieve, from a set of maps that associate relative sensitivities with locations on the surface of the device, three candidate locations of the touch. The location of the touch may then be identified based on a relationship of the three candidate locations.

Figure 47:
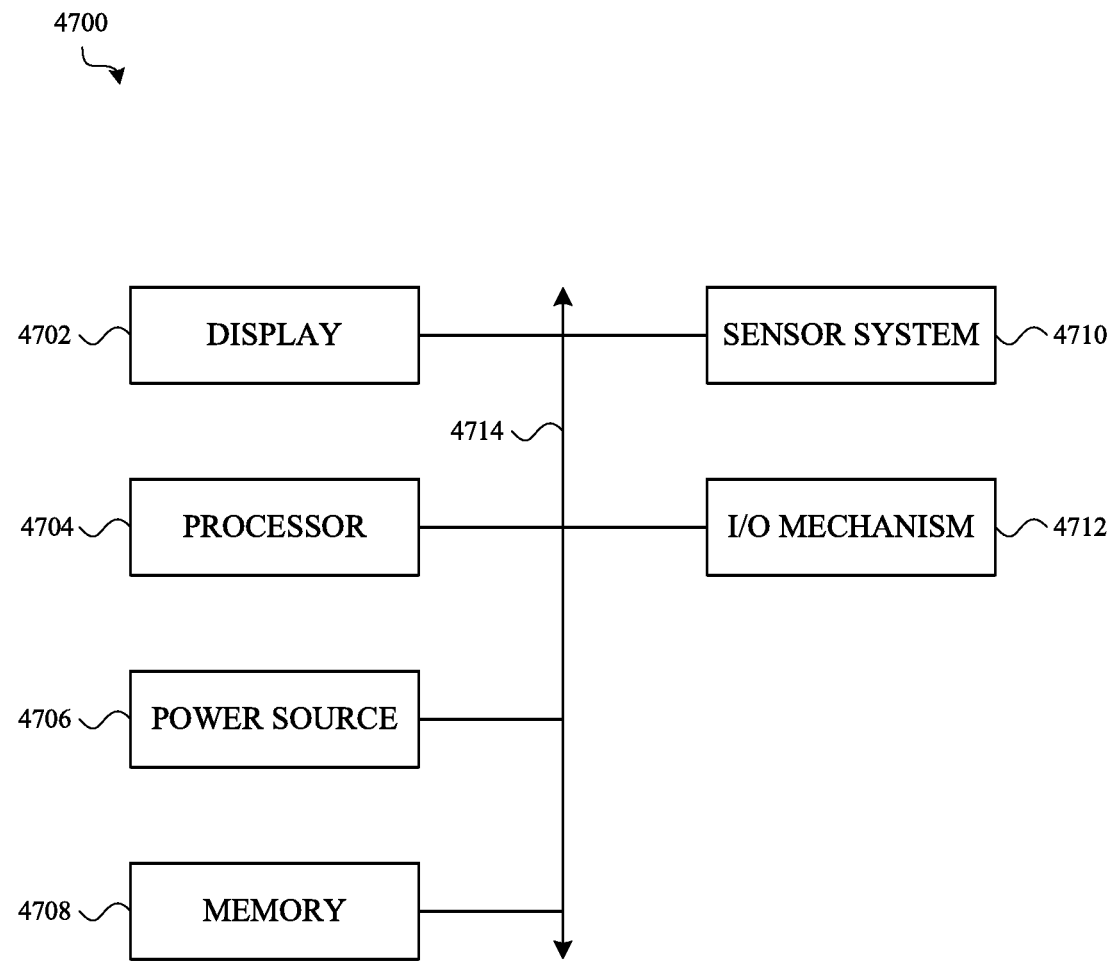
FIG. 47 shows a sample electrical block diagram of an electronic device.

FIG. 47 shows a sample electrical block diagram of an electronic device 4700, which may be the electronic device described with reference to FIGS. 1A-1B, 2A-2B, 5, 6A-6C, 15A-15C, 16A-16C, 19, 24, 25, 29, 37, 38, 39A-39E, or 43-45. The electronic device 4700 may include a display 4702 (e.g., a light-emitting display), a processor 4704, a power source 4706, a memory 4708 or storage device, a sensor system 4710, and an input/output (I/O) mechanism 4712 (e.g., an input/output device and/or input/output port). The processor 4704 may control some or all of the operations of the electronic device 4700. The processor 4704 may communicate, either directly or indirectly, with substantially all of the components of the electronic device 4700. For example, a system bus or other communication mechanism 4714 may provide communication between the processor 4704, the power source 4706, the memory 4708, the sensor system 4710, and/or the input/output mechanism 4712.

The processor 4704 may be implemented as any electronic device capable of processing, receiving, or transmitting data or instructions. For example, the processor 4704 may be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The processor 4704 may be an example of the processor 110 described with reference to FIG. 1B.

In some embodiments, the components of the electronic device 4700 may be controlled by multiple processors. For example, select components of the electronic device 4700 may be controlled by a first processor and other components of the electronic device 4700 may be controlled by a second processor, where the first and second processors may or may not be in communication with each other.

The power source 4706 may be implemented with any device capable of providing energy to the electronic device 4700. For example, the power source 4706 may be one or more batteries or rechargeable batteries. Additionally or alternatively, the power source 4706 may be a power connector or power cord that connects the electronic device 4700 to another power source, such as a wall outlet.

The memory 4708 may store electronic data that may be used by the electronic device 4700. For example, the memory 4708 may store electrical data or content such as, for example, audio and video files, documents and applications, device settings and user preferences, timing signals, control signals, data structures or databases, image data, or focus settings. The memory 4708 may be configured as any type of memory. By way of example only, the memory 4708 may be implemented as random access memory, read-only memory, Flash memory, removable memory, other types of storage elements, or combinations of such devices.

The electronic device 4700 may also include one or more sensors defining the sensor system 4710. The sensors may be positioned substantially anywhere on the electronic device 4700. The sensor(s) may be configured to sense substantially any type of characteristic, such as but not limited to, touch, force, pressure, light, heat, movement, relative motion, biometric data, and so on. For example, the sensor system 4710 may include a touch sensor, a force sensor, a heat sensor, a position sensor, a light or optical sensor, an accelerometer, a pressure sensor (e.g., a pressure transducer), a gyroscope, a magnetometer, a health monitoring sensor, and so on. Additionally, the one or more sensors may utilize any suitable sensing technology, including, but not limited to, capacitive, ultrasonic, resistive, optical, ultrasound, piezoelectric, and thermal sensing technology. The sensor system 4710 may include any of the sensors described herein.

The I/O mechanism 4712 may transmit and/or receive data from a user or another electronic device. The I/O mechanism 4712 may include a display, a touch sensing input surface such as a track pad, one or more buttons (e.g., a graphical user interface "home" button), one or more cameras, one or more microphones or speakers, one or more ports such as a microphone port, and/or a keyboard. Additionally or alternatively, the I/O mechanism 4712 (e.g., an interface or port) may transmit electronic signals via a communications network, such as a wireless and/or wired network connection. Examples of wireless and wired network connections include, but are not limited to, cellular, Wi-Fi, Bluetooth, IR, and Ethernet connections.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A device, comprising:
   a housing defining part of an interior volume and an opening to the interior volume;
   a cover mounted to the housing to cover the opening and further define the interior volume;
   a display mounted within the interior volume and viewable through the cover; and
   a system in package (SiP) mounted within the interior volume, comprising:
     a self-capacitance sense pad adjacent a first surface of the SiP;
     a set of solder structures attached to a second surface of the SiP, the second surface opposite the first surface; and
     an integrated circuit (IC) coupled to the self-capacitance sense pad and configured to output, at one or more solder structures in the set of solder structures, a digital value related to a measured capacitance of the self-capacitance sense pad; wherein:
   the SiP is mounted within the interior volume with the first surface positioned closer to the cover than the second surface.

2. The device of claim 1, further comprising a device stack attached to the cover, wherein:
   the device stack comprises the display and a ground element;
   the self-capacitance sense pad is separated from the ground element by a compressible gap;
   the digital value is indicative of an amount of force applied to the cover; and
   different amounts of force applied to the cover compress the compressible gap to different extents and produce different capacitances at the self-capacitance sense pad.

3. The device of claim 2, wherein the ground element is separated from the cover by the display.

4. The device of claim 1, wherein:
   the digital value is indicative of a proximity of a finger or a stylus to the cover; and
   different proximities of the finger or the stylus to the cover produce different capacitances at the self-capacitance sense pad.

5. The device of claim 1, wherein the SiP further comprises an alternating current (AC) shield around the self-capacitance sense pad.

6. The device of claim 5, wherein the SiP further comprises an AC shield layer positioned between the self-capacitance sense pad and the IC.

7. The device of claim 1, wherein the self-capacitance sense pad is a first self-capacitance sense pad, the device further comprising:
a second self-capacitance sense pad disposed in a different plane than the first self-capacitance sense pad.

8. The device of claim 7, wherein the second self-capacitance sense pad is disposed between the first self-capacitance sense pad and the IC.

9. The device of claim 7, wherein the SiP further comprises:
an alternating current (AC) shield around the first and second self-capacitance sense pads; and
an AC shield layer positioned between the first and second self-capacitance sense pads and the IC.

10. The device of claim 1, wherein the SiP is a first SiP, the device further comprising:
a flex circuit; and
a second SiP comprising a same set of components as the first SiP and oriented within the interior volume in a same way as the first SiP;
wherein the first SiP and the second SiP are mechanically and electrically coupled to a same side of the flex circuit.

11. The device of claim 1, wherein the SiP is a first SiP, the device further comprising:
a printed circuit board; and
a second SiP comprising a same set of components as the first SiP and oriented within the interior volume in a same way as the first SiP; wherein;
the first SiP and the second SiP are mechanically and electrically coupled to a same side of the printed circuit board.

12. A device, comprising:
a housing defining part of an interior volume and an opening to the interior volume;
a cover mounted to the housing to cover the opening and further define the interior volume;
a capacitive force sensor disposed within the interior volume and configured to generate a first set of one or more signals related to an amount of force applied to the cover;
a pressure sensor disposed within the interior volume and configured to generate a second set of one or more signals related to the amount of force applied to the cover; and
a processor configured to determine the amount of force applied to the cover using at least one of the first set of one or more signals or the second set of one or more signals.

13. The device of claim 12, further comprising:
a touch sensor disposed to detect one or more touches on the cover;
wherein the processor is configured to:
determine the amount of force applied to the cover using the second set of one or more signals when the amount of force applied to the cover is determined for a first time following a touch detected by the touch sensor; and
determine the amount of force applied to the cover using the first set of one or more signals when the amount of force applied to the cover is determined for a second time following the touch detected by the touch sensor.

14. The device of claim 13, wherein the processor is configured to:
determine the amount of force applied to the cover using the first set of one or more signals and the second set of one or more signals when the amount of force applied to the cover is determined for a third time following the touch detected by the touch sensor; and
the third time is between the first time and the second time.

15. The device of claim 12, wherein the processor is configured to:
determine a sealing state of the interior volume;
determine the amount of force applied to the cover using the first set of one or more signals when the sealing state is determined to be below a threshold; and
determine the amount of force applied to the cover using the second set of one or more signals when the sealing state is determined to be above the threshold.

16. The device of claim 12, wherein the processor is configured to:
determine a sealing state of the interior volume;
determine the amount of force applied to the cover using the first set of one or more signals when the sealing state is determined to be below a first threshold; and
determine the amount of force applied to the cover using the first set of one or more signals and the second set of one or more signals when the sealing state is determined to be between the first threshold and a second threshold.

17. The device of claim 12, wherein the processor is configured to:
determine a sealing state of the interior volume;
determine the amount of force applied to the cover using the first set of one or more signals when the sealing state is determined to be below a first threshold;
determine the amount of force applied to the cover using the first set of one or more signals and the second set of one or more signals when the sealing state is determined to be between the first threshold and a second threshold; and
determine the amount of force applied to the cover using the second set of one or more signals when the sealing state is determined to be above the second threshold.

18. The device of claim 12, wherein the capacitive force sensor is a first capacitive force sensor and the device further comprises:
a set of capacitive force sensors disposed within the interior volume, each disposed within the interior volume and configured to generate a respective first set of one or more signals related to an amount of force applied to the cover; and
a fluid immersion detector; wherein:
the capacitive force sensors of the set of capacitive force sensors are disposed at different locations beneath the cover;
the set of capacitive force sensors includes the first capacitive force sensor; and
the processor is further configured to determine a location of a touch on the cover, using the respective first sets of one or more signals, when the fluid immersion detector indicates the device is immersed in a fluid.

19. The device of claim 12, wherein the pressure sensor comprises a microphone.

20. The device of claim 12, further comprising:
a barometric pressure sensor disposed within the housing and configured to generate a third set of one or more signals related to an ambient pressure of the device; wherein:
the processor is configured to determine the amount of force applied to the cover using at least one signal from each of the first set of one or more signals, the second set of one or more signals, and the third set of one or more signals.

21. The device of claim 20, wherein the processor is configured to:
determine an internal pressure from the first set of one or more signals;
determine a distance between the cover and the capacitive force sensor using the second set of one or more signals;
determine the ambient pressure of the device from the third set of one or more signals; and
determine a pressure difference between the internal pressure and the ambient pressure; wherein:
the processor determines the amount of force applied to the cover from the distance and the pressure difference.

22. A method of determining an amount of force applied to a device having a display, comprising:
determining a sealing state of an interior volume including the display of the device;
determining the amount of force applied to the device using a first set of one or more signals when the sealing state is determined to be a first sealing state;
determining the amount of force applied to the device using a second set of one or more signals when the sealing state is determined to be a second sealing state; wherein:
the first set of one or more signals is provided by a capacitive force sensor disposed within the interior volume; and
the second set of one or more signals is provided by a pressure sensor disposed within the interior volume.

23. The method of claim 22, further comprising:
measuring capacitances of a first self-capacitance sense pad and a second self-capacitance sense pad of the capacitive force sensor;
calibrating a force sensing operation of the capacitive force sensor using the measured capacitances of the first self-capacitance sense pad and the second self-capacitance sense pad; and
outputting, from a system in package (SiP) disposed within the interior volume, a digital value related to a measured capacitance of the first self-capacitance sense pad; wherein:
the first self-capacitance sense pad and the second self-capacitance sense pad are respectively disposed in different layers of the SiP;
the SiP is separated from a ground element within the interior volume by a compressible gap; and
the ground element is attached to the display.

24. The method of claim 22, further comprising:
measuring the capacitances of the first self-capacitance sense pad and the second self-capacitance sense pad when the compressible gap is in different compression states; wherein:
the force sensing operation is calibrated using the measured capacitances for the different compression states.

25. A device, comprising:
a housing defining part of an interior volume and an opening to the interior volume;
a cover mounted to the housing to cover the opening and further define the interior volume;
an internal pressure sensor disposed within the interior volume and configured to generate a first set of one or more signals related to an amount of force applied to the cover;
a barometric pressure sensor disposed within the housing and configured to generate a second set of one or more signals related to an ambient pressure of the device; and
a processor configured to determine the amount of force applied to the cover using the first set of one or more signals and the second set of one or more signals.

26. The device of claim 25, wherein the processor is further configured to:
determine an internal pressure of the device from the first set of one or more signals; and
determine the ambient pressure of the device from the second set of one or more signals; wherein:
the processor determines the amount of force applied to the cover using the internal pressure and the ambient pressure.

27. The device of claim 26, wherein:
the processor is further configured to adjust the internal pressure using the ambient pressure; and
the processor determines the amount of the force applied to the cover using the adjusted internal pressure.

28. The device of claim 27, wherein the processor is further configured to:
determine whether the amount of force applied to the cover indicates a user input.

29. The device of claim 26, wherein the processor is further configured to:
adjust, using the ambient pressure, a force detection threshold to which the internal pressure is compared; and
identify a force input when the internal pressure satisfies the adjusted force detection threshold.

30. The device of claim 26, wherein the processor is further configured to:
characterize the ambient pressure; and
cease determining the amount of force applied to the cover, for a period of time, in response to the characterization of the ambient pressure.

31. The device of claim 26, wherein:
the determined ambient pressure is a time-varying ambient pressure; and
the processor is further configured to:
identify, from the time-varying ambient pressure, an ambient pressure rate of change above a threshold; and
adapt, in response to identifying the ambient pressure rate of change above the threshold, how the amount of force applied to the cover is determined.

32. A device, comprising:
a housing defining part of an interior volume and an opening to the interior volume;
a cover mounted to the housing to cover the opening and further define the interior volume;
a pressure sensor disposed within the interior volume and configured to generate a set of pressure samples related to an amount of force applied to the cover; and
a processor; wherein the processor is configured to:
determine, using the set of pressure samples, whether the amount of force applied to the cover exceeds a τ calibration threshold, where the τ calibration threshold is based on an application or release of the force applied to the cover, and τ is a time it takes the interior volume to reach a steady state pressure following the application or release of the force applied to the cover;

calibrate τ during field operation of the device, in response to determining the amount of force applied to the cover exceeds the τ calibration threshold; and determine the amount of force applied to the cover, after calibrating τ, using at least one pressure sample obtained from the pressure sensor and the calibrated τ.

33. The device of claim 32, wherein the processor is configured to calibrate τ, during field operation of the device, in response to a combination of both:

determining the amount of force applied to the cover exceeds the τ calibration threshold; and determining that a number of pressure samples obtained after a release of the force applied to the cover, and before a next touch on the cover, exceeds a threshold number of samples.

34. The device of claim 32, wherein the processor is further configured to:

determine whether τ satisfies an interior volume leak threshold; and notifying a user of the device when τ is determined to satisfy the interior volume leak threshold.

35. A device, comprising:

a housing defining part of an interior volume and an opening to the interior volume;

a cover mounted to the housing to cover the opening and further define the interior volume;

an internal pressure sensor disposed within the interior volume and configured to generate a first set of one or more signals related to an amount of force applied to the cover;

a temperature sensor disposed within the housing and configured to generate a second set of one or more signals related to a temperature within the interior volume; and a processor configured to generate an adjusted first set of one or more signals using the second set of one or more signals, and determine the amount of force applied to the cover using at least one adjusted signal from the adjusted first set of one or more signals.

36. The device of claim 35, wherein the temperature sensor comprises a first temperature sensor and a second temperature sensor.

37. A device, comprising:

a housing defining part of an interior volume and an opening to the interior volume;

a cover mounted to the housing to cover the opening and further define the interior volume;

a sealed pocket disposed between the cover and the housing and operating as a spring that opposes an amount of force applied to the cover;

a pressure sensor disposed within the interior volume and configured to generate a set of one or more signals related to the amount of force applied to the cover; and a processor configured to determine the amount of force applied to the cover using at least one signal of the first set of one or more signals.

38. A device, comprising:

a housing defining part of an interior volume and an opening to the interior volume;

a cover mounted to the housing to cover the opening and further define the interior volume;

a pressure chopper configured to modulate a pressure of the interior volume;

an internal pressure sensor disposed within the interior volume and configured to generate a first set of one or more modulated signals related to an amount of force applied to the cover; and a processor configured to generate a second set of one or more demodulated signals using a modulation frequency of the pressure chopper, and determine the amount of force applied to the cover using at least one signal from the second set of one or more demodulated signals.

39. The device of claim 38, wherein the pressure chopper comprises an open back speaker.

40. The device of claim 38, wherein the pressure chopper comprises a haptic engine.

* * * * *